(12) United States Patent
Nakao

(10) Patent No.: US 12,322,238 B2
(45) Date of Patent: Jun. 3, 2025

(54) BEVERAGE PROVIDING DEVICE

(71) Applicant: New Innovations Inc., Tokyo (JP)

(72) Inventor: Keito Nakao, Tokyo (JP)

(73) Assignee: New Innovations Inc., Tokyo (JP)

( * ) Notice: Subject to any disclaimer, the term of this patent is extended or adjusted under 35 U.S.C. 154(b) by 649 days.

(21) Appl. No.: 17/625,794

(22) PCT Filed: Jul. 8, 2020

(86) PCT No.: PCT/JP2020/026657
§ 371 (c)(1),
(2) Date: Jan. 10, 2022

(87) PCT Pub. No.: WO2021/014971
PCT Pub. Date: Jan. 28, 2021

(65) Prior Publication Data
US 2022/0262190 A1 Aug. 18, 2022

(30) Foreign Application Priority Data

Jul. 19, 2019 (JP) .................. 2019-133505
Mar. 10, 2020 (JP) .................. 2020-040635
Apr. 14, 2020 (JP) .................. 2020-072027

(51) Int. Cl.
*G07F 13/10* (2006.01)
*A47J 31/44* (2006.01)
(52) U.S. Cl.
CPC .......... *G07F 13/10* (2013.01); *A47J 31/4403* (2013.01)
(58) Field of Classification Search
CPC ............... G07F 13/10; A47J 31/4403
(Continued)

(56) References Cited

U.S. PATENT DOCUMENTS 4,108,363 A * 8/1978 Susumu .................. G07F 9/105
177/25.14
4,791,411 A * 12/1988 Staar .................... G06Q 10/087
340/568.1
(Continued)

FOREIGN PATENT DOCUMENTS

CA 109801446 A 5/2019
CN 107067556 A 8/2017
(Continued)

OTHER PUBLICATIONS

Office Action issued in Chinese Patent Application No. 202080050748.6 mailed on Oct. 24, 2022, with English Translation (15 pages).
(Continued)

*Primary Examiner* — Rakesh Kumar
(74) *Attorney, Agent, or Firm* — Nakanishi IP Associates, LLC

(57) ABSTRACT

A beverage providing device includes: a beverage supply unit; a storage section having an area for holding two or more containers each containing a beverage supplied from the beverage supply unit; a provision section including an outlet; a transfer section which transfers, to at least the storage section, each container containing the beverage supplied from the beverage supply unit; an outer wall having a front face provided with at least the outlet and having a side face of the front face. At least part of the beverage supply unit, the storage section, and the transfer section are arranged in an area surrounded by the front face, the side face, a plane parallel to the front face, and a plane parallel to the side face.

21 Claims, 50 Drawing Sheets

(58) Field of Classification Search
USPC .......................................................... 221/96
See application file for complete search history.

(56) References Cited

U.S. PATENT DOCUMENTS

| | | | | |
|---|---|---|---|---|
| 4,953,643 | A * | 9/1990 | Ellion | G01G 13/04 |
| | | | | 222/196 |
| 5,005,657 | A * | 4/1991 | Ellion | G01G 13/04 |
| | | | | 177/122 |
| 5,385,265 | A * | 1/1995 | Schlamp | G07F 17/0092 |
| | | | | 700/242 |
| 5,728,999 | A * | 3/1998 | Teicher | G07F 11/30 |
| | | | | 235/380 |
| 5,833,151 | A * | 11/1998 | Doak | B02C 19/0087 |
| | | | | 241/37.5 |
| 6,095,205 | A * | 8/2000 | Nagasawa | G07F 13/10 |
| | | | | 141/85 |
| 6,102,162 | A * | 8/2000 | Teicher | G07F 17/0042 |
| | | | | 186/39 |
| 6,173,582 | B1 * | 1/2001 | Hixson | F25D 25/00 |
| | | | | 62/457.4 |
| 6,433,684 | B1 * | 8/2002 | Lie | A47G 29/1214 |
| | | | | 340/556 |
| 6,464,142 | B1 * | 10/2002 | Denenberg | B65G 1/137 |
| | | | | 235/462.46 |
| 6,616,010 | B2 * | 9/2003 | Yuyama | G06K 17/0022 |
| | | | | 221/282 |
| 6,684,126 | B2 * | 1/2004 | Omura | G07F 11/28 |
| | | | | 700/231 |
| 6,694,221 | B2 * | 2/2004 | Chavez | G06Q 10/087 |
| | | | | 700/244 |
| 7,627,281 | B2 * | 12/2009 | Tanaka | B65H 7/04 |
| | | | | 271/259 |
| 7,747,477 | B1 * | 6/2010 | Louie | G07G 1/009 |
| | | | | 705/28 |
| 8,061,555 | B2 * | 11/2011 | Guglielmi | G07F 11/42 |
| | | | | 221/121 |
| 8,700,211 | B2 * | 4/2014 | Shoenfeld | A47B 88/90 |
| | | | | 700/242 |
| 9,536,236 | B2 | 1/2017 | Hay | |
| 9,663,974 | B2 * | 5/2017 | Savage | E05G 1/04 |
| 9,719,720 | B2 | 8/2017 | Seo et al. | |
| 2001/0042024 | A1 * | 11/2001 | Rogers | G06Q 30/0635 |
| | | | | 705/26.81 |
| 2005/0021175 | A1 * | 1/2005 | Bain | G07F 11/62 |
| | | | | 700/236 |
| 2009/0137047 | A1 * | 5/2009 | Regan | G01N 35/04 |
| | | | | 422/67 |
| 2010/0301716 | A1 * | 12/2010 | Ranitlla | E05B 47/00 |
| | | | | 340/568.1 |
| 2012/0153783 | A1 * | 6/2012 | Shoenfeld | A61L 2/10 |
| | | | | 362/133 |
| 2012/0200213 | A1 * | 8/2012 | Savage | E06B 7/00 |
| | | | | 49/70 |
| 2012/0200385 | A1 * | 8/2012 | Savage | G06Q 10/087 |
| | | | | 340/5.7 |
| 2014/0316916 | A1 * | 10/2014 | Hay | G06Q 20/20 |
| | | | | 705/17 |
| 2014/0320647 | A1 | 10/2014 | Seo et al. | |
| 2015/0366377 | A1 * | 12/2015 | Savage | H02G 1/00 |
| | | | | 312/270.3 |

FOREIGN PATENT DOCUMENTS

| | | | | |
|---|---|---|---|---|
| CN | 107424313 A | * | 12/2017 | ............ G07F 13/06 |
| JP | 2017-63818 A | | 4/2017 | |
| KR | 102093088 B1 | * | 3/2020 | ............ G07F 13/06 |
| KR | 20230162500 A | * | 11/2023 | ............ G07F 13/10 |

OTHER PUBLICATIONS

International Search Report issued in PCT/JP2020/026657 mailed on Sep. 15, 2020 with English Translation (5 pages).
Second Office Action issued in Chinese Patent Application No. 202080050748.6 dated on Aug. 7, 2023, with English Translation (72 pages).
Office Action issued in Japanese Patent Application No. 2022-091991 mailed on Jul. 1, 2024, with English Translation (7 pages).
Second Office Action issued in Chinese Patent Application No. 202080050748.6 dated on Apr. 25, 2023, with English Translation (76 pages).
Office Action issued in Japanese Patent Application No. 2020-072027 mailed on Mar. 29, 2022, with English Translation (13 pages).

* cited by examiner

BEVERAGE PROVIDING DEVICE

TECHNICAL FIELD

The present invention relates to a beverage providing device.

BACKGROUND ART

Conventionally, as in Patent Literature 1, a beverage providing device has been proposed.

CITATION LIST

Patent Literature

Patent Literature 1: JP 2017-63818 A

SUMMARY OF INVENTION

Technical Problem

However, it is necessary to keep a purchaser waiting for a time for extracting the beverage from the beverage providing device.

Thus, the purpose of the present invention is to provide a beverage providing device capable of reducing the waiting time of a purchaser.

Solution to Problem

A beverage providing device according to the invention includes: a beverage supply unit; a storage section having an area for holding two or more containers each containing a beverage supplied from the beverage supply unit; a provision section including an outlet; a transfer section which transfers, to at least the storage section, each container containing the beverage supplied from the beverage supply unit; an outer wall having a front face provided with at least the outlet and having a side face of the front face.

At least part of the beverage supply unit, the storage section, and the transfer section are arranged in an area surrounded by the front face, the side face, a plane parallel to the front face, and a plane parallel to the side face.

The container containing the beverage supplied from the beverage supply unit is made ready to be picked-up through the outlet from a side that is at the front face and is opposite to a side where the beverage supply unit, the transfer section, and the storage section are located.

At least part of the beverage supply unit, the transfer section, and the storage section are housed in one area. This makes it possible to keep a plurality of containers each containing a beverage supplied from the beverage supply unit and provide the beverage to a purchaser within a short waiting time when needed, that is, when the purchaser conducts a purchase procedure (payment), a pick-up operation, etc.

Preferably, the storage section and the provision section are adjacent to each other in the front-rear direction.

Since it is unnecessary to transfer the container between the storage section and the provision section, the beverage can be provided to the purchaser within a short waiting time.

More preferably, the storage section has three or more storage areas.

The provision section has three or more front opening/closing doors.

The front opening/closing door is attached to each of the three or more storage areas.

The storage area and the front opening/closing door are in a positional relationship of sandwiching the outlet in the front-rear direction.

Opening multiple front opening/closing doors makes it possible to simultaneously provide multiple beverages to the purchaser, and to store, at the same time, a container containing another beverage in another storage cylinder.

More preferably, the storage section has three or more rear opening/closing doors.

The rear opening/closing door is attached to each of three or more storage areas.

The front opening/closing door and the rear opening/closing door are in a positional relationship of sandwiching the storage area in the front-rear direction.

The transfer section transfers the container containing the beverage supplied from the beverage supply unit via the rear opening/closing door to the storage area.

Providing the rear opening/closing door makes it possible to hide an area behind the rear opening/closing door from the front side where the front opening/closing door is located.

More preferably, while the front opening/closing door is open, the rear opening/closing door which faces the open state front opening/closing door in the front-rear direction is kept closed; and/or, while the rear opening/closing door is open, the front opening/closing door which faces the open state rear opening/closing door in the front-rear direction is kept closed.

By controlling the opening and closing of the rear opening/closing door and the front opening/closing door, it is possible to open one of them while the other can be kept closed. This can prevent the occurrence of physical interference (collision) with a member that may enter the storage cylinder between the doors.

In addition, preferably, when a purchaser terminal is located near the beverage providing device and a predetermined operation is performed on the purchaser terminal, a locked state of the front opening/closing door corresponding to a storage area among the storage areas, where a container containing a beverage to be picked up by a purchaser of the purchaser terminal is stored, is released.

More preferably, information about the front opening/closing door whose locked state is released is output to the purchaser terminal.

More preferably, the transfer section has a first transfer unit, a second transfer unit, and a container supply unit.

The container supply unit supplies a container to the first transfer unit located below.

The first transfer unit transfers the container supplied from the container supply unit to the beverage supply unit, and transfers the container containing a beverage supplied from the beverage supply unit to a relay point.

The second transfer unit grips the container positioned at the relay point and transfers the container to the storage section.

This makes it possible to automate, without human intervention, the process from the step of arranging the container in the beverage supply unit to the step of providing the container containing the beverage to the purchaser.

By using two transfer devices (the first transfer unit and the second transfer unit) and the container supply unit, transportation of the container to the beverage supply unit, transportation of the container containing the beverage supplied from the beverage supply unit, and transportation of the container held in the storage section can be simultaneously processed to improve operational efficiency.

More preferably, the second transfer unit has an arm that holds a side portion of the container and a claw that holds a bottom portion of the container.

An area where the container is mounted at the first transfer unit and an area where the container is mounted at the storage section are each provided with a recess into which the claw is inserted.

This makes it possible to reliably grip the container by the second transfer unit.

Further, preferably, a leg is provided at a lower portion of a housing surrounding the beverage supply unit, the transfer section, and the storage section.

An area where the beverage supply unit of the housing is provided, an area where the first transfer unit and the container supply unit of the housing are provided, and an area where the second transfer unit and the storage section of the housing are provided are separately structured.

The beverage providing device can be easily carried by inserting a fork of a forklift or the like into a portion below the bottom of a frame constituting the housing.

The separated structure allows the three areas of the housing to be carried separately at the time of transportation, etc.

More preferably, a caster is provided on a member that holds the beverage supply unit.

It is possible to easily dislocate a portion having the beverage supply unit or the like away from other portions of the beverage providing device during maintenance such as replenishment of milk.

More preferably, the storage section holds a container containing a beverage supplied from the beverage supply unit in a covered state.

Compared to a form in which the container is held in an uncovered state, it is possible to decrease the possibility of foreign matter being mixed in by the time of transfer to the provision section.

More preferably, the beverage providing device further includes a disposal section.

The disposal section is provided in an area surrounded by the front face, the side face, the plane parallel to the front face, and the plane parallel to the side face.

The transfer section transfers, to the disposal section, a container for which an elapsed time after supplied from the beverage supply unit or an elapsed time after held in the storage section has passed a first time, among containers containing the beverage supplied from the beverage supply unit and being held in the storage section.

Of the beverages supplied from the beverage supply unit, those that have reached a certain period of time are discarded together with the container. This can avoid providing a purchaser with a deteriorated beverage.

More preferably, the disposal section is provided below the storage section and has a strainer.

Since the disposal section is arranged near the storage section, it is possible to efficiently dispose of any container held in a storage section with a short transfer distance.

A solid and a liquid can be separated above and below the strainer, and waste can then be stored at the disposal section.

More preferably, the beverage providing device further includes an operation section.

The operation section is provided on at least one of the front face or the side face.

Selection of a beverage supplied from the beverage supply unit and payment corresponding to said selection are executed by using the operation section.

After the selection is completed and before said payment is completed, the transfer section transfers, to the provision section or a vicinity of the provision section, a container containing a beverage supplied from the beverage supply unit and corresponding to said selection.

After the purchaser has selected the beverage to be purchased and before payment corresponding to said selection is completed, a container containing the selected beverage is delivered to the provision section, etc.

This enables the purchaser to pick up the container containing the beverage corresponding to said payment in a short time after said payment is completed.

Also, preferably, the beverage providing device further includes an operation section.

The operation section is provided on at least one of the front face or the side face.

Selection of a beverage supplied from the beverage supply unit and payment corresponding to said selection are executed by using the operation section.

The storage section and the provision section are arranged apart.

The transfer section transfers, to the provision section, a container containing a beverage supplied from the beverage supply unit before said selection is completed.

In a case where the beverage included in the container transferred to the provision section does not correspond to said selection, the transfer section transfers, to the storage section, the container transferred to the provision section, and transfers, to the provision section, a container containing a beverage supplied from the beverage supply unit and corresponding to said selection, after said selection is completed.

Even before the purchaser selects the beverage to be purchased, a container containing the beverage is delivered to the provision section in advance.

Accordingly, if the beverage in the container delivered to the provision section matches the beverage selected by the purchaser, the purchaser can pick up the container containing the beverage corresponding to said payment immediately after said payment is completed.

If the beverage in the container delivered to the provision section does not match the beverage selected by the purchaser, the container is switched to a container containing the beverage selected by the purchaser. Thus, the purchaser can then pick up the container containing the beverage corresponding to said payment in a short time after said payment is completed.

More preferably, before said selection is completed, a type of beverage contained in the container to be transferred to the provision section is determined on the basis of the past sales performance of the beverage providing device.

By determining a beverage that the purchaser is highly likely to select on the basis of the past sales performance, it is possible to increase the possibility that the beverage in the container delivered in advance to the provision section matches the beverage to be selected by the purchaser. This can improve operational efficiency.

Further, preferably, the storage section and the provision section are arranged apart in the left-right direction.

The provision section further has a provision section-side turntable.

The provision section-side turntable has a pedestal and a wall standing on the pedestal.

The provision section-side turntable is provided at the outlet.

The pedestal rotates about an axis extending in a vertical direction.

The wall is used to close the outlet.

The pedestal is provided with at least two mounting areas positioned to sandwich the wall.

The transfer section transfers, to one of the two mounting areas, a container containing a beverage supplied from the beverage supply unit.

By rotating the provision section-side turntable provided at the provision section, the delivered container can be quickly moved to a side where the purchaser is situated.

In addition, the wall provided on the provision section-side turntable makes it possible to prevent intrusion from the outside through the outlet.

Further, preferably, the beverage providing device further includes an operation instruction output section.

The operation instruction output section is an area surrounded by the front face, the side face, the plane parallel to the front face, and the plane parallel to the side face, and is provided proximate to the beverage supply unit.

The operation instruction output section outputs information about at least one instruction of a type of beverage to be next supplied by the beverage supply unit, replenishment of materials used in the beverage supply unit, cleaning of the beverage supply unit, and cleaning of the disposal section.

Because the operation instruction output section outputs information about the type of beverage to be supplied by the beverage supply unit, an instruction for replenishment of materials, or the like, a worker can work at an appropriate timing.

Further, preferably, the storage section and the provision section are arranged apart in the left-right direction.

The beverage supply unit is arranged apart from the front face in a front-rear direction, compared to the storage section.

The transfer section has a first transfer unit and a second transfer unit.

The first transfer unit transfers, to a relay point, a container containing a beverage supplied from the beverage supply unit.

The second transfer unit transfers, to the storage section and/or the provision section, the container containing the beverage supplied from the beverage supply unit and transferred to the relay point.

By using two transfer devices (the first transfer unit and the second transfer unit), transportation of the container containing the beverage supplied from the beverage supply unit and transportation of the container held in the storage section can be simultaneously processed to improve operational efficiency.

More preferably, a transfer range of the first transfer unit and a transfer range of the second transfer unit overlap in an area including the relay point.

The transfer ranges of the two transfer units are made to partially overlap. Thus, the beverage providing device can be made smaller than a form in which the first transfer unit and the second transfer unit are arranged so as not to overlap the transfer range of the first transfer unit with the transfer range of the second transfer unit.

Also, preferably, the beverage providing device further includes an inner wall.

The inner wall is provided in an area surrounded by the front face, the side face, the plane parallel to the front face, and the plane parallel to the side face.

A display window is provided on the front face in an area where the storage section is located.

At least part of the storage section and at least part of the second transfer unit are in a positional relationship of being sandwiched in the front-rear direction by the inner wall and the display window.

The display window and the inner wall may be used to hide an area (area behind the inner wall) that is of the beverage providing device and is not desired to be seen from the outside, while the storage section and the second transfer unit, which are in an area in front of the inner wall, can be made visible from the outside.

Also, preferably, the transfer section transfers, to the storage section and the provision section, a container containing a beverage supplied from the beverage supply unit.

The storage section has a first storage section, a second storage section, and a partition wall.

The first storage section is equipped with a heater for heating a container containing a beverage supplied from the beverage supply unit and held in the first storage section.

The second storage section is equipped with a cooler for cooling a container containing a beverage supplied from the beverage supply unit and held in the second storage section.

The partition wall is provided between an area where the container in the first storage section is held and an area where the container in the second storage section is held.

The first storage section, the second storage section, and the provision section are aligned in a left-right direction.

By holding each container containing the beverage supplied from the beverage supply unit in the first storage section including the heater, warm state can be kept.

By holding each container containing the beverage supplied from the beverage supply unit in the second storage section including the cooler, cold state can be kept.

Providing the partition wall between the first storage section and the second storage section makes it possible to prevent heat transfer from the first storage section to the second storage section and heat transfer from the second storage section to the first storage section.

Since the first storage section, the second storage section, and the provision section are aligned in the left-right direction, the transfer section that is movable in the left-right direction may be used to reciprocate the container between these sections.

More preferably, two or more of the beverage supply units are provided in an area surrounded by the front face, the side face, the plane parallel to the front face, and the plane parallel to the side face.

The transfer section transfers containers containing beverages supplied from the two or more beverage supply units.

This makes it possible to supply more beverages to the containers in a short time.

Also, preferably, the transfer section transfers, to the storage section and the provision section, a container containing a beverage supplied from the beverage supply unit.

Two or more of the provision sections are provided at the front face and the side face.

The transfer section transfers, to the two or more provision sections, containers each containing a beverage supplied from the beverage supply unit.

Also, preferably, the beverage supply unit extracts coffee.

Advantageous Effects of Invention

As described above, the invention can provide a beverage providing device capable of reducing the waiting time of a purchaser.

DESCRIPTION OF EMBODIMENTS

Hereinafter, the first embodiment will be described using the drawings (see FIGS. 1 to 10 and 35 to 39).

Note that embodiments are not limited to the following embodiments. In addition, the content described in one embodiment is likewise applied to other embodiments in principle. Further, each embodiment and each modification example can be appropriately combined.

Figure 1:
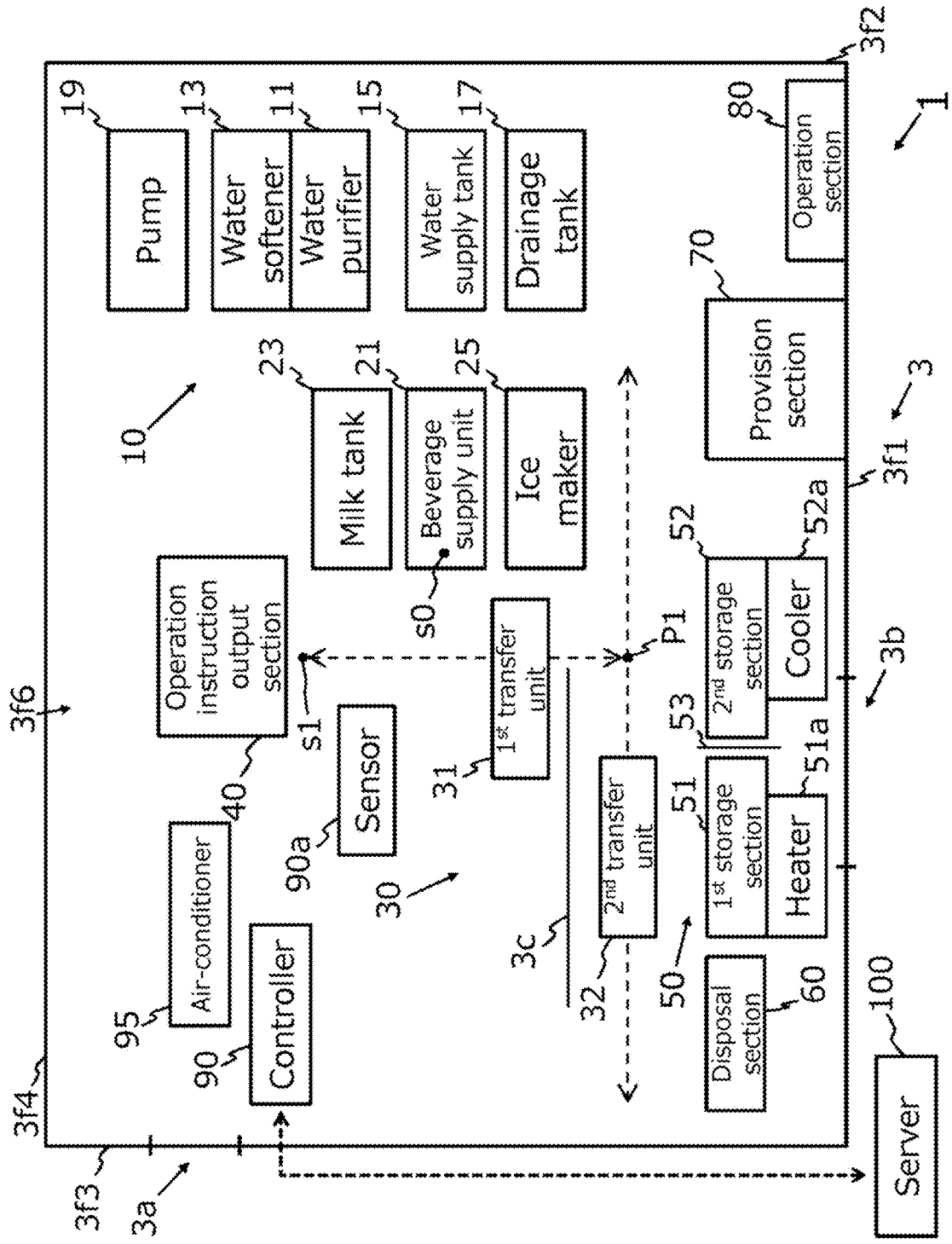
FIG. 1 is a configuration diagram illustrating each member of a beverage providing device according to a first embodiment.

A beverage providing device 1 of the first embodiment includes a housing 3, a beverage generator 10, a transfer section 30, an operation instruction output section 40, a storage section 50, a disposal section 60, a provision section 70, an operation section 80, and a controller 90, an air-conditioner 95 and a server 100 (see FIG. 1).

To explain the directions, the horizontal direction (left-right direction) is set to x direction, another horizontal direction (front-rear direction) perpendicular to the x direction is set to y direction, and a direction (vertical direction) perpendicular to the x and y directions is set to z direction.

Figure 2:
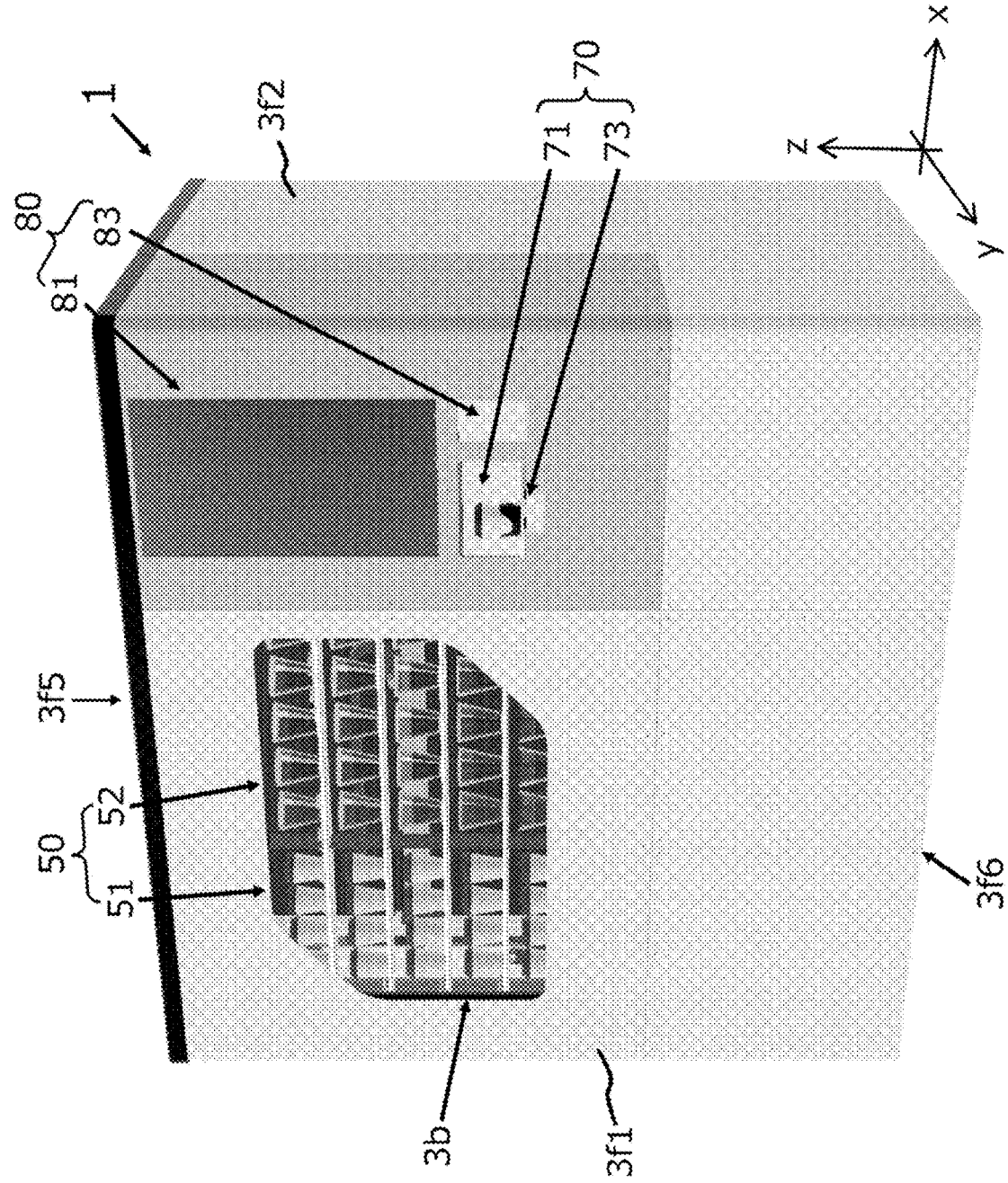
FIG. 2 is a perspective view of the beverage providing device according to the first embodiment as viewed from the front right.
Figure 3:
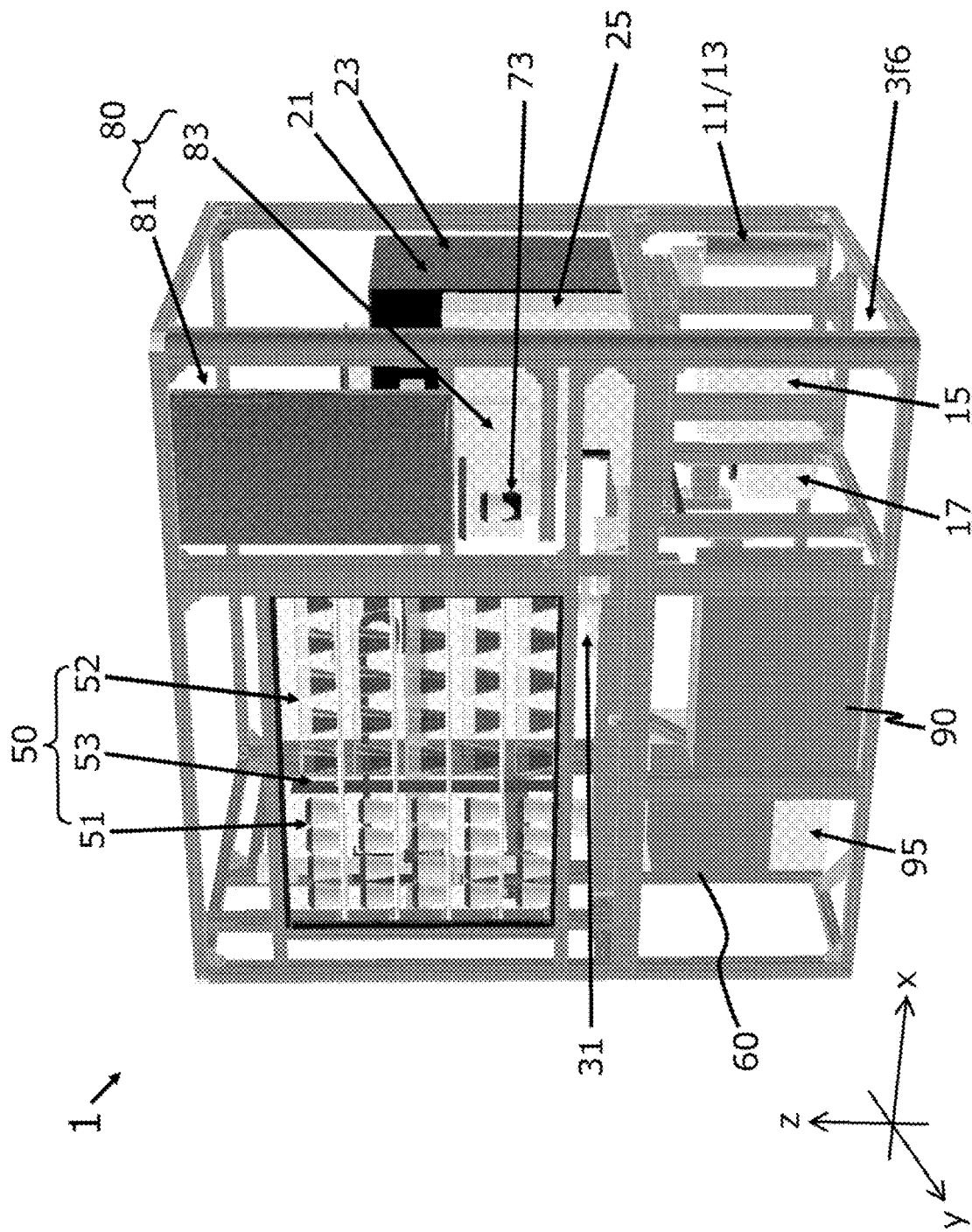
FIG. 3 is a perspective view of the beverage providing device without outer walls according to the first embodiment as viewed from the front right.
Figure 4:
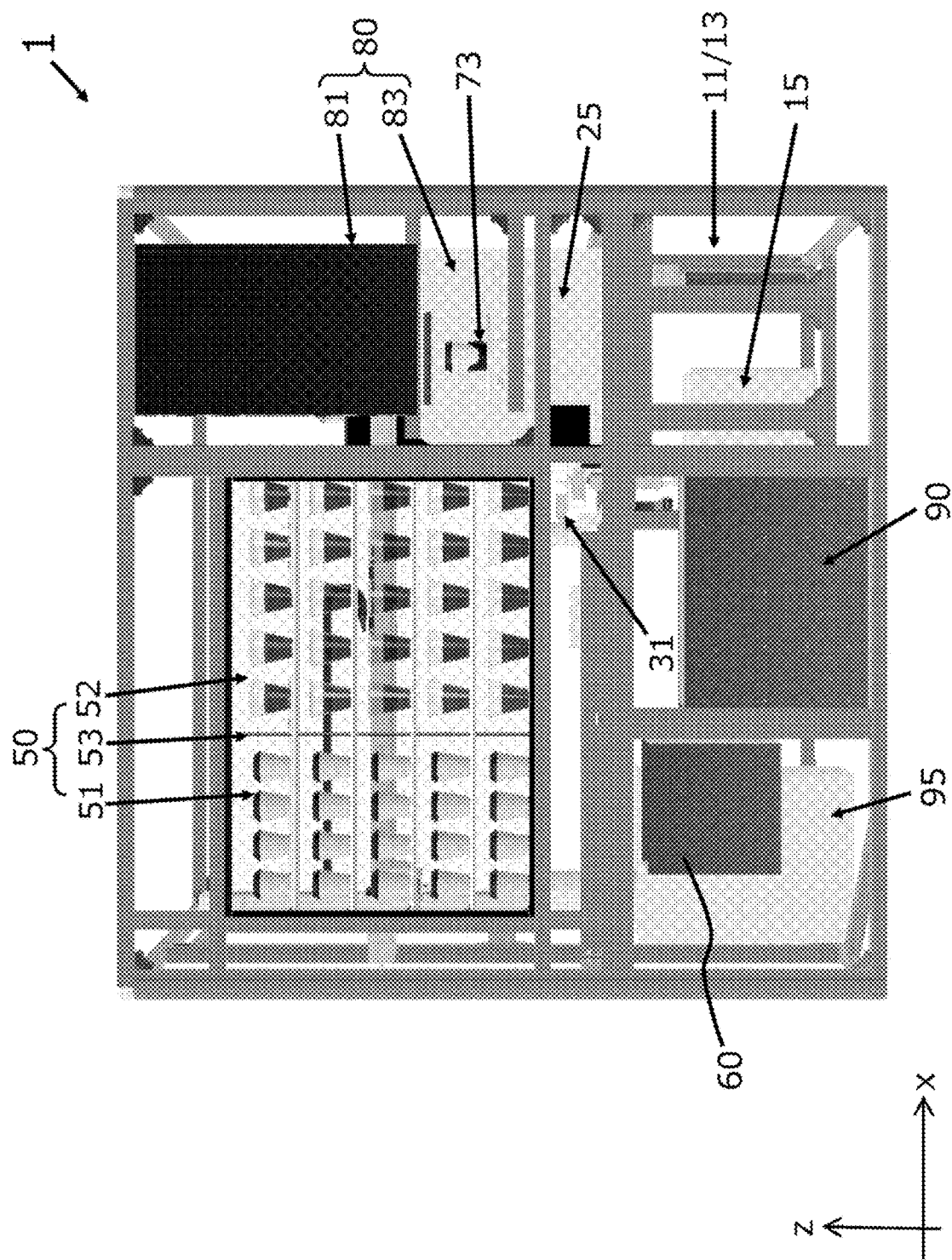
FIG. 4 is a view of the beverage providing device without outer walls according to the first embodiment as viewed from the front.
Figure 5:
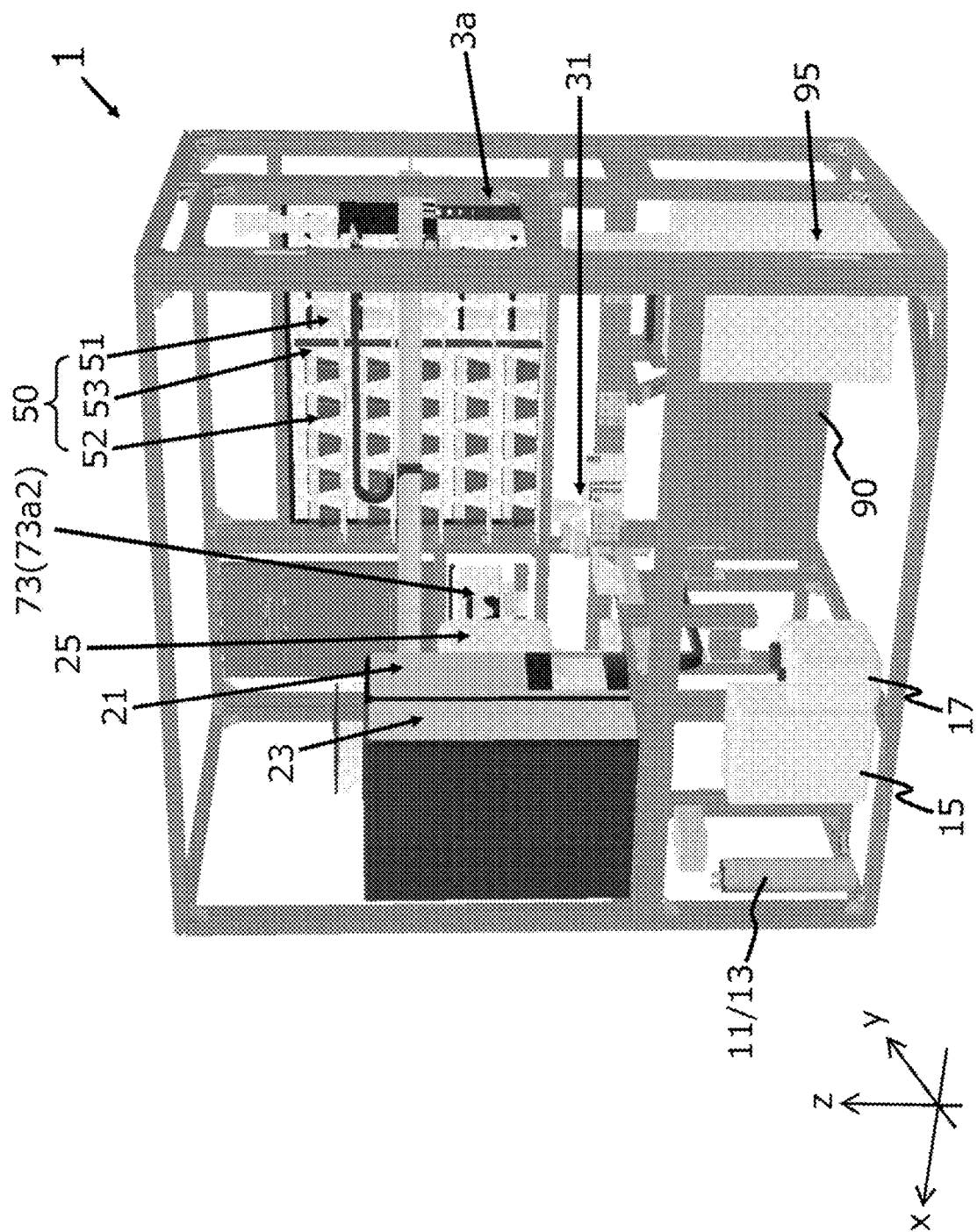
FIG. 5 is a perspective view of the beverage providing device without outer walls according to the first embodiment as viewed from the left rear.
Figure 6:
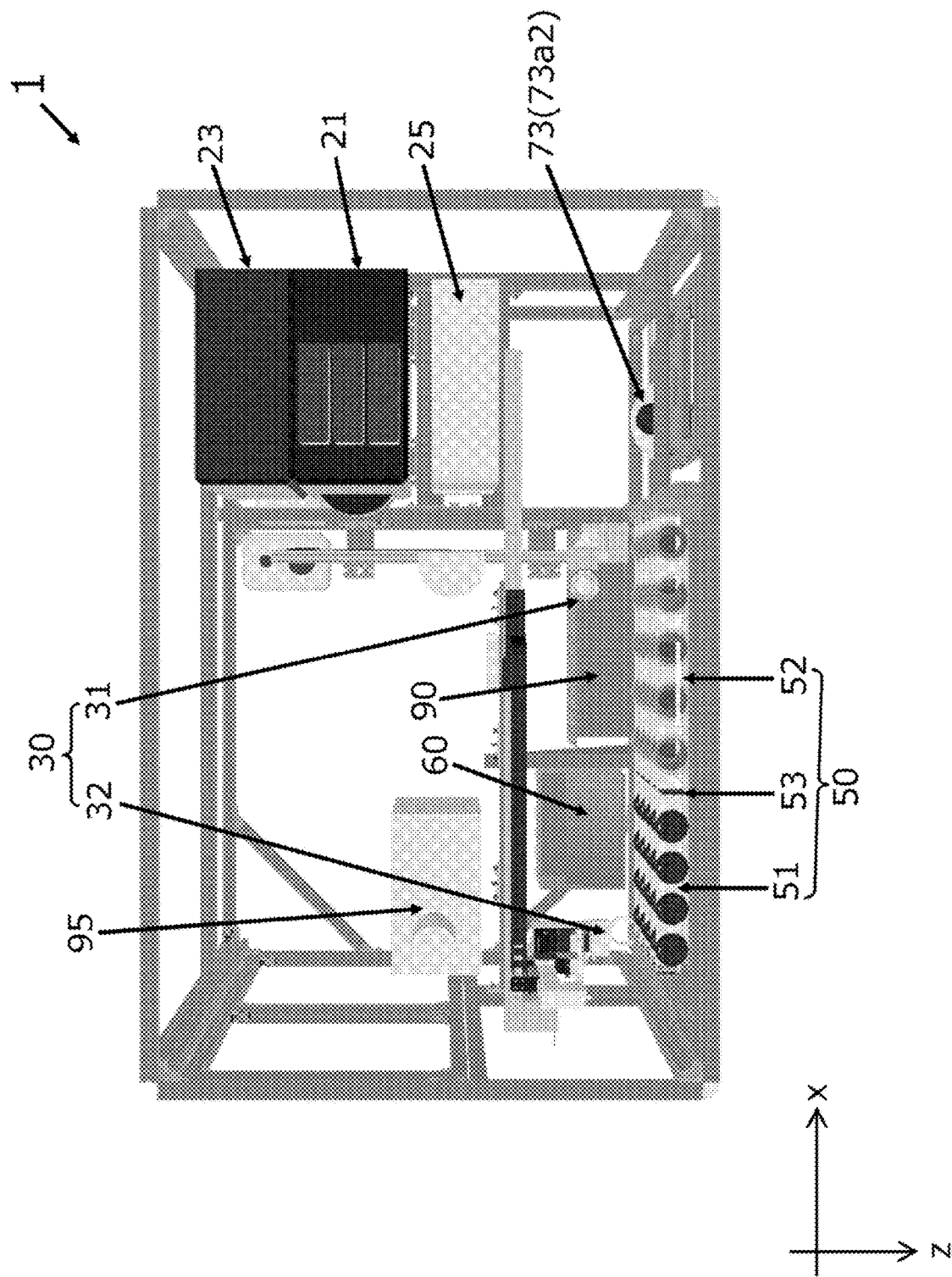
FIG. 6 is a view of the beverage providing device without outer walls according to the first embodiment as viewed from the top.

In FIG. 2, the directions indicated by the arrows on the respective xyz axes are defined as the right direction, the front direction, and the upward direction, respectively.

Further, in order to explain the internal structure of the housing 3, outer walls and some frames are omitted in FIGS. 3 to 6 and 36 to 39.

(Housing 3)

The housing 3 houses the beverage generator 10, the transfer section 30, the operation instruction output section 40, the storage section 50, the disposal section 60, the provision section 70 (at least part thereof), the operation section 80 (at least part thereof), and the controller 90, and the air-conditioner 95.

A carry-in/carry-out port 3a including an opening/closing door is provided at the side face (right side face 3/2 or left side face 3/3) or a rear face 3/4 of the housing 3.

The carry-in of coffee materials and the carry-out of waste which are used in the beverage providing device 1 are performed through the carry-in/carry-out port 3a.

An outlet 71 of the provision section 70 and a display unit 81 and a payment unit 83 of the operation section 80 are provided at a front face 3/1 of the housing 3.

The front face 3/1 of the housing 3, where a first storage section 51 and a second storage section 52 are provided, has a display window 3b including a transparent panel so that at least part of the first storage section 51 and the second storage section 52 is visible. (see FIGS. 2 and 35).

The beverage generator 10, the transfer section 30, the storage section 50, and the disposal section 60 are arranged inside the housing 3, that is, in an area surrounded by the front face 3/1 of the housing 3, the side face of the housing 3 (one of the right side face 3/2 or the left side face 3/3 of the housing 3), a plane (e.g., the rear face 3/4 of the housing 3) parallel to the front face 3/1, and a plane (e.g., the other of the right side face 3/2 or the left side face 3/3 of the housing 3) parallel to that side face.

The area has an inner wall 3c (see FIG. 1).

The inner wall 3c has a surface perpendicular to the y direction, and at least part of the storage section 50 and at least part of a second transfer unit 32 are in a positional relationship of being sandwiched in the y direction by the display window 3b and the inner wall 3c.

The display window 3b and the inner wall 3c may be used to hide an area (area behind the inner wall 3c in the y direction) that is of the beverage providing device 1 and is not desired to be seen from the outside, while the storage section 50 and the second transfer unit 32, which are in an area in front of the inner wall 3c in the y direction, can be made visible from the outside.

The first embodiment illustrates an example in which the outer frame of the housing 3 is structured a substantially hexahedron having the front face 3/1, the right side face 3/2, the left side face 3/3, the rear face 3/4, an upper face 3/5, and a lower face 3/6. However, it suffices if there are outer walls including at least the front face 3/1 and the side face (one of the right side face 3/2 or the left side face 3/3). A wall, a floor, or the like fixed to the place where the beverage providing device 1 is installed may function as a side face (the other of the right side face 3/2 or the left side face 3/3), the rear face 3/4, or the lower face 3/6.

Further, the upper face 3/5 of the housing 3 may be omitted in some embodiments.

(Beverage Generator 10)

The beverage generator 10 is provided inside the housing 3, and on the rear side in the y direction (see FIGS. 3 to 6 and 36 to 39).

Specifically, the beverage generator 10 is arranged apart from the front face 3/1 of the housing 3 in the front-rear direction, compared to the storage section 50.

The beverage generator 10 includes a water purifier 11, a water softener 13, a water supply tank 15, a drainage tank 17, a pump 19, a beverage supply unit (coffee maker) 21, a milk tank 23, and an ice maker 25.

In order to explain an effect, an example will be described in which the beverage supplied from the beverage supply unit 21 is coffee, which is a beverage that takes a relatively long time to be extracted. Said effect includes that the waiting time for a purchaser to pick up a container containing a beverage being purchased can be shortened.

However, the beverage supply unit 21 may be a unit for supplying another beverage.

(Water Purifier 11)

The water purifier 11 is a water treatment apparatus for executing a purification step of reducing dissolved substances in water that has been supplied from the water supply tank 15.

(Water Softener 13)

The water softener 13 is a water treatment apparatus for executing a water softening step of replacing, by sodium ions, cations such as calcium ions and magnesium ions in water that has been supplied from the water purifier 11.

Water that has undergone the purification step of the water purifier 11 and the water softening step of the water softener 13 is used to extract coffee by the beverage supply unit 21, make ice by the ice maker 25, clean the beverage supply unit 21, clean the milk tank 23, and clean the ice maker 25, etc.

However, water used for cleaning the beverage supply unit 21, the milk tank 23, and the ice maker 25 may be water before treated by the water purifier 11 and the water softener 13.

The water purifier 11 and the water softener 13 may be integrated or may be separately structured.

FIGS. 3 to 5 and 36 to 38 show an example in which the water purifier 11 and the water softener 13 are integrated.

(Water Supply Tank 15 and Drainage Tank 17)

In the water supply tank 15, water to be supplied to the water purifier 11 is stored.

In the drainage tank 17, drainage after cleaning of the beverage supply unit 21 and drainage from the ice maker 25 are stored.

(Pump 19)

The pump 19 sucks water up from the water supply tank 15 and sends it to the water purifier 11.

In addition, the pump 19 sends water from the water purifier 11 to the water softener 13.

Further, the pump 19 sends water from the water softener 13 to the beverage supply unit 21 and the ice maker 25.

Note that a tap water faucet and the water purifier 11 may be in communication, and the water pressure of tap water may be used to send water from the faucet to the water purifier 11, water from the water purifier 11 to the water softener 13, and water from the water softener 13 to the beverage supply unit 21 and the ice maker 25 in some embodiments.

In this case, the water supply tank 15 and the pump 19 may be omitted.

(Beverage Supply Unit 21)

The beverage supply unit 21 executes a roasting step, a grinding step, and an extraction step so as to extract coffee from coffee beans while using water supplied from the water softener 13 (water that has undergone the purification step and the water softening step) and to supply the coffee into a container placed at a predetermined position s0 in the beverage supply unit 21.

The beverage supply unit 21 can be used to extract a plurality of types of coffee, and the beverage supply unit 21 is provided with selection buttons 21a (see FIG. 8) for selecting the plurality of types of coffee.

The first embodiment illustrates an example in which the beverage supply unit 21 is provided with the selection buttons 21a for selecting four types of coffee (hot coffee with milk, hot coffee without milk, cold coffee with milk, and cold coffee without milk) and others.

(Milk Tank 23)

In the milk tank 23, milk to be supplied to a container containing coffee is stored.

The milk tank 23 is installed near the beverage supply unit 21 and is in communication with the beverage supply unit 21 to supply milk to the beverage supply unit 21.

When coffee with milk is selected as the type of coffee to be supplied by the beverage supply unit 21, the beverage supply unit 21 supplies milk from the milk tank 23 together with the coffee to the container.

However, in some embodiments, the milk in the milk tank 23 may be automatically supplied to the container directly from the milk tank 23 without going through the beverage supply unit 21, or may be manually supplied from the milk tank 23 to the container by a worker described later.

One of the beverage supply unit 21 or the milk tank 23 may be equipped with a whisk for whipping milk, and the resulting whipped milk may be supplied to the container.

(Ice Maker 25)

The ice maker 25 makes ice by using water supplied from the water softener 13 (water that has undergone the purification step and the water softening step).

(Manual Operation)

A worker manually works to place a container at the predetermined position s0 in the beverage supply unit 21, operate the selection button(s) 21a of the beverage supply unit 21, charge ice made by the ice maker 25 into the container, remove the container containing an extracted beverage from the beverage supply unit 21, attach a lid to the container, and place the removed container at a transfer start position s1 of the first transfer unit 31.

The selection button(s) 21a of the beverage supply unit 21 is manually operated by the worker in accordance with instruction details output to the operation instruction output section 40 described later.

However, these operations may also be performed by a machine such as a robot in some embodiments.

For instance, an embodiment can be conceived in which the ice maker 25 is in communication with the beverage supply unit 21 and supplies ice made by the ice maker 25 to the beverage supply unit 21, and the beverage supply unit 21 then supplies the ice and coffee to a container.

In addition, for instance, an embodiment may be conceived in which the first transfer unit 31 grips the container containing coffee at the predetermined position s0 in the beverage supply unit 21 and transfers it to a relay point P1. In this case, the predetermined position s0 and the transfer start position of the first transfer unit 31 are the same.

In the second embodiment described later, these operations are automatically performed by a selection button manipulator 21b or the like.

(Transfer Section 30)

The transfer section 30 transfers the container containing the beverage supplied from the beverage supply unit 21 to either one of the storage section 50, the disposal section 60, or the provision section 70.

The transfer section 30 has a first transfer unit 31 and the second transfer unit 32.

(First Transfer Unit 31)

The first transfer unit 31 is a transfer device which grips a container and moves the gripped container mainly in the y direction.

Specifically, the first transfer unit 31 transfers the container containing coffee extracted by the beverage supply unit 21 to the relay point P1 on the front side in the y direction.

However, in order to grip the container and mount the gripped container, the first transfer unit 31 can be used to move the gripped container in the x direction or the z direction as well.

(Second Transfer Unit 32)

The second transfer unit 32 is a transfer device which grips a container and moves the gripped container mainly in the x direction and the z direction.

Specifically, the second transfer unit 32 transfers the coffee-containing container, which has been delivered to the relay point P1, to the disposal section 60 on the left side in the x direction, transfers it to the first storage section 51, transfers it to the second storage section 52, or transfers it to a provision section-side turntable 73 of the provision section 70 on the right side in the x direction.

The second transfer unit 32 transfers the gripped container not only in the x direction but also in the z direction in order to move the gripped container to a predetermined position in the first storage section 51 or the second storage section 52.

In addition, the second transfer unit 32 can transfer the gripped container also in the y direction in order to grip the container and mount the gripped container.

By using two transfer devices (first transfer unit 31 and second transfer unit 32), transportation of the container containing the beverage supplied from the beverage supply unit 21 and transportation of the container held in the storage section 50 can be simultaneously processed to improve operational efficiency.

The first transfer unit 31 and the second transfer unit 32 are arranged such that the transfer range of the first transfer unit 31 and the transfer range of the second transfer unit 32 overlap in an area including the relay point P1.

The transfer ranges of the two transfer units are made to partially overlap. Thus, the beverage providing device 1 can be made smaller than the form in which the first transfer unit 31 and the second transfer unit 32 are arranged so as not to overlap the transfer range of the first transfer unit 31 with the transfer range of the second transfer unit 32.

Details of the movement control of the first transfer unit 31 and the second transfer unit 32 will be described later.

The details of the movement control of preventing the collision between the first transfer unit 31 and the second transfer unit 32 will be described later.

(Operation Instruction Output Section 40)

The operation instruction output section 40 outputs information about work instructions to a worker on the basis of instruction information from the controller 90.

This embodiment illustrates an example in which the operation instruction output section 40 is a display device for displaying information about work instructions (the first work instruction to the fifth work instruction). However, the operation instruction output section 40 may be an audio output device for issuing information about work instructions or may be serve as both the display device and the audio output device.

In this embodiment, the operation instruction output section 40 outputs, on the basis of instruction information from the controller 90, information on at least one instruction selected from the type of beverage to be next supplied to the beverage supply unit 21, replenishment of materials used in the beverage supply unit 21, cleaning of the beverage supply unit 21, or cleaning of the disposal section 60.

Details of the instruction information will be described later.

For instance, the operation instruction output section 40 displays instruction information for designating the type of coffee to be next supplied from the beverage supply unit 21.

The details of the instruction information displayed on the operation instruction output section 40 will be described later.

(Specific Configuration of Operation Instruction Output Section 40)

Figure 9:
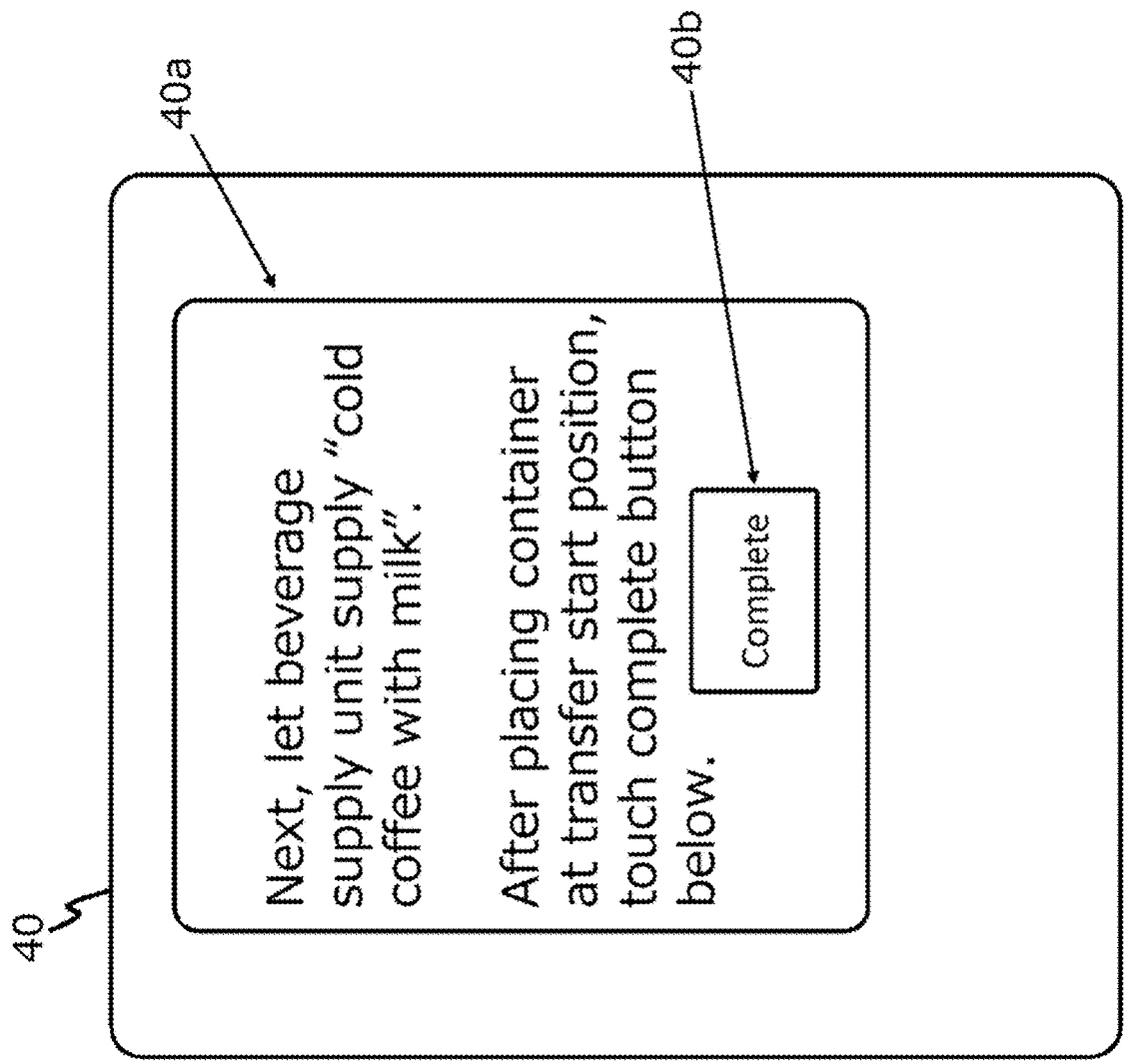
FIG. 9 is a configuration diagram of an operation instruction output section composed of a touch panel-type display device.

The operation instruction output section 40 is composed of a touch panel-type display device having a display area 40a and an input area 40b (see FIG. 9). The display area 40a displays information about a work instruction(s). The input area 40b is for inputting the fact that a worker has completed a work corresponding to the work instruction (first completion report information to fifth completion report information).

However, the operation instruction output section 40 may be configured using another device.

Figure 10:
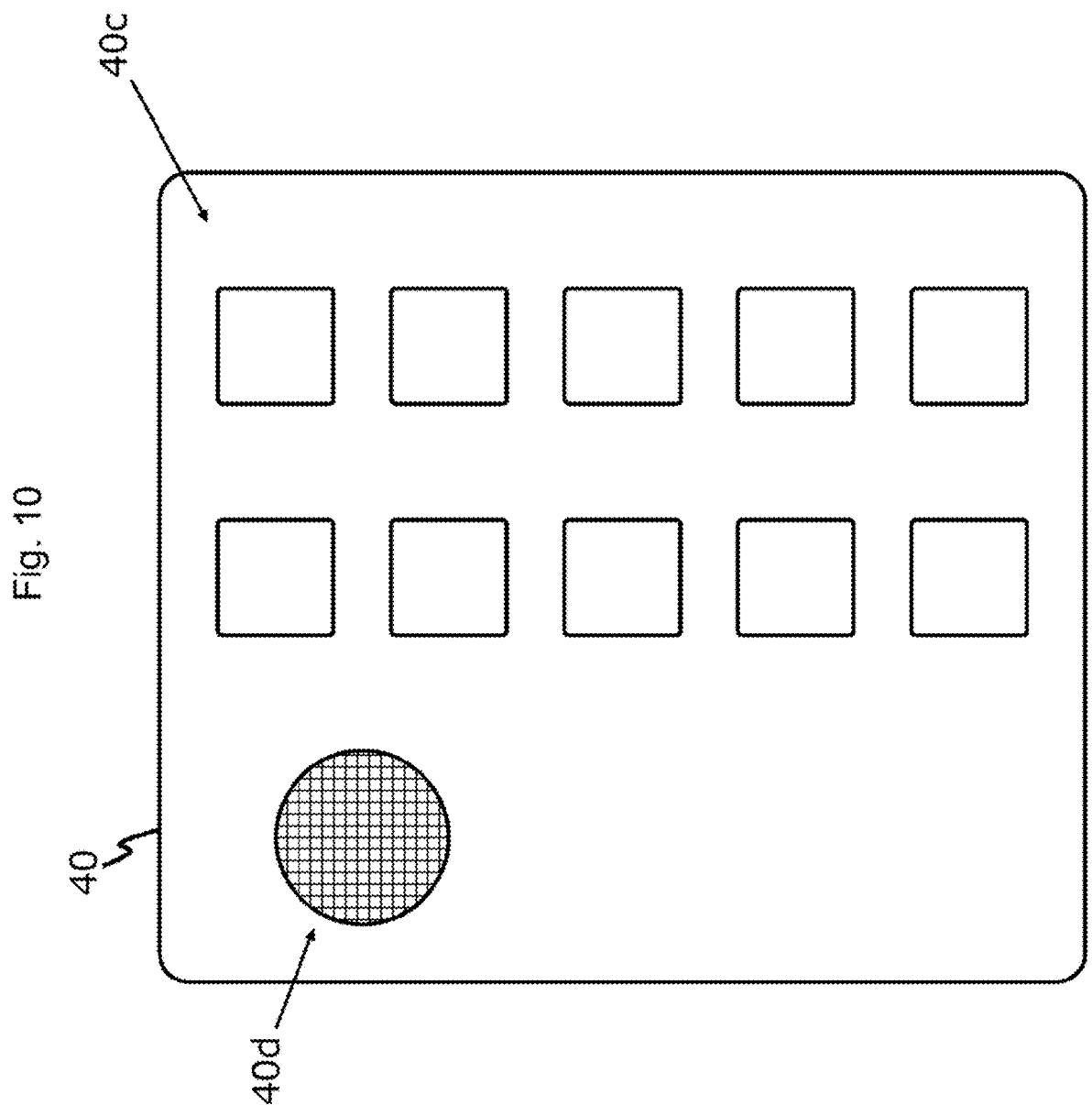
FIG. 10 is a configuration diagram of an operation instruction output section composed of physical buttons and a speaker.

For instance, as shown in FIG. 10, the operation instruction output section 40 may include a first output unit 40c and a second output unit 40d in some embodiment.

The first output unit 40c has a lighting-equipped button(s) in the same arrangement as for the selection button(s) 21a of the beverage supply unit 21.

When the first work instruction should be carried out, one of the lighting-equipped buttons of the first output unit 40c lights up, and a voice for notifying that the first work instruction should be carried out is output from the second output unit 40d.

For instance, in the case where the upper left button of the selection buttons 21a of the beverage supply unit 21 is a button for selecting "cold coffee with milk" and where the coffee to be next supplied by the beverage supply unit 21 is "cold coffee with milk", the controller 90 lights up the upper left lighting-equipped button on the first output unit 40c in the operation instruction output section 40.

The worker operates a selection button 21a corresponding to the lighting-equipped button to have the beverage supply unit 21 extract the designated coffee.

The designated beverage can be identified by turning on light of one of the lighting-equipped buttons in the same arrangement as for the selection buttons 21a. This makes it possible for the worker to understand the instruction details more easily than in the case of receiving the instruction by text or voice.

After having moved the container containing the extracted coffee from the predetermined position s0 to the transfer start position s1, the worker operates the lit lighting-equipped button of the first output unit 40c and then turns it off.

By operating the lit lighting-equipped button of the first output unit 40c, the input of the first completion report information is completed. That is, in the operation instruction output section 40 shown in FIG. 10, the first output unit 40c functions as the display area 40a and the input area 40b.

(Storage Section 50)

The storage section 50 has an area for holding two or more containers, each containing coffee supplied from the beverage supply unit 21 in a covered state.

The storage section 50 has the first storage section (first stocker) 51, the second storage section (second stocker) 52, and a partition wall 53.

The first storage section 51 has a plurality of shelves and is used to hold the container containing hot coffee extracted by the beverage generator 10.

Each of the shelves in the first storage section 51 extends in the x direction and is aligned in the z direction in a state where each container containing coffee can be mounted.

In this embodiment, the first storage section 51 is exemplified by aligning, in the z direction, five shelves on which four containers can be mounted side by side in the x direction.

The first storage section 51 is equipped with a heater (warmer) 51a for keeping each container mounted on the shelf in the first storage section 51 warm.

The second storage section 52 has a plurality of shelves and is used to hold the container containing cold coffee extracted by the beverage generator 10.

Each of the shelves in the second storage section 52 extends in the x direction and is aligned in the z direction in a state where each container containing coffee can be mounted.

In this embodiment, the second storage section 52 is exemplified by aligning, in the z direction, five shelves on which five containers can be mounted side by side in the x direction.

The second storage section 52 is equipped with a cooler (cold retention device) 52a for keeping each container mounted on the shelf in the second storage section 52 cold.

The partition wall 53 is composed of a heat insulating member and is provided between the first storage section 51 and the second storage section 52.

The partition wall 53 is used to prevent heat of the first storage section 51 from being transferred to the second storage section 52.

By holding each container containing the beverage supplied from the beverage supply unit 21 in the first storage section 51 including the heater 51a, warm state can be kept.

By holding each container containing the beverage supplied from the beverage supply unit 21 in the second storage section 52 including the cooler 52a, cold state can be kept.

Providing the partition wall 53 between the first storage section 51 and the second storage section 52 makes it possible to prevent heat transfer from the first storage section 51 to the second storage section 52 and heat transfer from the second storage section 52 to the first storage section 51.

(Disposal Section 60)

The disposal section 60 is a trash can for disposal of each container that contains coffee and is held in the storage section 50 and for which the elapsed time after supplied from the beverage supply unit 21 or the elapsed time after held in the storage section 50 has passed a first time t1 (e.g., t1=20 min).

The disposal section 60 is provided below the storage section 50.

The transfer of the container from the first storage section 51 to the disposal section 60 and the transfer of the container from the second storage section 52 to the disposal section 60 are performed by the second transfer unit 32.

Of the beverages supplied from the beverage supply unit 21, those that have reached a certain period of time are discarded together with their container.

This can avoid providing a purchaser with a deteriorated beverage.

Since the disposal section 60 is arranged near the storage section 50, it is possible to efficiently dispose of any container held in the storage section 50 by using the second transfer unit 32 with a short transfer distance.

(Provision Section 70)

The provision section 70 is an area where a purchaser picks up a container containing coffee being purchased, and has an outlet 71 and a provision section-side turntable 73.

The first storage section 51, the second storage section 52, and the provision section 70 are aligned in the x direction.

The outlet 71 is an opening provided at the front face 3/1 of the housing 3.

The container containing the beverage supplied from the beverage supply unit 21 is made ready to be picked up through the outlet 71 from the side (the outer side of the housing 3) that is at the front face 3/1 of the housing 3 and is opposite to the side of the beverage generator 10, the transfer section 30, and the storage section 50.

The provision section-side turntable 73 has a circular pedestal 73a and a wall 73b standing on the pedestal 73a.

The pedestal 73a can rotate around an axis parallel to the z direction, and is provided with two mounting areas (first mounting area 73a1 and second mounting area 73a2) positioned to sandwich said rotation axis.

The pedestal 73a rotates such that one of the mounting areas (e.g., the first mounting area 73a1) is positioned outwardly of the outlet 71 in the housing 3, and the other of the mounting areas (e.g., the second mounting area 73a2) is positioned inwardly of the outlet 71 in the housing 3.

The wall 73b is used to close the outlet 71 in order to prevent intrusion from the outside to the inside of the housing 3 through the outlet 71.

FIGS. 5, 6, 38, and 39 show a state in which the second mounting area 73a2 is positioned inwardly of the outlet 71 in the housing 3.

Figure 7:
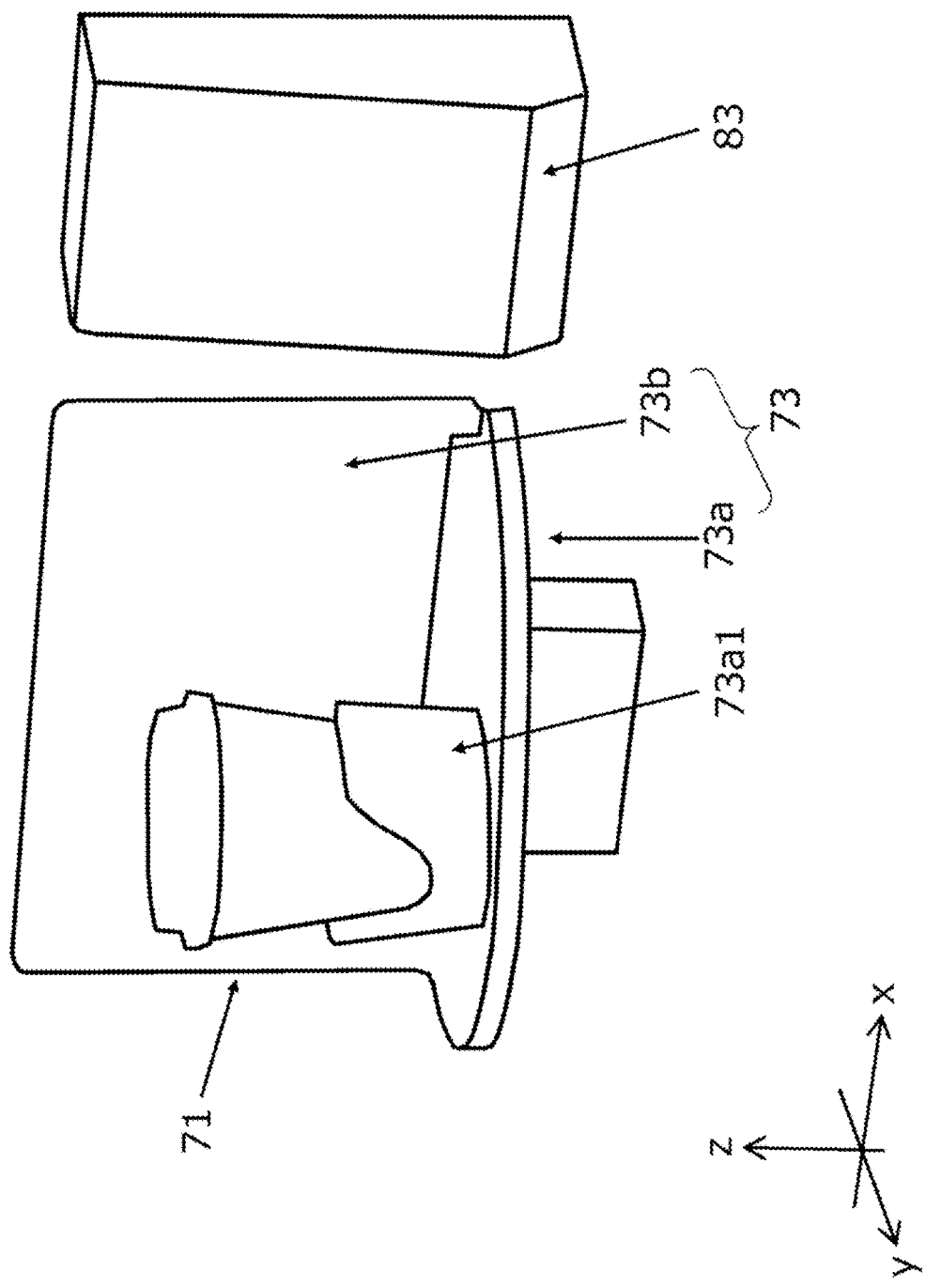
FIG. 7 is a perspective view of an outlet, a provision section-side turntable, and a payment unit as viewed from the front right.
Figure 8:
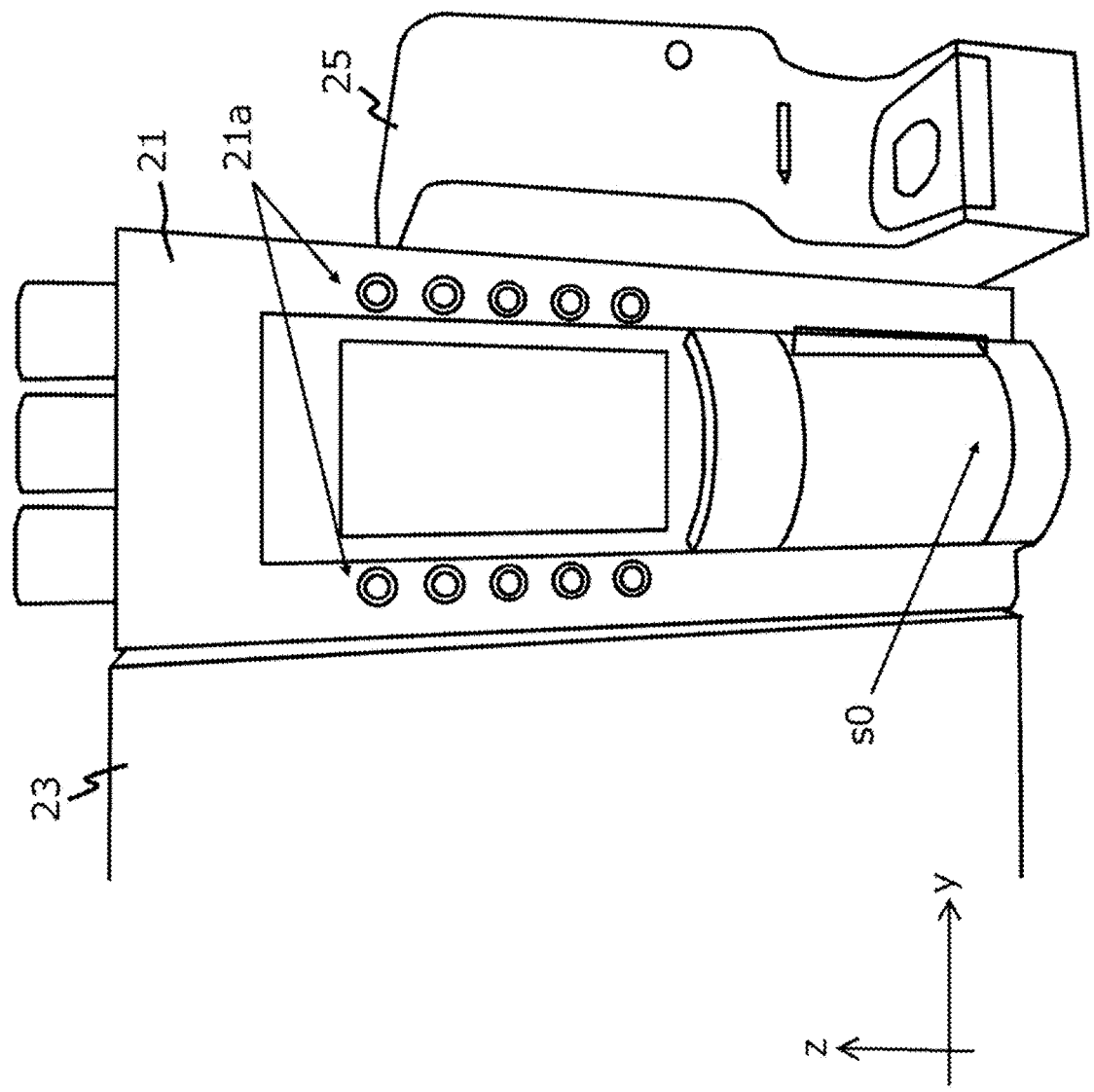
FIG. 8 is a view of a beverage supply unit as viewed from the front.

FIG. 7 shows a state in which the first mounting area 73a1 is positioned outwardly of the outlet 71 in the housing 3.

When the first mounting area 73a1 is positioned inwardly of the outlet 71 in the housing 3 and the second mounting area 73a2 is positioned outwardly of the outlet 71 in the housing 3, the second transfer unit 32 mounts the coffee-containing container on the first mounting area 73a1.

Then, once a purchaser completes payment via the payment unit 83 while the container is being mounted in the first mounting area 73a1, the pedestal 73a rotates, and the second mounting area 73a2 is positioned inwardly of the outlet 71 in the housing 3 and the first mounting area 73a1 is positioned outwardly of the outlet 71 in the housing 3.

This enables the purchaser to pick up the container mounted on the first mounting area 73a1.

Since the first storage section 51, the second storage section 52, and the provision section 70 are aligned in the x direction, the second transfer unit 32 that is movable in the x direction may be used to reciprocate the container between these sections.

The provision section-side turntable 73 provided in the provision section 70 rotates so as to be able to quickly move the container carried by the second transfer unit 32 to the side where the purchaser is situated.

In addition, the wall 73b provided on the provision section-side turntable 73 makes it possible to prevent intrusion from the outside through the outlet 71.

(Operation Section 80)

The operation section 80 is provided on at least one of the front face 3/1 or the side face (the right side face 3/2 or the left side face 3/3) of the housing 3, and has the display unit 81 and the payment unit 83.

This embodiment is exemplified by providing the front face 3/1 of the housing 3 with the operation section 80.

The display unit 81 displays a screen for selecting the type of coffee to be purchased by a purchaser and a payment method.

A beverage type selection step and a payment type selection step are executed by operating a predetermined button provided on the screen (or around the display unit 81) while the purchase checks the details displayed on the display unit 81. In the beverage type selection step, the type of beverage (the type of coffee) to be supplied from the beverage supply unit 21 is selected. In the payment type selection step, a payment method such as the kind of electronic money is selected.

The payment unit 83 is a reader which reads information about electronic money from an electronic money payment means such as an IC card or a mobile terminal.

In this embodiment, a mode is explained in which payment for serving a beverage (coffee) supplied by the beverage supply unit 21 is made with electronic money. Another mode may be such that payment for serving a beverage (coffee) supplied by the beverage supply unit 21 is made with cash.

In this case, the payment unit 83 is provided with a cash slot(s) for inserting banknotes or coins.

(Controller 90)

The controller 90 controls each section/unit of the beverage providing device 1, such as control of the operation instruction output section 40 as described later.

(Control of Operation Instruction Output Section 40)

The controller 90 controls the operation instruction output section 40 to output information about work instructions.

Next, the controller 90 controls the operation instruction output section 40 to output the type of beverage to be supplied by the beverage supply unit 21 as information about the first work instruction.

For instance, if coffee to be supplied by the beverage supply unit 21 is "cold coffee with milk", the controller 90 controls the operation instruction output section 40 to display, as the first work instruction, "Next, please let the beverage supply unit 21 supply cold coffee with milk" (see FIG. 9).

When any of the selection buttons 21a of the beverage supply unit 21 is operated and the transfer of the extracted coffee-containing container from the predetermined position s0 to the transfer start position s1 is then completed, a worker inputs, into the operation instruction output section 40, the first completion report information indicating the fact that these operations have been completed. The first completion report information is transmitted to the controller 90, and the controller 90 then calculates the timing when the next first work instruction is given.

(Control of Coffee Generation Instruction Through Operation Instruction Output Section 40)

The type of beverage supplied from the beverage supply unit 21, namely, the type of coffee is determined on the basis of the number of coffee containers held in the first storage section 51 and the second storage section 52, the past sales performance, or the like.

Specifically, the type of coffee supplied by the beverage supply unit 21 does not necessarily correspond to the type of coffee selected by a purchaser who has used the display unit 81 in the operation section 80.

The past sales performance may be the sales performance of the past several hours or the sales performance of each time zone of the past several days.

For instance, in the case where the number of milk-containing hot coffee containers held in the first storage section 51 is less than a container count threshold, the controller 90 makes the operation instruction output section 40 display to be supplied the milk-containing hot coffee by the beverage supply unit 21, as information about the first work instruction.

In addition, the type of coffee to be supplied by the beverage supply unit 21 may be determined in consideration of the temperature, events to be held around the beverage providing device 1, the number of people around the beverage providing device 1, or the like.

For instance, if the temperature is lower than a temperature threshold, the controller 90 makes the operation instruction output section 40 output information about the first work instruction so that a large number of hot coffee containers are stored in the first storage section 51.

These determinations may be made by the controller 90 or by an external server 100 which communicates with the controller 90 in some embodiments.

Further, the controller 90 makes the operation instruction output section 40 output information about the first work instruction on the basis of the number of coffee containers stored in the first storage section 51 and the second storage section 52, the past sales performance, or the like. Then, the controller 90 controls an interval until information about the next first work instruction is output by the operation instruction output section 40, namely a time interval for coffee extraction.

Before the time zone during which the sales volume is large, for instance, before lunch break, said interval is shortened so that a large amount of coffee can be supplied. In the time zone where the sales volume is small, for instance, in midnight, said interval is made longer so as to reduce the supply amount of coffee.

(Control or the Like of Instruction for Coffee Bean Replenishment Through Operation Instruction Output Section 40)

Based on the quantity of coffee supplied from the beverage supply unit 21, the work time, or the like, the controller 90 makes the operation instruction output section 40 output an instruction for coffee bean replenishment, an instruction for disposal of coffee powder after the extraction step, and an instruction for cleaning of the beverage supply unit 21, as information about the second work instruction.

The quantity of coffee supplied from the beverage supply unit 21 may be calculated by (touching the input area 40*b*) inputting the first completion report information, into the operation instruction output section 40 by a worker. The first completion report information indicates the fact that the operation or the like on any of the relevant selection buttons 21*a* of the beverage supply unit 21, has been completed. Alternatively, said quantity may be calculated from the number of containers transferred by the first transfer unit 31 described later or may be calculated from the number of times of coffee extraction counted by the beverage supply unit 21.

When replenishment of coffee beans, disposal of coffee powder, cleaning of the beverage supply unit 21, or the like is completed, the worker inputs, into the operation instruction output section 40, the second completion report information indicating the fact that these operations have been completed. The second completion report information is transmitted to the controller 90, and the controller 90 then calculates the timing of instructing the next coffee bean replenishment, etc.

(Control or the Like of Instruction for Milk Replenishment Through Operation Instruction Output Section 40)

The controller 90 calculates the amount of milk consumed on the basis of the volume of milk-containing coffee supplied from the beverage supply unit 21, the amount of milk supplied from the milk tank 23 to the beverage supply unit 21, or the like. Then, the controller 90 makes the operation instruction output section 40 output a milk replenishment instruction or a milk replacement instruction, as information about a third work instruction.

The milk consumption may be calculated by inputting, into the operation instruction output section 40 by a worker, the first completion report information indicating the fact that the operation on any of the relevant selection buttons 21*a* of the beverage supply unit 21 has been completed. Alternatively, said quantity may be calculated from the number of containers transferred by the first transfer unit 31 described later or may be calculated from the number of times of coffee extraction counted by the beverage supply unit 21.

When the replenishment or replacement of milk is completed, the worker inputs, into the operation instruction output section 40, the third completion report information indicating the fact that the work has been completed. The third completion report information is transmitted to the controller 90, and the controller 90 then calculates the timing when the next milk replenishment instruction or the like is given.

(Control of Instruction for Cleaning of Ice Maker Through Operation Instruction Output Section 40)

Based on the volume or the like of cold coffee supplied from the beverage supply unit 21, the controller 90 makes the operation instruction output section 40 output an instruction for cleaning of the ice maker 25, as information about a fourth work instruction.

When the cleaning of the ice maker 25 is completed, the worker inputs, into the operation instruction output section 40, the fourth completion report information indicating the fact that the work has been completed. The fourth completion report information is transmitted to the controller 90, and the controller 90 then calculates the timing when an instruction for the next cleaning of the ice maker 25 is given.

(Control of Instruction for Disposal Through Operation Instruction Output Section 40)

Based on the number or the like of containers discarded from the first storage section 51 or the second storage section 52 toward the disposal section 60, the controller 90 makes the operation instruction output section 40 output an instruction for cleaning of the disposal section 60 (instruction for disposal of waste accumulated in the disposal section 60), as information about a fifth work instruction.

When the cleaning of the disposal section 60 is completed, the worker inputs, into the operation instruction output section 40, the fifth completion report information indicating the fact that the work has been completed. The fifth completion report information is transmitted to the controller 90, and the controller 90 then calculates the timing when an instruction for the next cleaning of the disposal section 60 is given.

(Control of First Transfer Unit)

The controller 90 controls the movement of the first transfer unit 31.

Specifically, when a container containing coffee supplied from the beverage supply unit 21 is positioned at the predetermined transfer start position s1, the controller 90 lets the first transfer unit 31 grip said container and deliver it to the relay point P1.

After the container is delivered to the relay point P1, the controller 90 controls the first transfer unit 31 to move the first transfer unit 31 away from an area that includes the relay point P1 and where the transfer range of the first transfer unit 31 and the transfer range of the second transfer unit 32 overlap.

(Control of Second Transfer Unit (Positioning on Shelf, Positioning on Provision Section-Side Turntable 73, Disposal))

The controller 90 controls the movement of the second transfer unit 32.

Specifically, when a container containing hot coffee is positioned at the relay point P1, the controller 90 lets the second transfer unit 32 grip said container and deliver it to the first storage section 51.

The controller 90 records information on the type of coffee (with/without milk) contained in the container delivered to the first storage section 51, information on where to locate in the first storage section 51, and information on the elapsed time.

In addition, when a container containing cold coffee is positioned at the relay point P1, the controller 90 lets the second transfer unit 32 grip said container and deliver it to the second storage section 52.

The controller 90 records information on the type of coffee (with/without milk) contained in the container delivered to the second storage section 52, information on where to locate in the second storage section 52, and information on the elapsed time.

The elapsed time herein is an elapsed time after the beverage is supplied from the beverage supply unit 21 to the container, or an elapsed time after the beverage is mounted in the first storage section 51 or the second storage section 52.

Further, the controller 90 lets the second transfer unit 32 deliver any of the containers mounted in the first storage section 51 or the second storage section 52 to the provision section-side turntable 73.

For instance, in a case where a container containing hot coffee with milk is to be positioned on the provision section-side turntable 73, the controller 90 operates to deliver, to the provision section-side turntable 73, one of the containers that have been mounted in the first storage section 51 and contain hot coffee with milk.

At this time, the controller 90 executes a first selection control to let the second transfer unit 32 deliver, to the provision section-side turntable 73, a container that has been mounted in the first storage section 51 and contains hot coffee with milk and for which said elapsed time is less than the first time t1 but is the longest.

However, the embodiment is not limited to the form of performing the first selection control, and the controller 90 may execute the second selection control to let the second transfer unit 32 deliver, to the provision section-side turntable 73, a container that has been mounted in the first storage section 51 and contains hot coffee with milk and for which said elapsed time is the shortest.

In addition, the first selection control and the second selection control may be switched in response to a purchaser corresponding to a payment means for electronic money made by the payment unit 83.

For instance, the second selection control may be performed for a purchaser whose usage count of the beverage providing device 1 is more than a usage count threshold, and the first selection may be performed for a purchaser whose said usage count is less than or equal to the usage count threshold.

However, the controller 90 may permit the second transfer unit 32 to deliver the gripped container not to the first storage section 51 or the second storage section 52 but directly to the provision section-side turntable 73.

For instance, there is a case where a container containing hot coffee with milk is to be placed on the provision section-side turntable 73, the first storage section 51 has no container containing hot coffee with milk, and a container containing hot coffee with milk may have been placed at the relay point P1. In this case, the controller 90 lets the second transfer unit 32 deliver the gripped container directly to the provision section-side turntable 73.

Further, the controller 90 lets the second transfer unit 32 deliver, to the disposal section 60, any container that has been mounted in the first storage section 51 or the second storage section 52 and for which the elapsed time after the beverage is supplied from the beverage supply unit 21 to the container or the elapsed time after mounted in the first storage section 51 or the second storage section 52 is the first time t1 or more.

The controller 90 is provided below the storage section 50.

It is desirable that the controller 90 has an earth leakage breaker.

In case of occurrence of electric leakage, for instance, when coffee spills from a container and the controller 90 gets wet, the beverage providing device 1 including the controller 90 can be stopped.

(Heater Control and Cooler Control)

The controller 90 controls the operation of the heater 51a such that the first storage section 51 is maintained at the first temperature Te1.

The controller 90 controls the operation of the cooler 52a such that the second storage section 52 is maintained at the second temperature Te2 (Te2<Te1).

(Control of Type of Coffee Delivered to Provision Section-Side Turntable 73)

The type of coffee contained in the container to be delivered to the provision section-side turntable 73 corresponds to the type of coffee selected by a purchaser using the display unit 81 in the operation section 80.

For instance, when the purchaser selects hot coffee with milk by using the display unit 81 in the operation section 80, the controller 90 lets the second transfer unit 32 deliver a container containing hot coffee with milk to the provision section-side turntable 73.

In addition, after the selection of the coffee type is completed using the display unit 81 and before payment corresponding to said selection is completed using the payment unit 83, the transfer section 30 transfers, to the provision section-side turntable 73 in the provision section 70, a container containing coffee that corresponds to said selection and is supplied from the beverage supply unit 21.

If the purchaser changes the coffee to another one after selecting the coffee type and before the payment is completed using the payment unit 83, the controller 90 lets the second transfer unit 32 return the container delivered to the provision section-side turntable 73 to the first storage section 51 or the second storage section 52 and then deliver a container containing the type of coffee after the change to the provision section-side turntable 73.

Further, before the purchaser's selection is completed using the display unit 81 in the operation section 80, the controller 90 may let the second transfer unit 32 transfer, to the provision section-side turntable 73 in the provision section 70, one of the containers containing the coffee supplied from the beverage supply unit 21.

In this case, the type of coffee contained in the container to be delivered to the provision section-side turntable 73 desirably matches the type of coffee that the purchaser is likely to select the next time.

Accordingly, the controller 90 or the server 100 should determine, in advance, the type of coffee to be delivered to the provision section-side turntable 73 before the purchaser selects the type, on the basis of the past sales performance, the temperature, events to be held around the beverage providing device 1, the number of people around the beverage providing device 1, or the like.

If the coffee in the container moved to the provision section-side turntable 73 in the provision section 70 does not correspond to what the purchaser selects using the display unit 81 in the operation section 80, the second transfer unit 32 is made to return the container delivered to the provision section-side turntable 73 to the first storage section 51 or the second storage section 52, and deliver a container containing the selected type of coffee to the provision section-side turntable 73.

The type of coffee contained in the container to be delivered to the provision section-side turntable 73 is not only selected by using the display unit 81 of the operation section 80, but also optionally selected using a mobile terminal capable of communicating with the beverage providing device 1 or the server 100.

An example may involve an embodiment in which the selected beverage-containing container is delivered to the provision section-side turntable 73 when, while a beverage provided by the beverage providing device 1 is selected on software of a purchaser's mobile terminal, the payment unit 83 uses the mobile terminal or the mobile terminal-connected other terminal or an IC card to read information about electronic money and then execute the payment.

(Control of Provision Section-Side Turntable 73)

The controller 90 controls the rotation of the provision section-side turntable 73.

Specifically, payment is completed through the payment unit 83 and a container containing the type of coffee selected using the display unit 81 is then mounted on a mounting area that is at the provision section-side turntable 73 and is positioned inwardly of the outlet 71 in the housing 3 (e.g., the first mounting area 73*a*1). After that, the pedestal of the provision section-side turntable 73 is rotated such that the mounted container is positioned outwardly of the outlet 71 in the housing 3.

Thus, the purchaser can obtain the desired coffee immediately after the payment, if the container containing the type of coffee selected using the display unit 81 has already been mounted, before the payment through the payment unit 83 is completed, on a mounting area that is at the provision section-side turntable 73 and is positioned inwardly of the outlet 71 in the housing 3 (e.g., the first mounting area 73*a*1).

(Control of Interference Between Units)

The controller 90 controls the operation such that the first transfer unit 31 and the second transfer unit 32 do not physically interfere with each other, that is, do not collide with each other.

Specifically, while the first transfer unit 31 is moving to or from the relay point P1, the controller 90 prohibits the second transfer unit 32 from passing through the relay point P1.

For instance, while the first transfer unit 31 is moving from the transfer start position s1 to the relay point P1, the second transfer unit 32 is prohibited from delivering a coffee-containing container from the first storage section 51 or the second storage section 52 to the provision section-side turntable 73. However, the second transfer unit 32 is not prohibited from delivering the coffee-containing container from the first storage section 51 or the second storage section 52 to the disposal section 60.

Meanwhile, while the second transfer unit 32 is passing through the relay point P1, the controller 90 prohibits the first transfer unit 31 from moving to or from the relay point P1.

For instance, while the second transfer unit 32 is moving from the provision section-side turntable 73 to the first storage section 51, the first transfer unit 31 is prohibited from delivering a coffee-containing container to the relay point P1.

(Control at Power Loss)

The controller 90 controls the operation such that the first transfer unit 31 and the second transfer unit 32 do not physically interfere with each other at the time of restart immediately after the power supply to the beverage providing device 1 is cut off due to a power failure or the like, and then the power supply is started.

Specifically, the controller 90 records the positions, moving speeds, and transfer directions of the first transfer unit 31 and the second transfer unit 32 every second time t2 (for instance, t2=1 second). At the time of restart, the controller 90 sequentially moves the first transfer unit 31 and the second transfer unit 32 so as to move away from the relay point P1.

In this case, information about the position or the like of the first transfer unit 31 being recorded every second time t2 is recorded in a non-volatile memory or the like, the information of which is not lost even when the power is turned off.

(Control of Monitoring Whether or not Coffee has been Successfully Supplied in Accordance with Work Instructions)

Based on the information about the first work instruction displayed on the operation instruction output section 40, the controller 90 determines whether or not coffee supplied from the beverage supply unit 21 manually operated by a worker corresponds to the first work instruction, that is, whether or not the correct type of coffee has been supplied in response to the first work instruction.

Specifically, a sensor 90*a* which determines, without contact, the type of coffee contained in a container such as a container before gripped by the first transfer unit 31, a container gripped by the first transfer unit 31, or a container gripped by the second transfer unit 32, is provided. Based on the information from the sensor 90*a*, the controller 90 determines whether or not the correct type of coffee has been generated in response to the first work instruction.

The sensor 90*a* may be, for instance, a temperature sensor for measuring the temperature of a container containing coffee, an infrared sensor for measuring components of coffee (moisture, fat content, lipid content) contained in the container, or the like.

In addition, if the quantity of coffee to be put into the container is made constant regardless of the type and the weight of the container is varied between the one for hot coffee and the one for cold coffee, a sensor for the weight including coffee can be used as the sensor 90*a*.

That is, based on the weight difference between the hot coffee container and the cold coffee container and the weight difference due to the presence or absence of milk, it is possible to identify the type of coffee contained in the container gripped by the first transfer unit 31 or the container gripped by the second transfer unit 32.

The sensor 90*a* may be provided at a location away from the first transfer unit 31, but may be built in the first transfer unit 31.

Further, the sensor 90*a* may be used not only for determining the type of coffee contained in the container, but also for determining whether or not the container has been successfully gripped.

Furthermore, the sensor 90*a* used for determining the type of coffee and/or whether or not the container has been successfully gripped may be built in the second transfer unit 32.

Moreover, a similar sensor 90*a* may be provided at the provision section-side turntable 73 in order to determine, whether or not coffee contained in a container mounted on the first mounting area 73*a*1 or the second mounting area 73*a*2 matches the type of coffee selected by a purchaser using the display unit 81 in the operation section 80, and/or determine whether or not a container has been successfully mounted on the first mounting area 73*a*1 or the second mounting area 73*a*2.

(Air-Conditioner 95)

The air-conditioner 95 supplies cold air or hot air to a region behind the inner wall 3*c* of the beverage providing device 1 in the y direction. That is, the air-conditioner 95 is used to adjust the temperature of the space in which a worker conducts work such as manipulation of the selection buttons 21*a* of the beverage supply unit 21.

Note that the air-conditioner 95 may function as the heater 51*a*, and at least part of warm air supplied from the air-conditioner 95 may be supplied to the first storage section 51.

In this case, at least part of cold air discharged from the air-conditioner 95 may be supplied to the second storage section 52.

For instance, in winter, when the air-conditioner 95 is used as a heater for supplying warm air, part of the warm air is supplied via a supply duct (not shown) to the first storage section 51. Part of discharged cold air is supplied via a discharging duct (not shown) to the second storage section 52.

Note that the air-conditioner 95 may function as the cooler 52*a*, and at least part of cold air supplied from the air-conditioner 95 may be supplied to the second storage section 52.

In this case, at least part of warm air discharged from the air-conditioner 95 may be supplied to the first storage section 51.

For instance, in summer, when the air-conditioner 95 is used as a cooler for supplying cold air, part of the cold air is supplied via a supply duct (not shown) to the second storage section 52. Part of discharged warm air is supplied via a discharging duct (not shown) to the first storage section 51.

This allows the air-conditioner 95 to be used as the heater 51*a* and the cooler 52*a*, thereby capable of utilizing the cold air and the warm air without waste.

(Server 100)

The server 100 is a control device provided outside the beverage providing device 1, and is in communication with the controller 90 via a communication unit (not shown).

The controller 90 sends, to the server 100 and a recording unit (not illustrated) provided at the beverage providing device 1, information on the sales performance and disposal records of coffee in the beverage providing device 1, inventory status related to materials such as coffee beans and containers, or the like.

The server 100 transmits, to the controller 90, information about the sales performance and disposal records of other beverage providing devices 1, weather information, the temperature, events to be held around the beverage providing device 1, the number of people around the beverage providing device 1, or the like.

Based on the information (e.g., sales performance, disposal records) collected in the server 100, the server 100 or the controller 90 of each beverage providing device 1 calculates the details of instruction output from the operation instruction output section 40, the type of beverage contained in a container delivered in advance to the provision section 70, or the like.

Effects

The beverage generator 10, the transfer section 30, the storage section 50, and the provision section 70 are housed in one housing 3. This makes it possible to hold a plurality of containers each containing a beverage supplied from the beverage generator 10 and provide the beverage to a purchaser within a short waiting time when needed, that is, when the purchaser conducts a purchase procedure (payment).

In the storage section 50, each container containing a beverage supplied from the beverage generator 10 can be kept in a covered state.

This can lower the possibility of a foreign matter to be mixed in by the time of transfer to the provision section 70 compared to a form in which the container is kept in an uncovered state.

In addition, after the purchaser has selected the beverage to be purchased and before payment corresponding to said selection is completed, a container containing the selected beverage is delivered to the provision section 70.

This enables the purchaser to pick up the container containing the beverage corresponding to said payment in a short time after said payment is completed.

In addition, even before the purchaser selects the beverage to be purchased, a container containing the beverage is delivered to the provision section 70 in advance.

Accordingly, if the beverage in the container delivered to the provision section 70 matches the beverage selected by the purchaser, the purchaser can pick up the container containing the beverage corresponding to said payment immediately after said payment is completed.

If the beverage in the container delivered to the provision section 70 does not match the beverage selected by the purchaser, the second transfer unit 32 can be used to switch to a container containing the beverage selected by the purchaser. This enables the purchaser to pick up the container containing the beverage corresponding to said payment in a short time after said payment is completed.

Also, the past sales performance may be used to determine a beverage that the purchaser is highly likely to select. This can increase the possibility that the beverage in the container delivered in advance to the provision section 70 matches the beverage to be selected by the purchaser, thereby capable of improving operational efficiency.

In addition, the operation instruction output section 40 outputs information about the type of beverage to be supplied by the beverage generator 10, an instruction for replenishment of materials, or the like. This allows a worker to work at an appropriate timing.

Information or the like about an instruction for the type of beverage to be supplied by the beverage supply unit (first work instruction) is output on the basis of the number of containers stored in the first storage section 51 and the second storage section 52, the past sales performance, or the like.

This can adjust the balance between the beverage in each container kept in advance in the storage section 50 and the beverage to be selected by the purchaser. Thus, operational efficiency can be improved such that the beverage supplied from the beverage supply unit 21 can be delivered via the provision section 70 to the purchaser, with as little waste discarded into the disposal section 60 as possible.

The first embodiment illustrates the embodiment in which only one beverage supply unit 21 is provided. However, one housing 3 may include two or more beverage supply units 21, and each container containing the beverage supplied from said two or more beverage supply units 21 may be transferred using one transfer section 30 (the first transfer unit 31 and the second transfer unit 32) in some embodiments.

This makes it possible to supply more beverages to the containers in a short time.

In addition, the first embodiment illustrates the embodiment in which only one provision section 70 (one set of the outlet 71 and the provision section-side turntable 73) is provided. However, one housing 3 may be provided with two or more provision sections 70, and containers containing the beverage supplied from the beverage supply unit 21 may be transferred to said two or more provision sections 70 using one transfer section 30 (the first transfer unit 31 and the second transfer unit 32) in some embodiments.

Note that the outlet 71 in the provision section 70 may be provided not only on the front face 3/1 of the housing 3 but also on the side face (the right side face 3/2 or the left side face 3/3).

Thus, containers containing the beverage supplied from the two or more beverage supply units 21 may be transferred using one transfer section 30 (the first transfer unit 31 and the second transfer unit 32) to the two or more provision sections 70 in some embodiments.

Next, a second embodiment will be described.

The first embodiment illustrates an embodiment in which the following is manually performed by a worker, including: placement of each container at the predetermined position s0 in the beverage supply unit 21; manipulation of selection buttons 21a of the beverage supply unit 21; injection of ice made by the ice maker 25 into a container; removal of a container containing an extracted beverage from the beverage supply unit 21; or placement of the removed container at the transfer start position s1 for the first transfer unit 31.

In the second embodiment, the following is also automated on the basis of control by the controller 90, including: placement of each container at the predetermined position s0 in the beverage supply unit 21; manipulation of selection buttons 21a of the beverage supply unit 21; injection of ice made by the ice maker 25 into a container; removal of a container containing an extracted beverage from the beverage supply unit 21; or placement of the removed container at the transfer start position s1 for the first transfer unit 31.

The first embodiment illustrates an embodiment in which the first transfer unit 31, in principle, linearly moves in parallel to the y direction.

In the second embodiment, the first transfer unit 31 rotates about an axis parallel to the z direction and linearly moves in parallel to the x direction.

The first embodiment illustrates an embodiment in which the storage section 50 and the provision section 70 are arranged apart from each other in the x direction.

In the second embodiment, the storage section 50 and the provision section 70 are arranged adjacent to each other in the y direction.

Further, in the second embodiment, the provision section 70 has a plurality of front opening/closing doors (a first front opening/closing door 77a to a 20th front opening/closing door 77t) corresponding to a plurality of storage cylinders 55 (a first storage cylinder 55a to a 20th storage cylinder 55t) included in the storage section 50.

The plurality of front opening/closing doors 77 are subject to opening/closing control based on operation on purchaser software installed at a purchaser terminal 400 while the purchaser terminal 400 is located near the beverage providing device 1.

Furthermore, in the second embodiment, the plurality of storage cylinders 55 (the first storage cylinder 55a to the 20th storage cylinder 55t) included in the storage section 50 are each provided with a rear opening/closing door 57.

Hereinafter, differences from the first embodiment will be mainly described.

Figure 11:
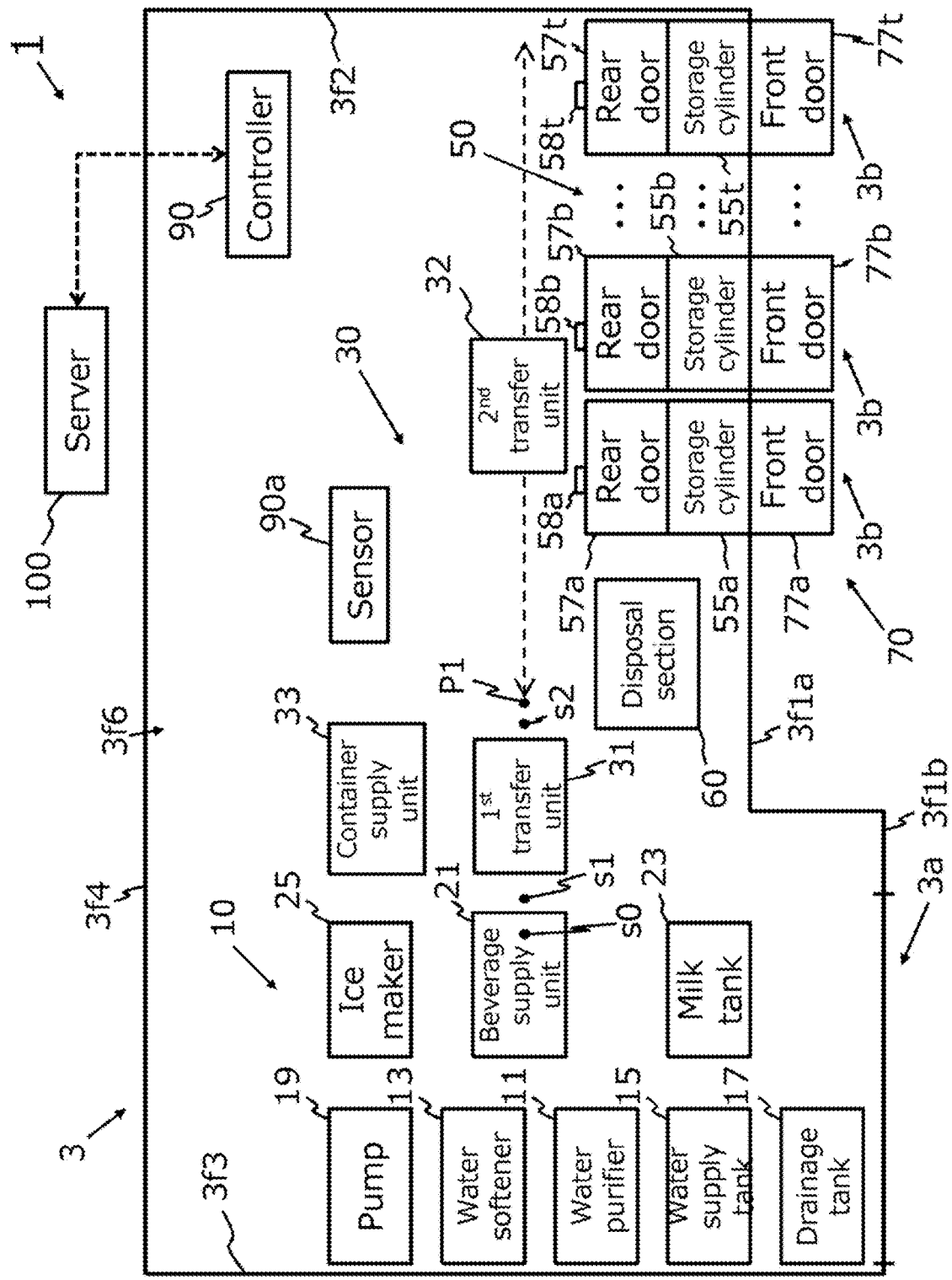
FIG. 11 is a configuration diagram illustrating each member of a beverage providing device according to a second embodiment.

The beverage providing device 1 in the second embodiment includes a housing 3, a beverage generator 10, a transfer section 30, a storage section 50, a disposal section 60, a provision section 70, a controller 90, and a server 100 (see FIG. 11).

Like the first embodiment, in order to explain the directions, the horizontal direction (left-right direction) is set to x direction, another horizontal direction (front-rear direction) perpendicular to the x direction is set to y direction, and a direction (vertical direction) perpendicular to the x and y directions is set to z direction.

Figure 12:
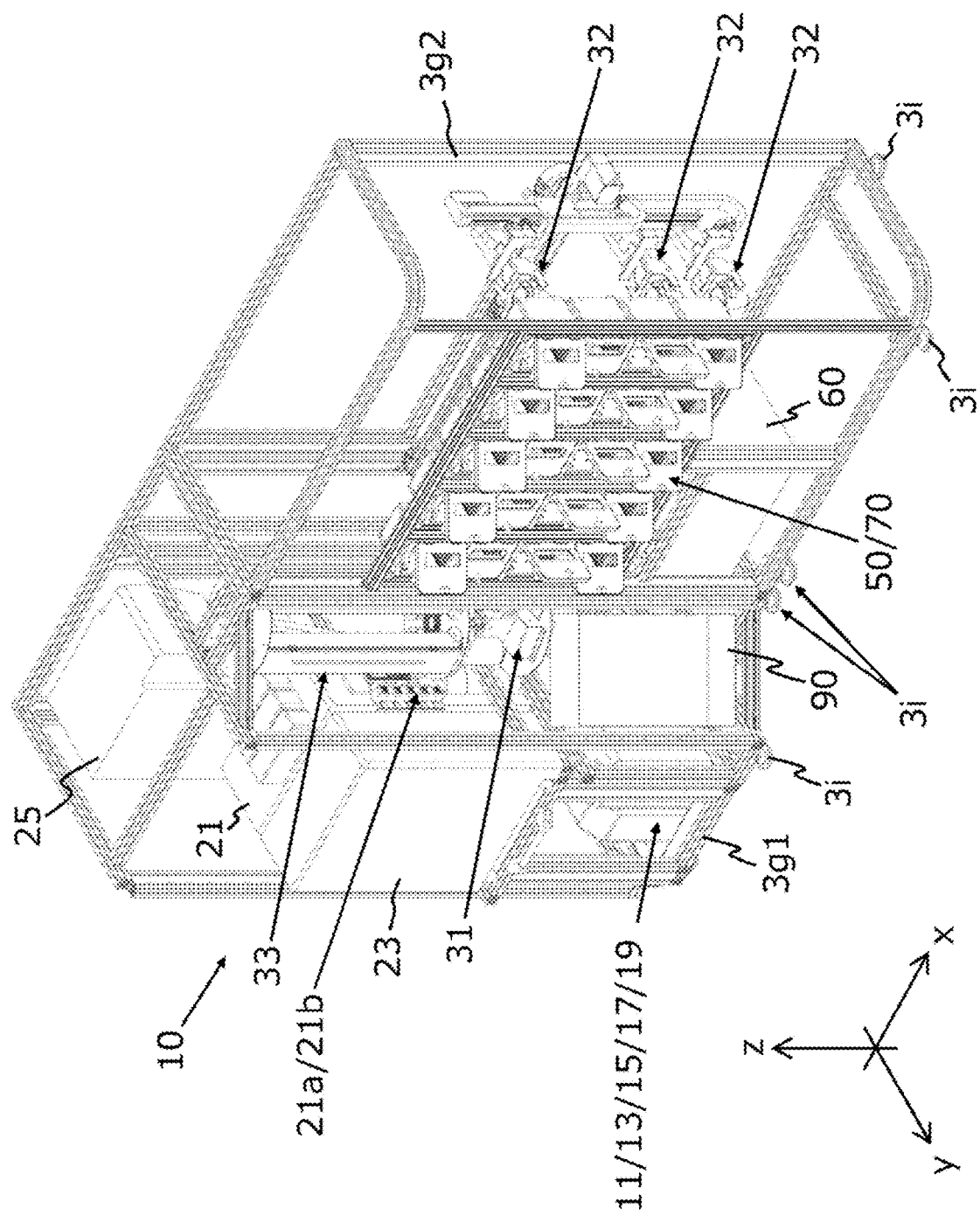
FIG. 12 is a perspective view of the beverage providing device without outer walls according to the second embodiment as viewed from the upper front right.
Figure 13:
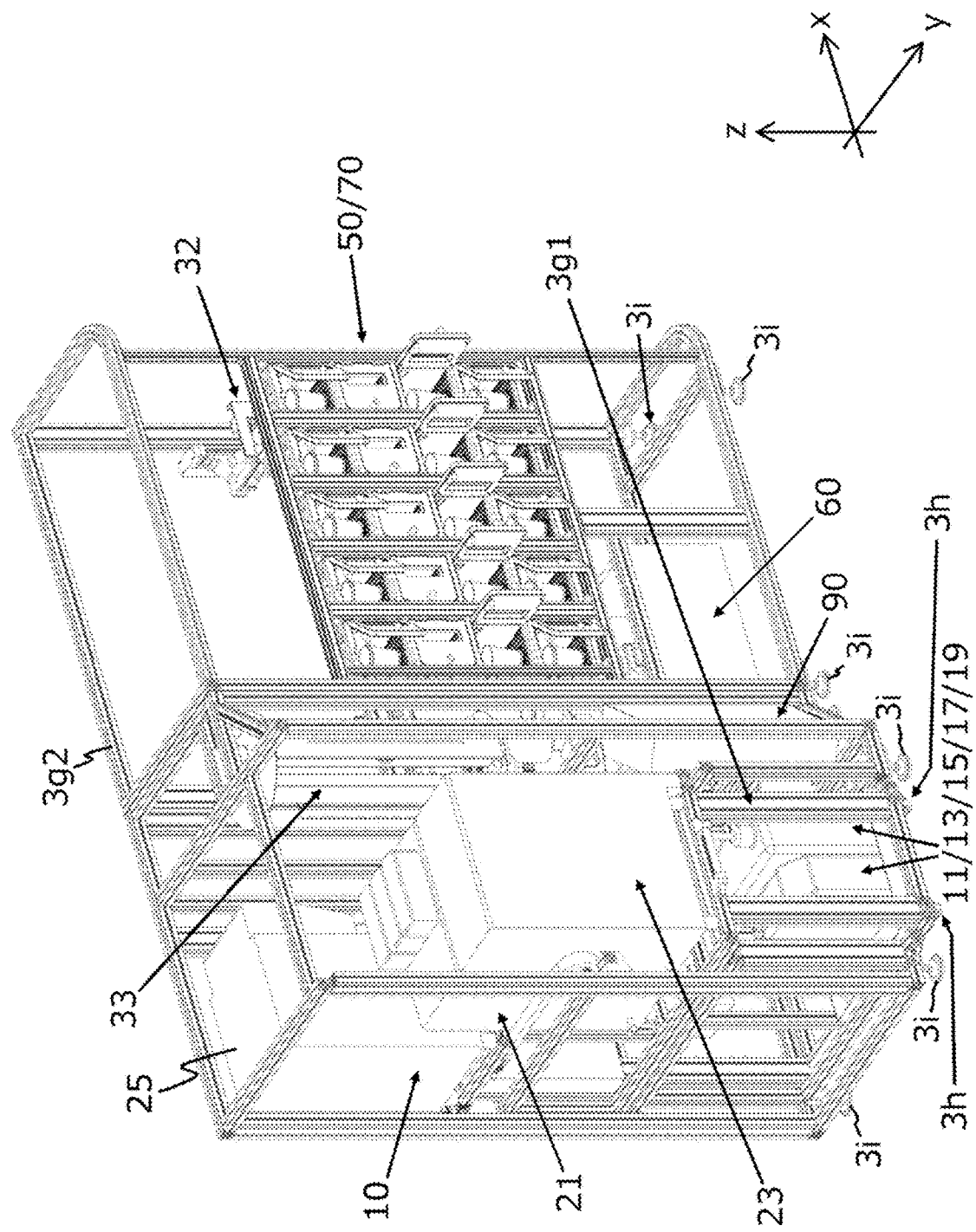
FIG. 13 is a perspective view of the beverage providing device without outer walls according to the second embodiment as viewed from the upper front left.
Figure 14:
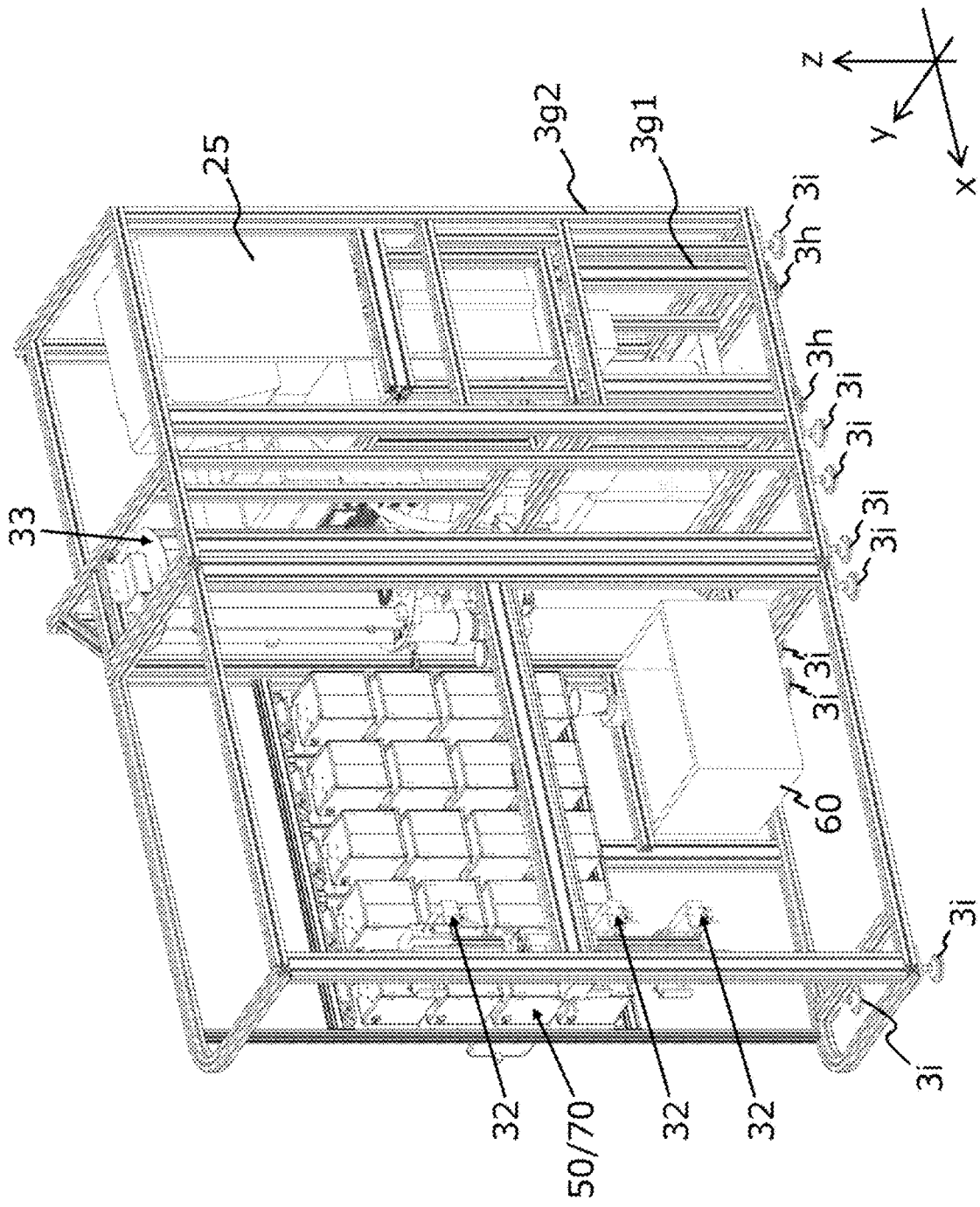
FIG. 14 is a perspective view of the beverage providing device without outer walls according to the second embodiment as viewed from the upper rear right.
Figure 15:
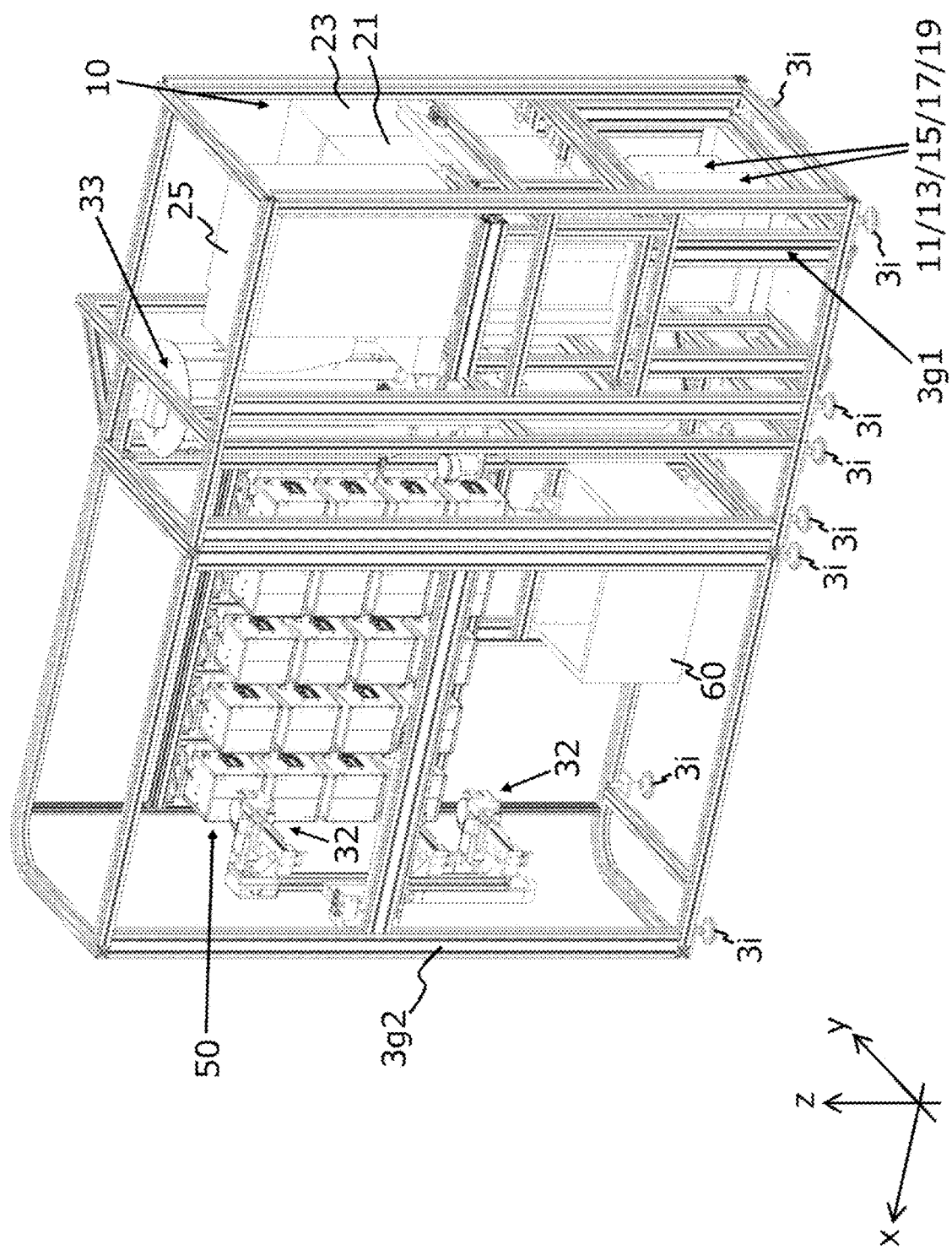
FIG. 15 is a perspective view of the beverage providing device without outer walls according to the second embodiment as viewed from the upper rear left.
Figure 16:
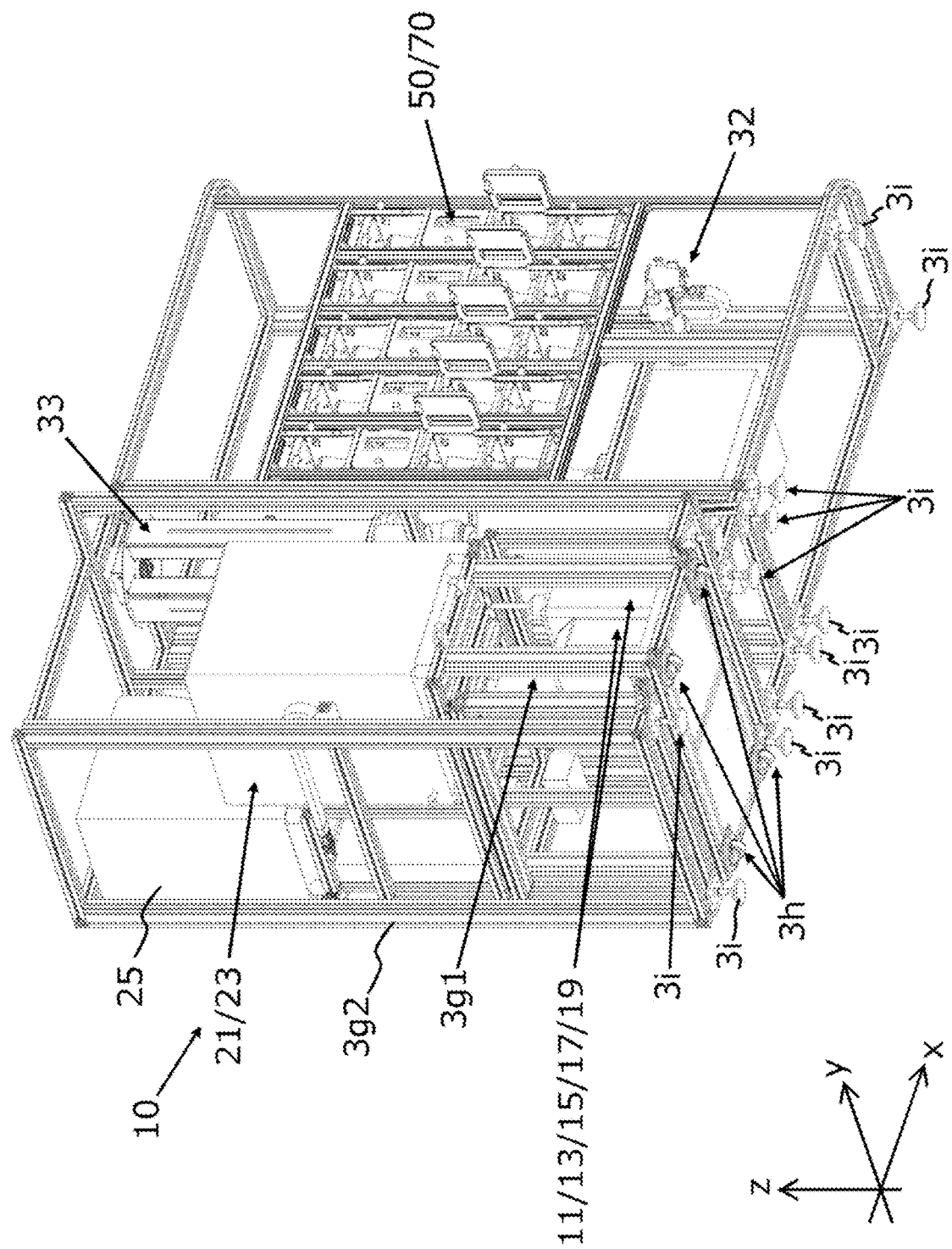
FIG. 16 is a perspective view of the beverage providing device without outer walls according to the second embodiment as viewed from the lower front left.
Figure 17:
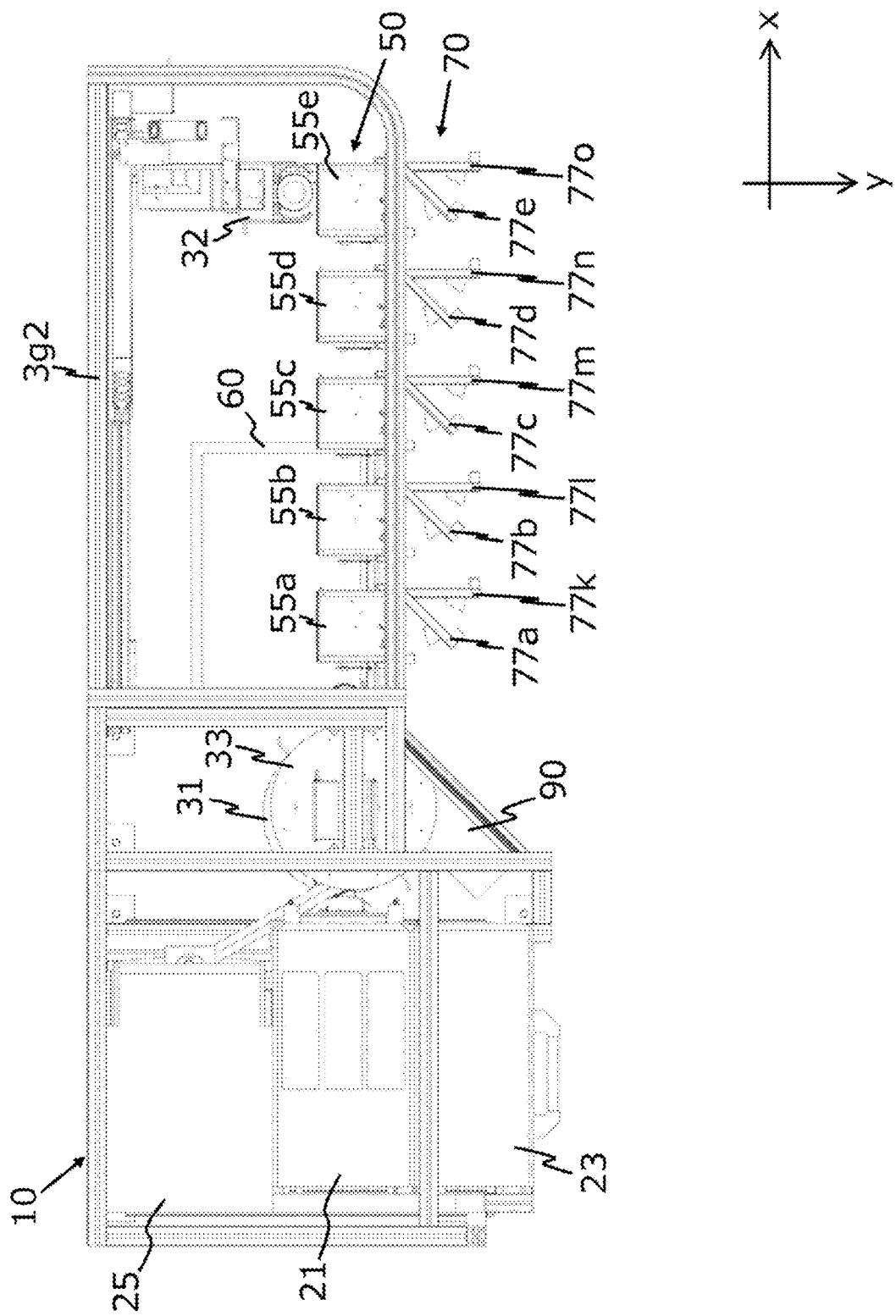
FIG. 17 is a view of the beverage providing device without outer walls according to the second embodiment as viewed from the top.
Figure 18:
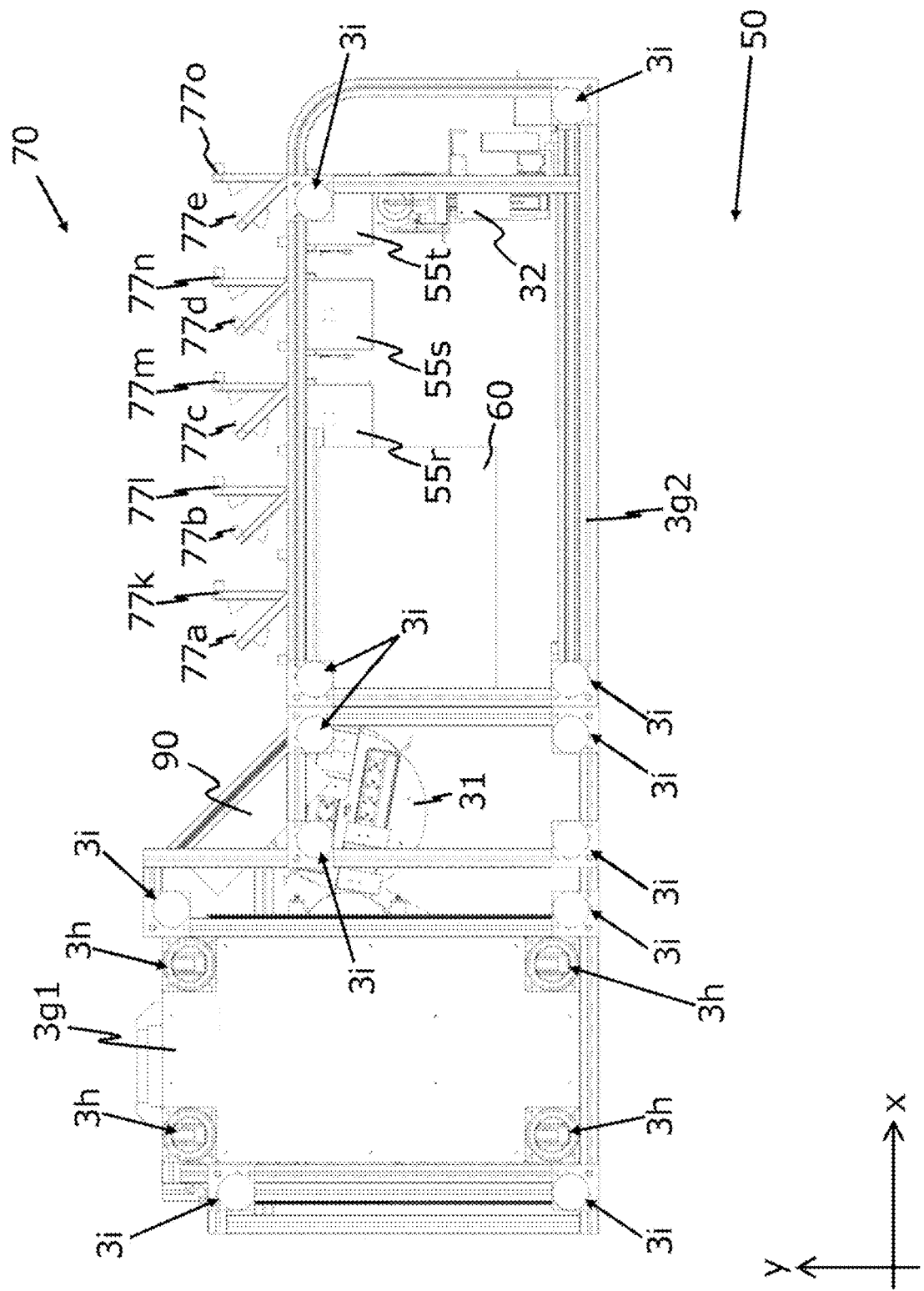
FIG. 18 is a bottom view of the beverage providing device without outer walls according to the second embodiment as viewed from the bottom.

In FIG. 12, the directions indicated by the arrows on the xyz axes are defined as the right direction, the front direction, and the upward direction, respectively.

Further, in order to explain the internal structure of the housing 3, outer walls and part of some frames are omitted in FIGS. 12 to 20 and 40 to 48.

(Housing 3)

The housing 3 houses the beverage generator 10, the transfer section 30, the storage section 50, the disposal section 60, the provision section 70 (at least part thereof), and the controller 90.

A front face 3/1 of the housing 3 in the second embodiment has a first front face 3/1a that is closer to a rear face 3/4 and a second front face 3/1b that is farther from the rear face 3/4 than the first front face 3/1a (and protrudes forwardly of the first front face 3/1a in the y direction).

That is, the housing 3 in the second embodiment is shaped like a rectangular parallelepiped in which a portion having the first front face 3/1a is recessed.

A portion that retains the beverage generator 10 in the housing 3 (a first housing 3g1) is structured separately from the other portion (a second housing 3g2), and its bottom is provided with casters 3h.

A lower portion of the second housing 3g2 is provided with legs 3i extending downward in the z direction.

A carry-in/carry-out port 3a including an opening/closing door is provided in the area of the second front face 3f1b of the housing 3 where the beverage generator 10 is located.

The carry-in of coffee materials to be used in the beverage providing device 1 and the carry-out of waste are performed under the condition in which the opening/closing door of carry-in/carry-out port 3a is opened and in which the first housing 3g1 holding the beverage generator 10 is pulled forward in the y direction (see FIGS. 19, 20, 47, and 48).

The outlets 71 (a first outlet opening 71a to a 20th outlet opening 71t) in the provision section 70 are provided at the first front face 3f1a of the housing 3.

The display windows 3b in the second embodiment are provided on the first front opening/closing door 77a to the 20th front opening/closing door 77t in the provision section 70.

The left side area where the beverage generator 10 of the housing 3 is provided, the intermediate area where the first transfer unit 31 and the controller 90 are provided, and the right side area where the second transfer unit 32 and the storage section 50 are provided can be assembled in a separable state.

The outer walls may be provided with a trash can, an area for providing a purchaser with additives (e.g., gum syrup) related to beverages, and the like (not shown).

The beverage generator 10, the transfer section 30, the storage section 50, and the disposal section 60 are arranged inside the housing 3, that is, in an area surrounded by the second front face 3f1b of the housing 3, the side face of the housing 3 (one of the right side face 3f2 and the left side face 3f3 of the housing 3), a plane (e.g., the rear face 3f4 of the housing 3) parallel to the second front face 3f1b, and a plane (e.g., the other of the right side face 3f2 and the left side face 3f3 of the housing 3) parallel to that side face.

The transfer section 30, the storage section 50, the disposal section 60, and at least part of the beverage generator 10, are arranged in an area surrounded by the first front face 3f1a of the housing 3, the side face of the housing 3 (one of the right side face 3f2 and the left side face 3f3 of the housing 3), a plane (e.g., the rear face 3f4 of the housing 3) parallel to the first front face 3f1a, and a plane (e.g., the other of the right side face 3f2 and the left side face 3f3 of the housing 3) parallel to that side face.

The second embodiment shows an example of the outer shape of the housing 3 structured as a substantially octahedron having a slope between the first front face 3f1a and the second front face 3f1b, the first front face 3f1a, the second front face 3f1b, the right side face 3f2, the left side face 3f3, the rear face 3f4, the upper face 3f5, and the lower face 3f6. However, it suffices if there are outer walls including at least the first front face 3f1a, the second front face 3f1b, and the side face (one of the right side face 3f2 and the left side face 3f3). A wall, a floor, or the like fixed to the place where the beverage providing device 1 is installed may function as a side face (the other of the right side face 3f2 or the left side face 3f3), the rear face 3f4, or the lower face 3f6.

Further, the upper face 3f5 of the housing 3 may be omitted in some embodiments.

(Beverage Generator 10)

The beverage generator 10 is provided inside the housing 3 on the left side in the x direction (see FIGS. 12 to 20 and 40 to 48).

That is, the beverage generator 10 is arranged so as to be separated from the storage section 50 in the left-right direction of the housing 3.

The beverage generator 10 includes a water purifier 11, a water softener 13, a water supply tank 15, a drainage tank 17, a pump 19, a beverage supply unit (coffee maker) 21, a milk tank 23, and an ice maker 25.

The second embodiment illustrates an example in which a beverage supplied from the beverage supply unit 21 is coffee, which takes a relatively long time to be extracted, in order to explain the effect of reducing a waiting time until a purchaser picks up a container containing a beverage being purchased.

However, the beverage supply unit 21 may be a unit for supplying another beverage.

(Water Purifier 11, Water Softener 13, Water Supply Tank 15, Drainage Tank 17, and Pump 19)

The configuration of the water purifier 11, the water softener 13, the water supply tank 15, the drainage tank 17, and the pump 19 in the second embodiment is the same as those of the first embodiment.

(Beverage Supply Unit 21)

The beverage supply unit 21 executes a roasting step, a grinding step, and an extraction step to extract coffee from coffee beans while using water supplied from the water softener 13 (water that has undergone the purification step and the water softening step), and supply the coffee into a container placed at a predetermined position s0 in the beverage supply unit 21.

The beverage supply unit 21 can be used to extract a plurality of types of coffee, and the beverage supply unit 21 is provided with selection buttons 21a for selecting the plurality of types of coffee.

The front side (the right side in the x direction) of the selection buttons 21a is provided with a selection button manipulator 21b for pushing a selection button 21a to select coffee of interest to be extracted from the beverage supply unit 21.

The selection button manipulator 21b operates on the basis of an instruction signal from the controller 90.

The selection button manipulator 21b also operates a button (not shown) for discharging ice made by the ice maker 25 described later.

The second embodiment illustrates an example in which the beverage supply unit 21 is provided with the selection buttons 21a and the selection button manipulator 21b, for selecting four types of coffee (hot coffee with milk, hot coffee without milk, cold coffee with milk, and cold coffee without milk).

(Selection Button(s) 21a to be Lit or Off)

Of the selection buttons 21a, a selectable button(s) lights up and the light of a non-selectable button(s) is turned off.

For instance, the selection button(s) 21a, for which a beverage to be supplied corresponding to the selection is not set, is turned off.

In addition, even if the selection button 21a is set to supply a beverage corresponding to the selection but there is a lack of any of materials (e.g., coffee, milk, hot water, cold water, ice) required to provide the beverage, the light is turned off.

(Detection Whether Light is Turned on/Off by Selection Button Manipulator 21b)

The selection button manipulator 21b has a light-detecting sensor and uses said sensor to detect whether each selection button 21a is lit or off.

In the case of detecting a selection button 21a that is set to a beverage to be supplied corresponding to the selection and is turned off, the selection button manipulator 21b sends, to the controller 90, information about the selection button 21a that is turned off.

The information about the selection button 21a that is turned off is transmitted from the controller 90 to the server 100. Further, until the selection button 21a in the off state is turned on, the beverage for the selection button 21a can be neither purchased nor selected on a purchase condition setting screen 501 or the like at the purchaser terminal 400.

(Milk Tank 23)

In the milk tank 23, milk to be supplied to a container containing coffee is stored.

The milk tank 23 is installed near the beverage supply unit 21 and is in communication with the beverage supply unit 21 to supply milk to the beverage supply unit 21.

When coffee with milk is selected as the type of coffee to be supplied by the beverage supply unit 21, the beverage supply unit 21 supplies milk from the milk tank 23 together with the coffee to the container.

However, the milk in the milk tank 23 may be automatically supplied to the container directly from the milk tank 23 without going through the beverage supply unit 21.

One of the beverage supply unit 21 or the milk tank 23 may be equipped with a whisk for whipping milk, and the resulting whipped milk may be supplied to the container.

(Ice Maker 25)

The ice maker 25 makes ice by using water supplied from the water softener 13 (water that has undergone the purification step and the water softening step).

The ice maker 25 is equipped with a conduit 25a (see FIGS. 19 and 47) that guides ice made by the ice maker 25 to a container positioned in the beverage supply unit 21.

The ice made by the ice maker 25 is guided through the conduit 25a to an area where a beverage is discharged in the beverage supply unit 21.

The operation of discharging ice from the ice maker 25 in the second embodiment is performed by the selection button manipulator 21b or the beverage supply unit 21.

Example 1 of how Selection Button Manipulator 21b Works

When the controller 90 issues an instruction signal to extract cold coffee without milk from the beverage supply unit 21, the selection button manipulator 21b pushes a button corresponding to "cold coffee without milk" among the selection buttons 21a and a button for discharging ice from the ice maker 25. As a result, cold coffee is extracted from the beverage supply unit 21, ice is discharged from the ice maker 25, and they are supplied to a container positioned at the predetermined position s0 in the beverage supply unit 21.

Example 2 of how Selection Button Manipulator 21b Works

When the controller 90 issues an instruction signal to extract hot coffee with milk from the beverage supply unit 21, the selection button manipulator 21b pushes a button corresponding to "hot coffee with milk" among the selection buttons 21a. As a result, hot coffee is extracted from the beverage supply unit 21, milk is extracted from the milk tank 23, and they are supplied to a container positioned at the predetermined position s0 in the beverage supply unit 21.

(Automatic Operation)

The following is automated using the selection button manipulator 21b and the first transfer unit 31 on the basis of operation control by the controller 90, including: a transfer of a container to the predetermined position s0 in the beverage supply unit 21; manipulation of selection buttons 21a of the beverage supply unit 21; injection of ice made by the ice maker 25 into a container; or a transfer of the extracted beverage-containing container from the predetermined position s0 in the beverage supply unit 21 to the transfer start position s1 for the first transfer unit 31.

(Transfer Section 30)

The transfer section 30 transfers each container containing a beverage supplied from the beverage supply unit 21 to either one of the beverage supply unit 21, the storage section 50, or the disposal section 60.

The transfer section 30 has the first transfer unit 31, a second transfer unit 32, and a container supply unit 33.

(First Transfer Unit 31)

Figure 21:
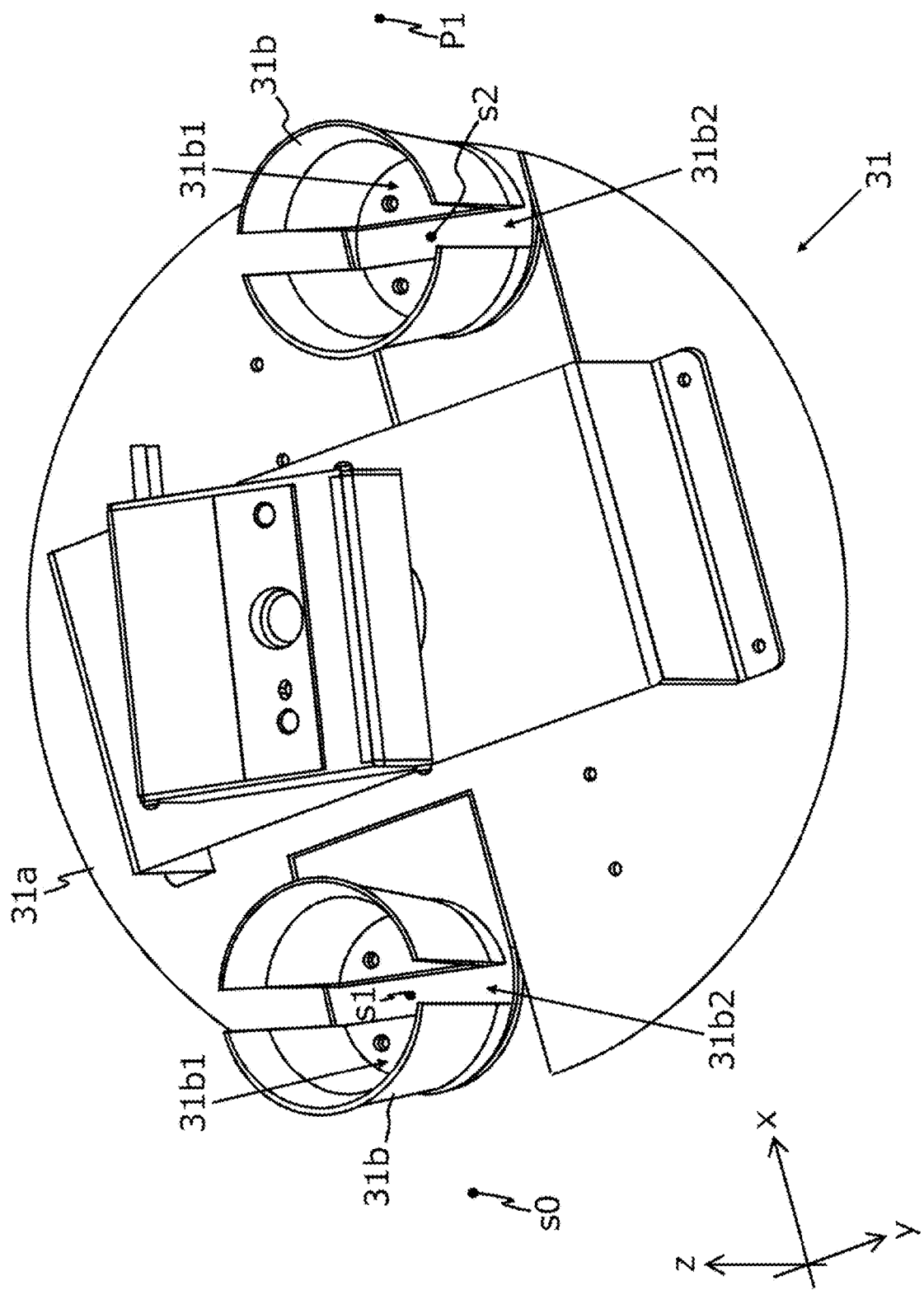
FIG. 21 is a perspective view of a first transfer unit in a state where each container holder is housed on a transfer section-side turntable.
Figure 22:
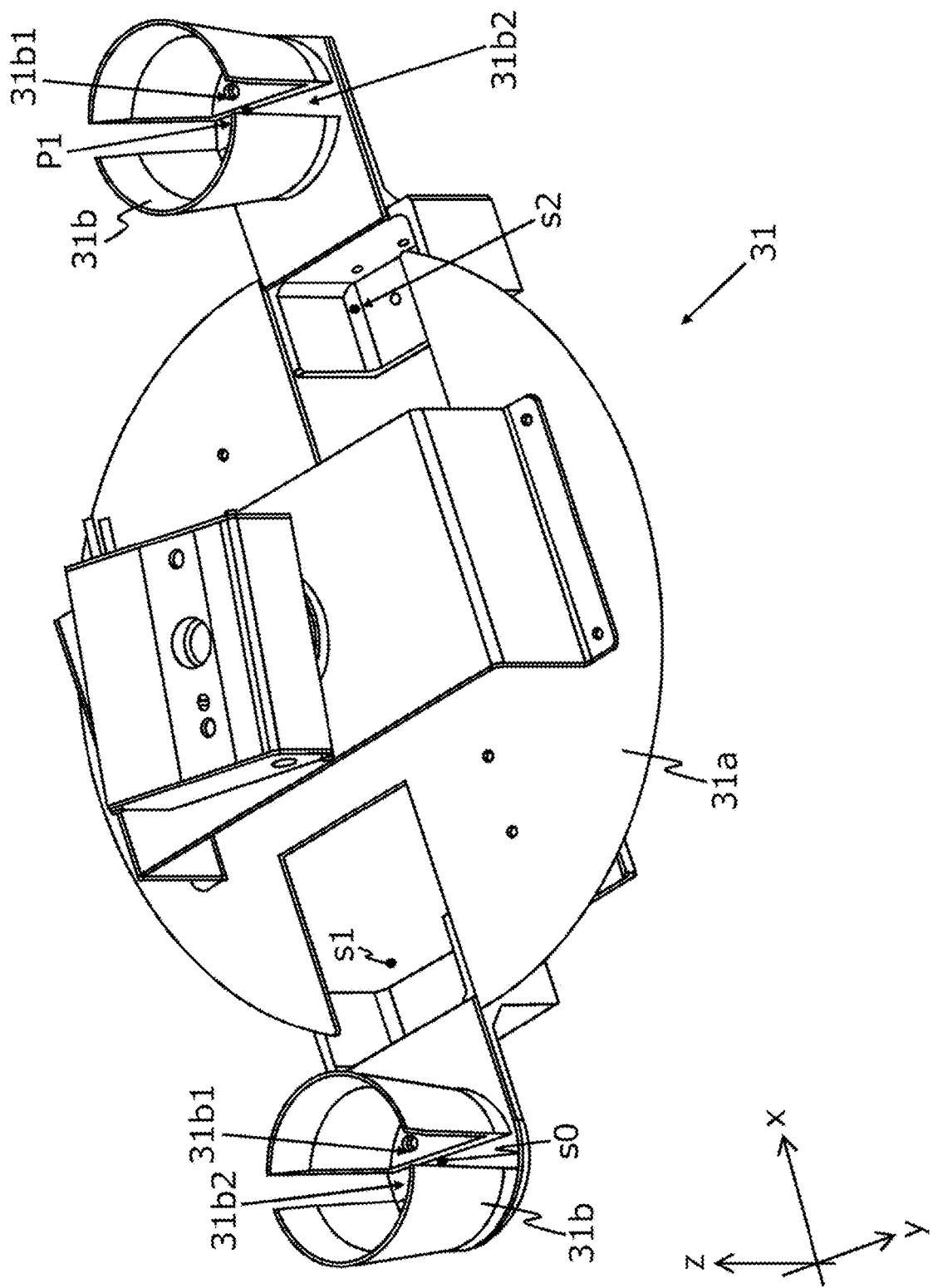
FIG. 22 is a perspective view of the first transfer unit in a state in which each container holder protrudes from the transfer section-side turntable.

The first transfer unit 31 is a transfer device which holds a container and moves the held container mainly in the x direction (see FIGS. 21 and 22).

The container is supplied to the first transfer unit 31 by the container supply unit 33 arranged upwardly of the first transfer unit 31 in the z direction.

The first transfer unit 31 has a transfer section-side turntable 31a and a container holder(s) 31b.

The transfer section-side turntable 31a rotates around an axis parallel to the z direction.

The container holder 31b is provided on the transfer section-side turntable 31a and stretches and contracts, in the radial direction, from the center of the rotation axis of the transfer section-side turntable 31a.

A lower part (first container mounting part 31b1) of the container holder 31b has a first recess 31b2 into which a claw 32a of the second transfer unit 32, which will be described later, is inserted.

Specifically, the container holder 31b of the first transfer unit 31 holds a container supplied from the container supply unit 33, and the transfer section-side turntable 31a rotates to move said container and the container holder 31b to the transfer start position s1 (the first rotational movement).

In this regard, however, if the container holder 31b receives the supply of the container from the container supply unit 33 under the condition in which the container holder 31b is being placed at the transfer start position s1, the first rotational movement is not implemented.

The container holder 31b of the first transfer unit 31 extends to the left in the y direction, and moves said container from the transfer start position s1 to the predetermined position s0 in the beverage supply unit 21 (the first stretching movement).

While the container is being placed at the predetermined position s0, coffee is extracted from the beverage supply unit 21, and the container holder 31b of the first transfer unit 31 then contracts to the right in the y direction. In this way, said container containing coffee extracted by the beverage supply unit 21 is moved from the predetermined position s0 in the beverage supply unit 21 to the transfer start position s1 (the first contracting movement).

The transfer section-side turntable 31a of the first transfer unit 31 rotates to move the container holder 31b holding said container from the transfer start position s1 to a second position s2 near the relay point P1 (the second rotational movement).

The container holder 31b of the first transfer unit 31 extends to the right when viewed in the y direction to move the container holder 31b holding said container from the second position s2 to the relay point P1 (the second stretching movement).

The second transfer unit 32, which will be described later, grips and moves the container placed at the relay point P1.

After that, the container holder 31b of the first transfer unit 31 contracts to the left when viewed in the y direction, and the container holder 31b not holding the container is moved from the relay point P1 to the second position s2 (the second contracting movement).

It is desirable that a plurality of container holders 31*b* are provided.

The second embodiment illustrates an example in which regarding the container holder 31*b*, two container holders 31*b* are provided and positioned so as to sandwich the rotation center of the transfer section-side turntable 31*a*.

Providing the plurality of container holders 31*b* makes it possible to simultaneously transport a container from the container supply unit 33 to the beverage supply unit 21 and a container from the beverage supply unit 21 to the relay point P1.

(Second Transfer Unit 32)

The second transfer unit 32 is a transfer device which grips a container and moves the gripped container mainly in the x direction and the z direction.

Specifically, the second transfer unit 32 transfers the coffee-containing container delivered to the relay point P1 to the disposal section 60 on the left side in the x direction or to the storage section 50.

The second transfer unit 32 transfers the gripped container not only in the x direction but also in the z direction in order to transfer it to a predetermined position in the storage section 50.

In addition, the second transfer unit 32 can transfer the gripped container also in the y direction in order to grip the container and mount the gripped container.

Figure 23:
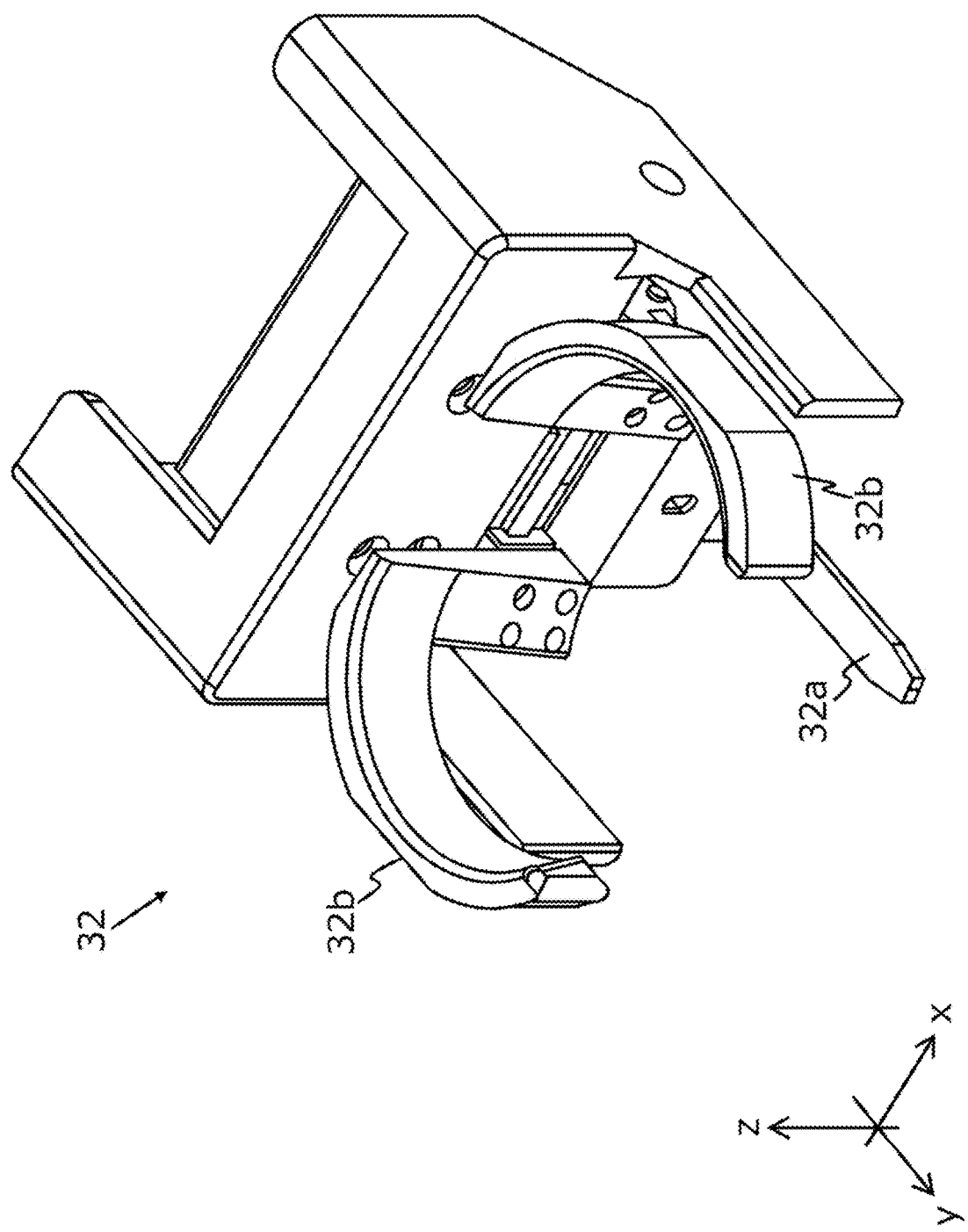
FIG. 23 is a perspective view of a part of a second transfer unit that grips a container.

A part that grips a container in the second transfer unit 32 has a claw 32*a* and arms 32*b* (see FIG. 23).

The claw 32*a* retains the bottom portion of the container to be gripped, and the arms 32*b* hold side portion of the container to be gripped.

The claw 32*a* is inserted into the first recess 31*b*2 of the container holder 31*b*, a second recess 56*a*1 provided in each of the first storage cylinder 55*a* to the 20th storage cylinder 55*t*, or a third recess 60*a*1 of the disposal section 60.

Only one second transfer unit 32 may be provided, or a plurality of second transfer units 32 may be provided. If a plurality of second transfer units are provided, containers can be transferred to the plurality of storage cylinders 55 in parallel at the same time.

(Container Supply Unit 33)

Figure 19:
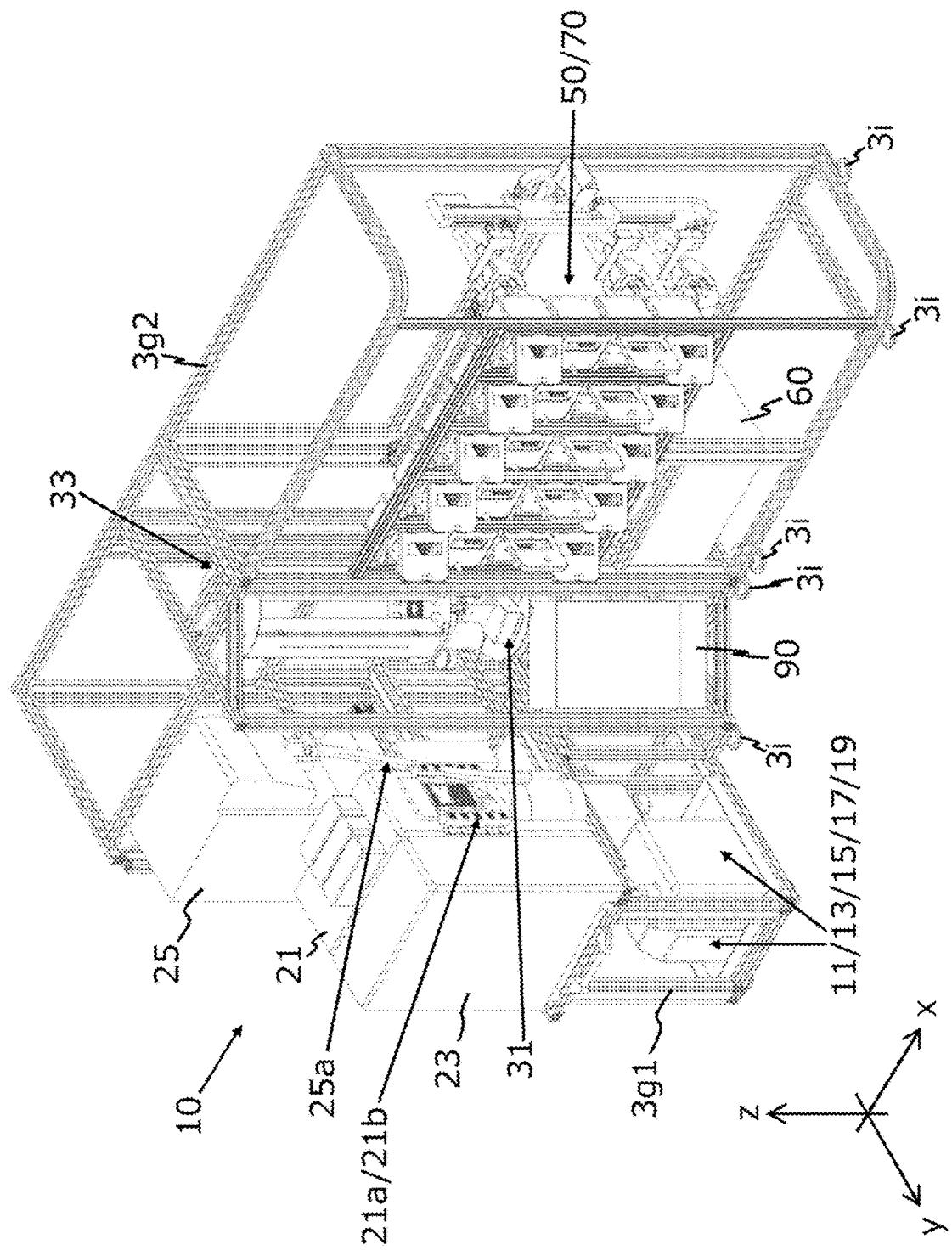
FIG. 19 is a perspective view of a state in which an area including a beverage generator is pulled out forward from the state of FIG. 12.
Figure 20:
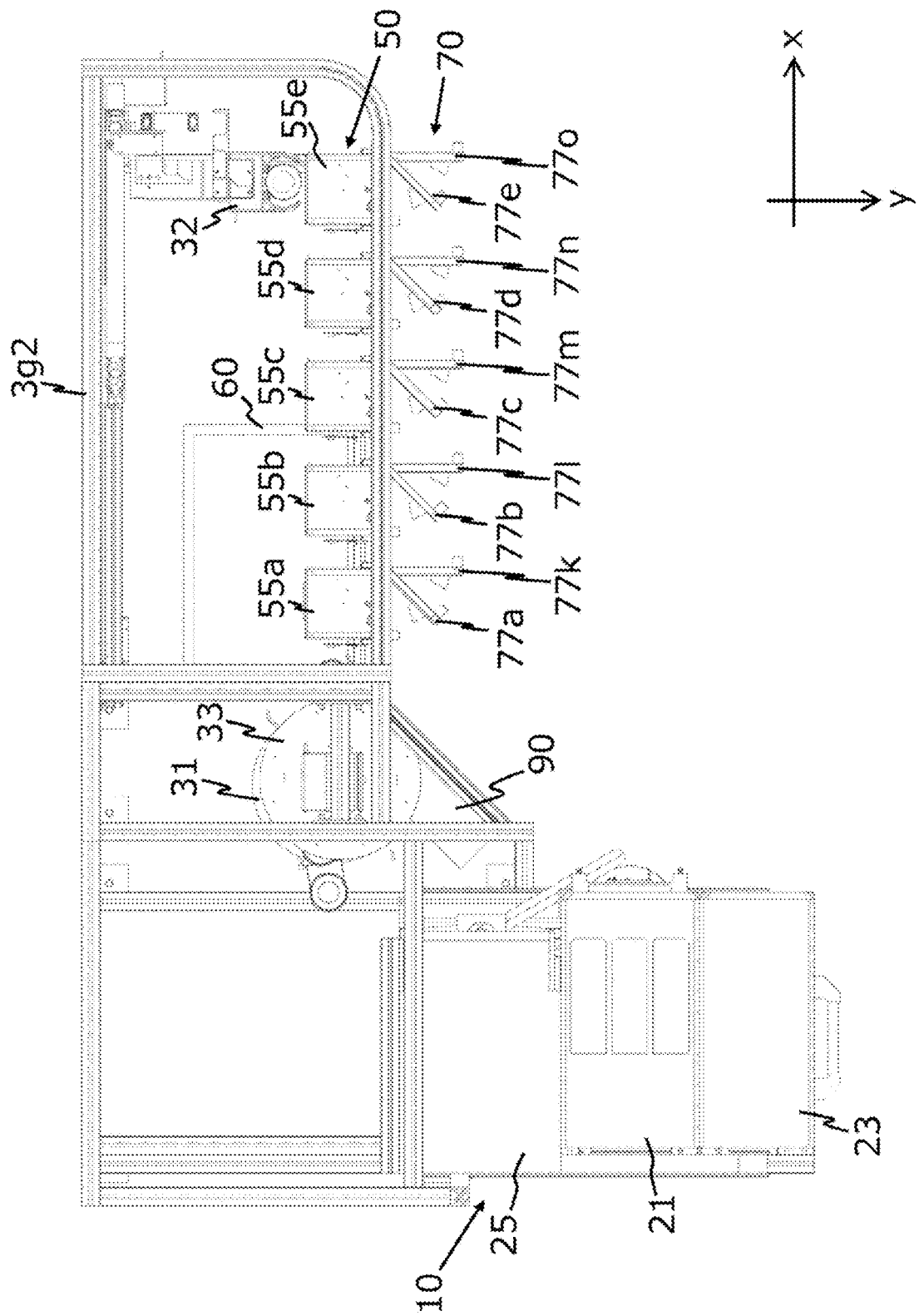
FIG. 20 is a top view of a state in which an area including a beverage generator is pulled out forward from the state of FIG. 17.
Figure 47:
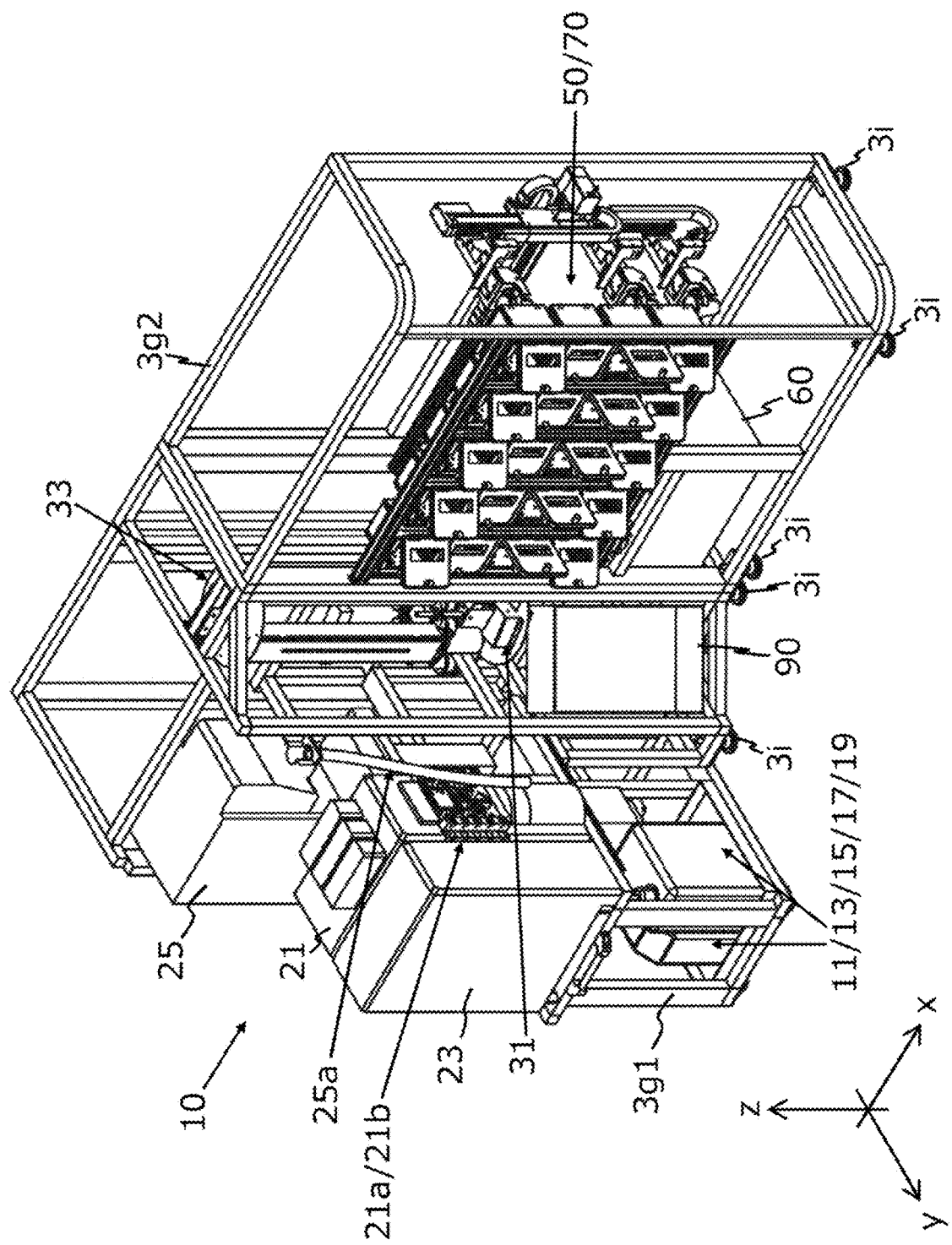
FIG. 47 is a diagram in which the outline of FIG. 19 is emphasized.
Figure 48:
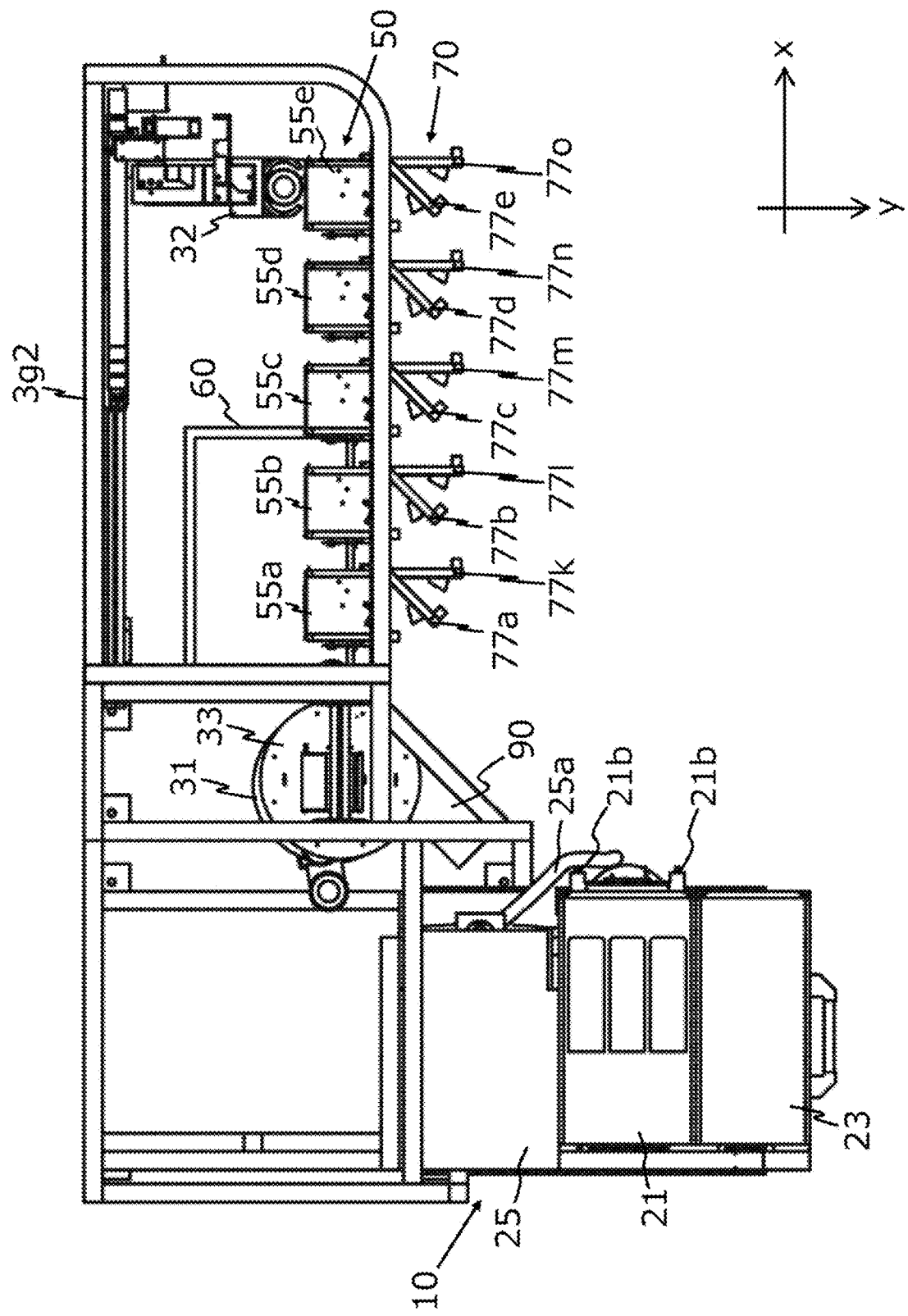
FIG. 48 is a diagram in which the outline of FIG. 20 is emphasized.

The container supply unit 33 is located above the transfer section-side turntable 31*a* of the first transfer unit 31 in the z direction, and supplies a container to the container holder 31*b* held by the transfer section-side turntable 31*a* (see FIGS. 19 and 47).

The container supply unit 33 has at least one container holding area for stacking and holding a plurality of containers in the z direction.

In order to set each container from the container supply unit 33 to the container holder 31*b*, it is necessary to position the container holder 31*b* directly under one of the container holding areas of the container supply unit 33. For such positioning, at least one of the transfer section-side turntable 31*a* of the first transfer unit 31 and the container supply unit 33 rotates about an axis parallel to the z direction.

Each container holding area of the container supply unit 33 is provided with a sensor for detecting whether or not the container is properly dropped on the container holder 31*b*, the remaining number of containers, or the like.

The first transfer unit 31 and the second transfer unit 32 are arranged such that the transfer range of the first transfer unit 31 and the transfer range of the second transfer unit 32 overlap in an area including the relay point P1.

The transfer ranges of the two transfer units are made to partially overlap. Thus, the beverage providing device 1 can be made smaller than the form in which the first transfer unit 31 and the second transfer unit 32 are arranged so as not to overlap the transfer range of the first transfer unit 31 with the transfer range of the second transfer unit 32.

Details of the movement control of the first transfer unit 31 and the second transfer unit 32 will be described later.

(Storage Section 50)

The storage section 50 has an area for holding two or more containers, each containing coffee supplied from the beverage supply unit 21.

The storage section 50 in the second embodiment has three or more storage cylinders (storage areas) 55 and three or more rear opening/closing doors 57.

Figure 25:
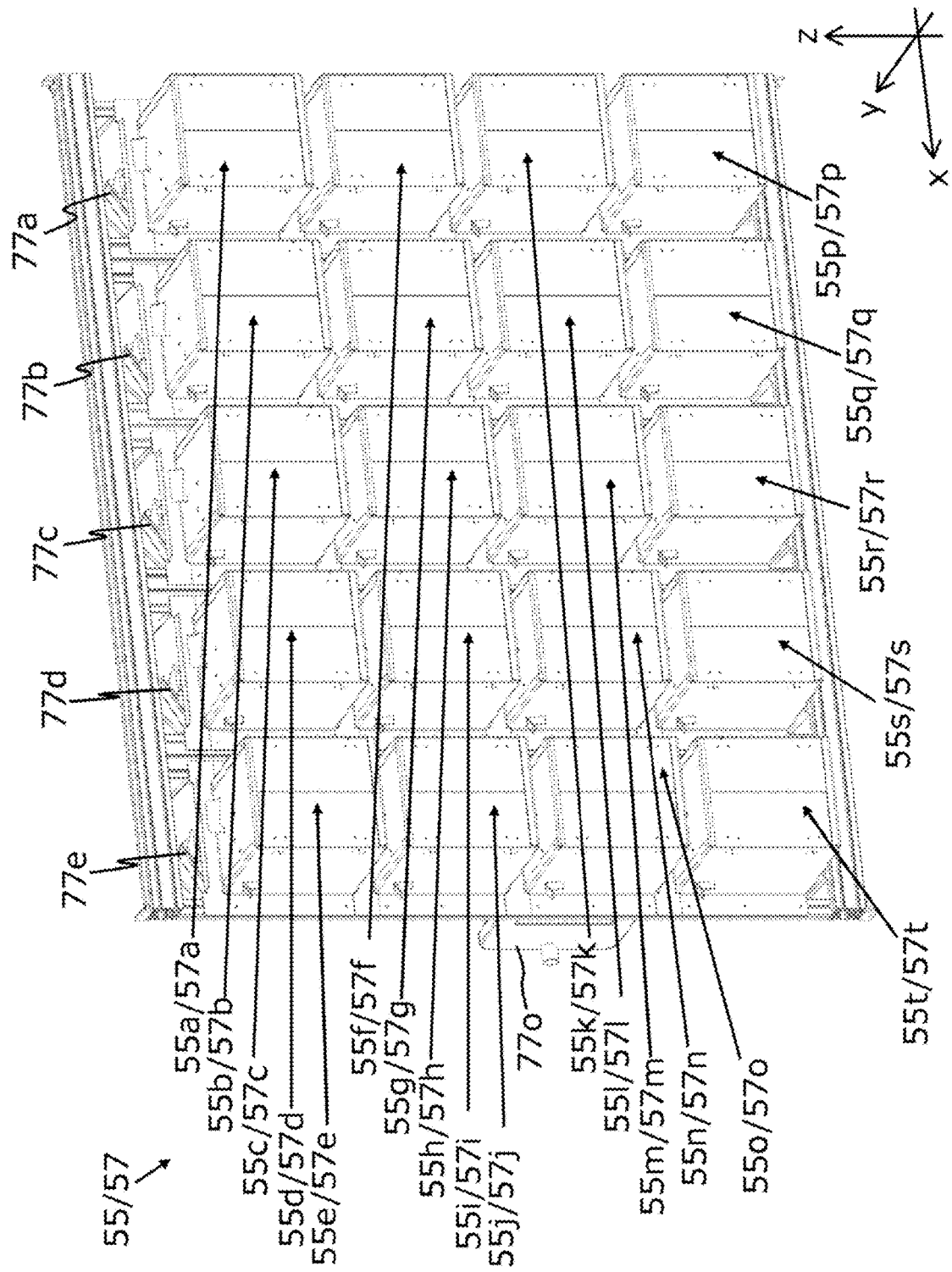
FIG. 25 is a perspective view of an area with rear opening/closing doors as viewed from the rear side.
Figure 50:
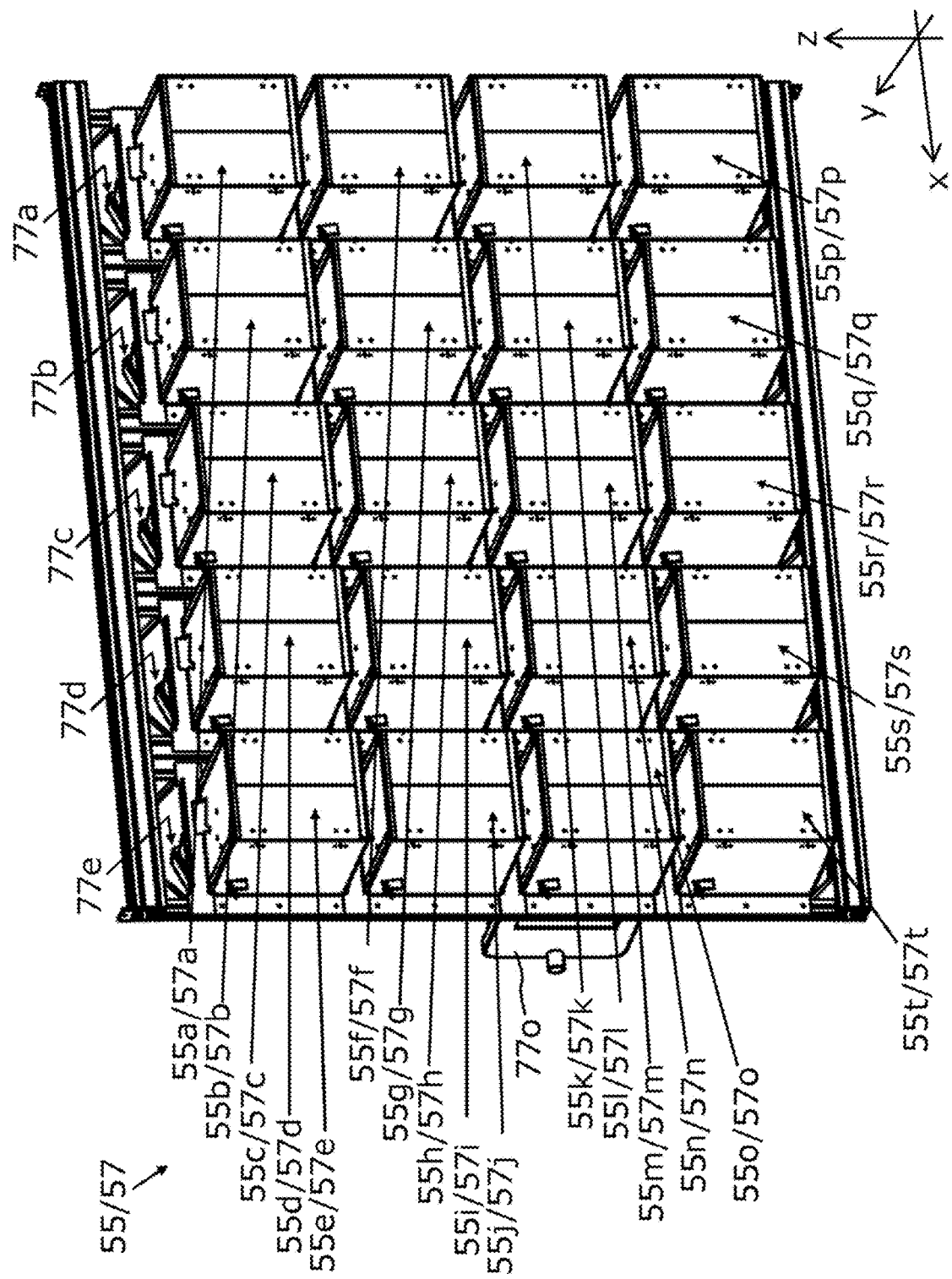
FIG. 50 is a diagram in which the outline of FIG. 25 is emphasized.

The second embodiment illustrates an example in which 20 storage cylinders 55 (the first storage cylinder 55*a* to the 20th storage cylinder 55*t*) are provided as the plurality of storage cylinders 55, and each of the 20 storage cylinders 55 is provided with the rear opening/closing door 57 (the first rear opening/closing door 57*a* to the 20th rear opening/closing door 57*t*) on the rear side in the y direction (see FIGS. 25 and 50).

Each of the first storage cylinder 55*a* to the 20th storage cylinder 55*t* has openings on the front side and the rear side in the y direction, and is provided with an upper surface and a lower surface perpendicular to the z direction, and a right side surface and a left side surface perpendicular to the x direction. The substantially square column-shaped cylinder is defined by said upper surface, said lower surface, said right side surface, and said left side surface.

The first rear opening/closing door 57*a* to the 20th rear opening/closing door 57*t* are each provided at the rear opening of the corresponding storage cylinder 55.

Each of the first rear opening/closing door 57*a* to the 20th rear opening/closing door 57*t* opens by entering a container-gripping portion of the second transfer unit 32 from the rear in the y direction and closes by retreating the container-gripping portion of the second transfer unit 32 retreats.

That is, the second transfer unit 32 transfers the container containing the beverage supplied from the beverage supply unit 21 to the storage cylinder 55 via the rear opening/closing door 57.

Details of the opening/closing control of the first rear opening/closing door 57*a* to the 20th rear opening/closing door 57*t* will be described later.

In the front opening of each of the first storage cylinder 55*a* to the 20th storage cylinder 55*t*, an outlet 71 (the first outlet opening 71*a* to the 20th outlet opening 71*t*) is formed, and the corresponding one of the first front opening/closing door 77*a* to the 20th front opening/closing door 77*t* is attached.

That is, the front opening/closing door 77 and the rear opening/closing door 57 are positioned to sandwich the corresponding storage cylinder 55 in the y direction.

Figure 26:
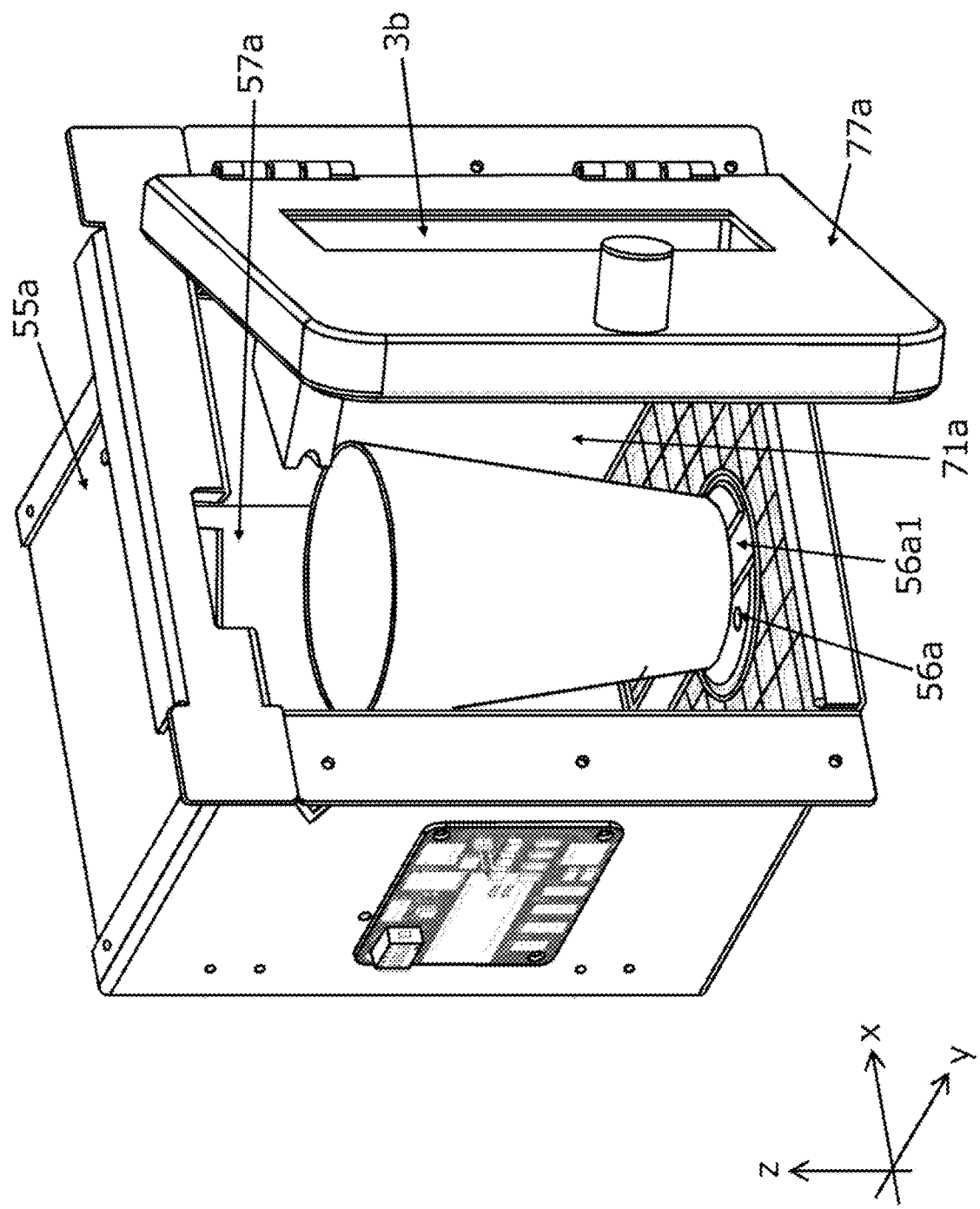
FIG. 26 is a perspective view of a first storage cylinder and a first front opening/closing door as viewed from the front left.

The inside of each of the first storage cylinder 55*a* to the 20th storage cylinder 55*t* has an area (second container mounting part 56*a*) for mounting a container delivered by the second transfer unit 32 (see FIG. 26).

The second container mounting part 56*a* has the second recess 56*a*1 into which the claw 32*a* of the second transfer unit 32 is inserted.

(Sensor in Storage Cylinder 55)

A sensor for detecting inside state of each of the first storage cylinder 55*a* to the 20th storage cylinder 55*t* is installed in each of the cylinders.

For instance, a temperature sensor is installed inside each of the first storage cylinder 55*a* to the 20th storage cylinder 55*t* (e.g., on the upper surface of the cylinder). Based on the temperature information, the controller 90, etc., determines whether or not the correct type of beverage is stored (whether a container containing hot coffee has been erroneously stored or the like, even though an instruction signal to store a container containing cold coffee has been issued).

Further, for instance, a camera is installed inside each of the first storage cylinder 55*a* to the 20th storage cylinder 55*t*. Based on an image signal obtained by capturing the image, the controller 90, etc., determines whether a foreign material different from a coffee-containing container is entered or whether the container has fallen without being mounted on the second container mounting part 56*a*.

In the above cases of detecting an abnormality inside the storage cylinder 55, the controller 90 stops a new container from being stored in the storage cylinder 55 having a detected abnormality until a user completes the work of resolving the abnormality.

(Heater 51*a* and Cooler 52*a*)

Like the first embodiment, some of the storage cylinders 55 (e.g., the first storage cylinder 55*a* to the tenth storage cylinder 55*j*) may be used as the first storage section 51, and the rest of the storage cylinders 55 (e.g., the 11th storage cylinder 55*k* to the 20th storage cylinder 55*t*) may be used as the second storage section 52.

In this case, the first storage cylinder 55*a* to the tenth storage cylinder 55*j* are each equipped with a heater 51*a* (e.g., on the lower surface forming the cylinder), and the 11th storage cylinder 55*k* to the 20th storage cylinder 55*t* are each equipped with a cooler 52*a* (e.g., on the upper surface forming the cylinder).

In addition, in this case, a partition wall 53 may be provided between the first storage section 51 and the second storage section 52.

(Disposal Section 60)

Figure 28:
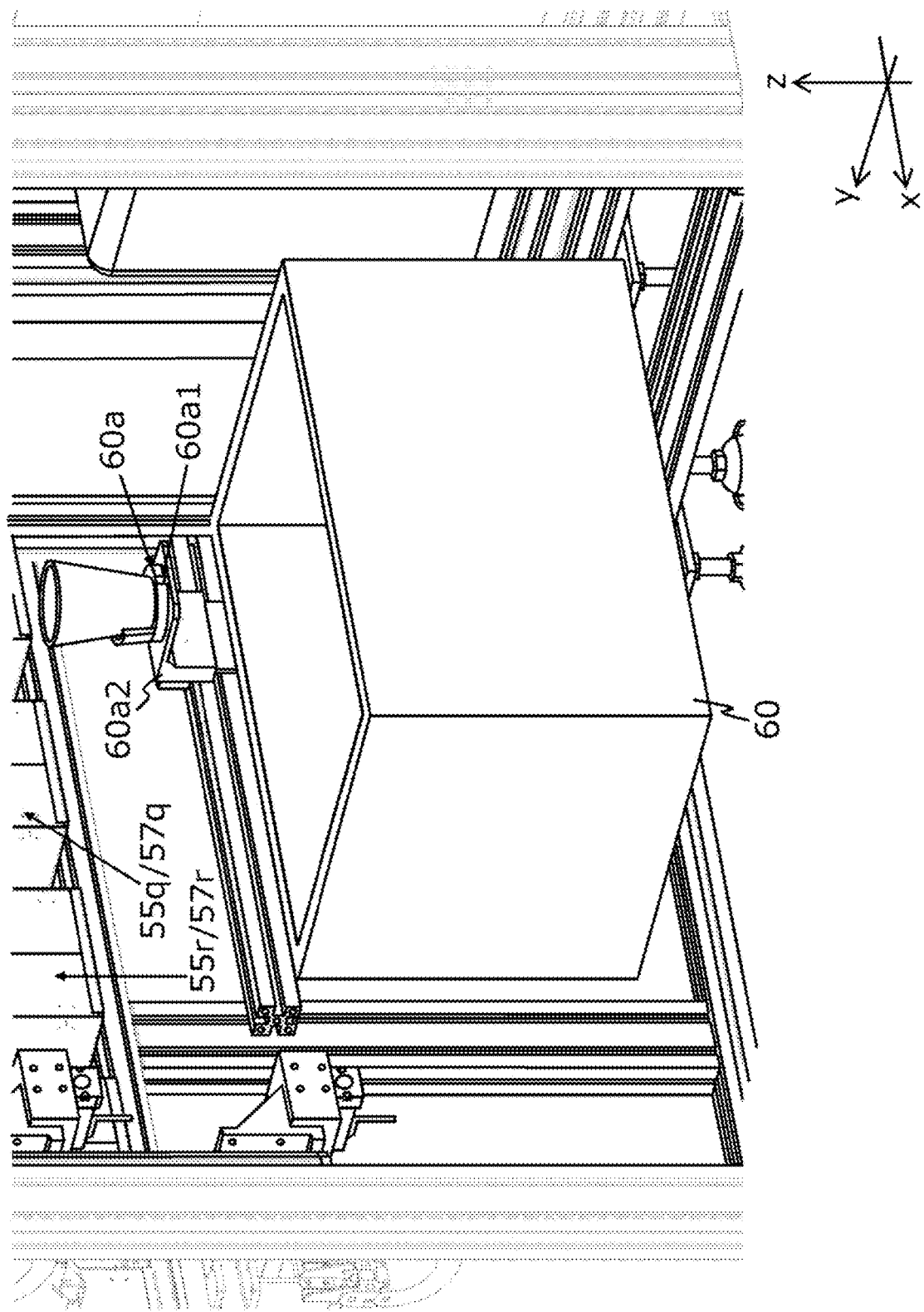
FIG. 28 is a perspective view of an area with a disposal section as viewed from the rear.
Figure 29:
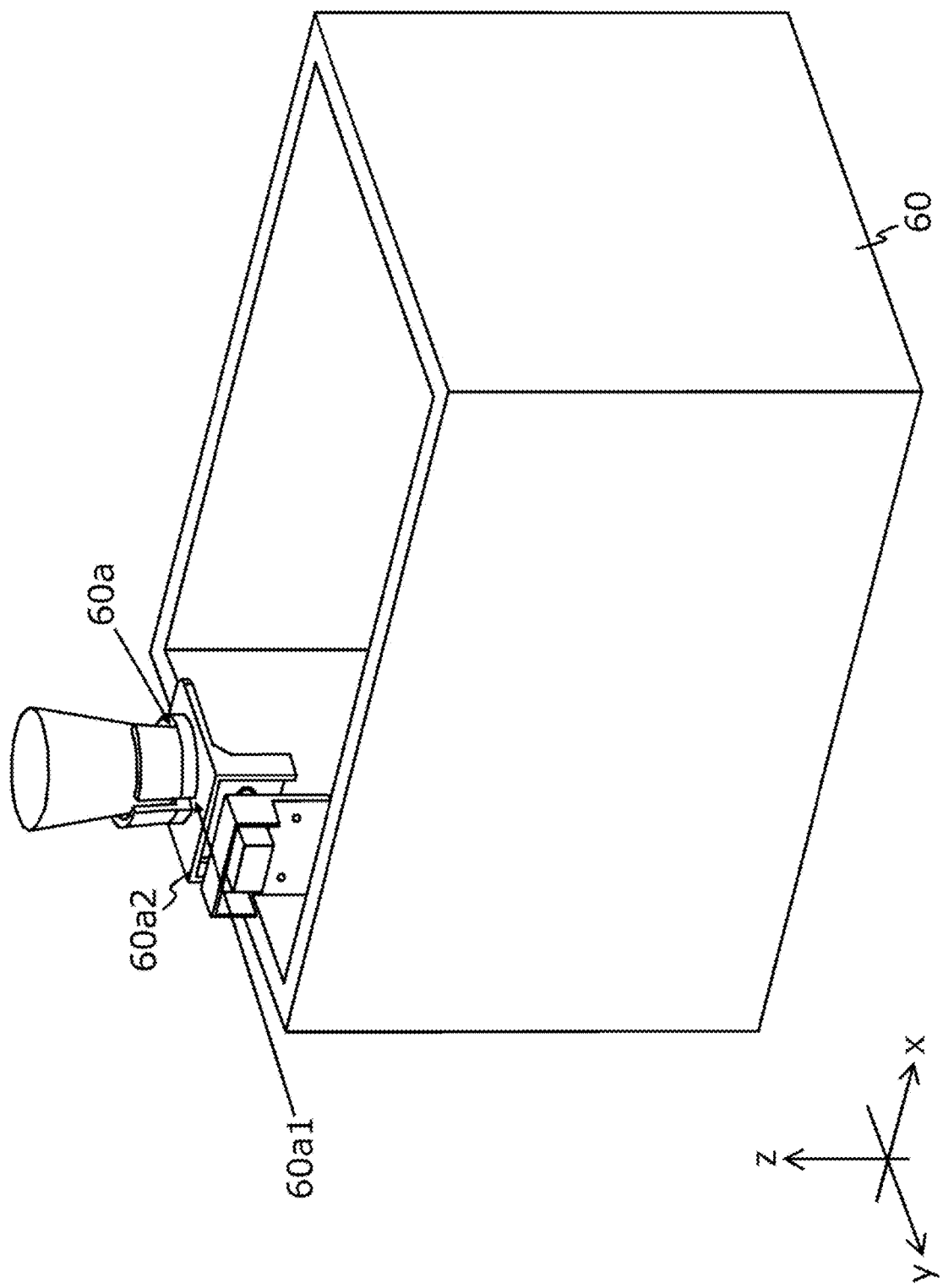
FIG. 29 is a perspective view of the disposal section as viewed from the rear.
Figure 30:
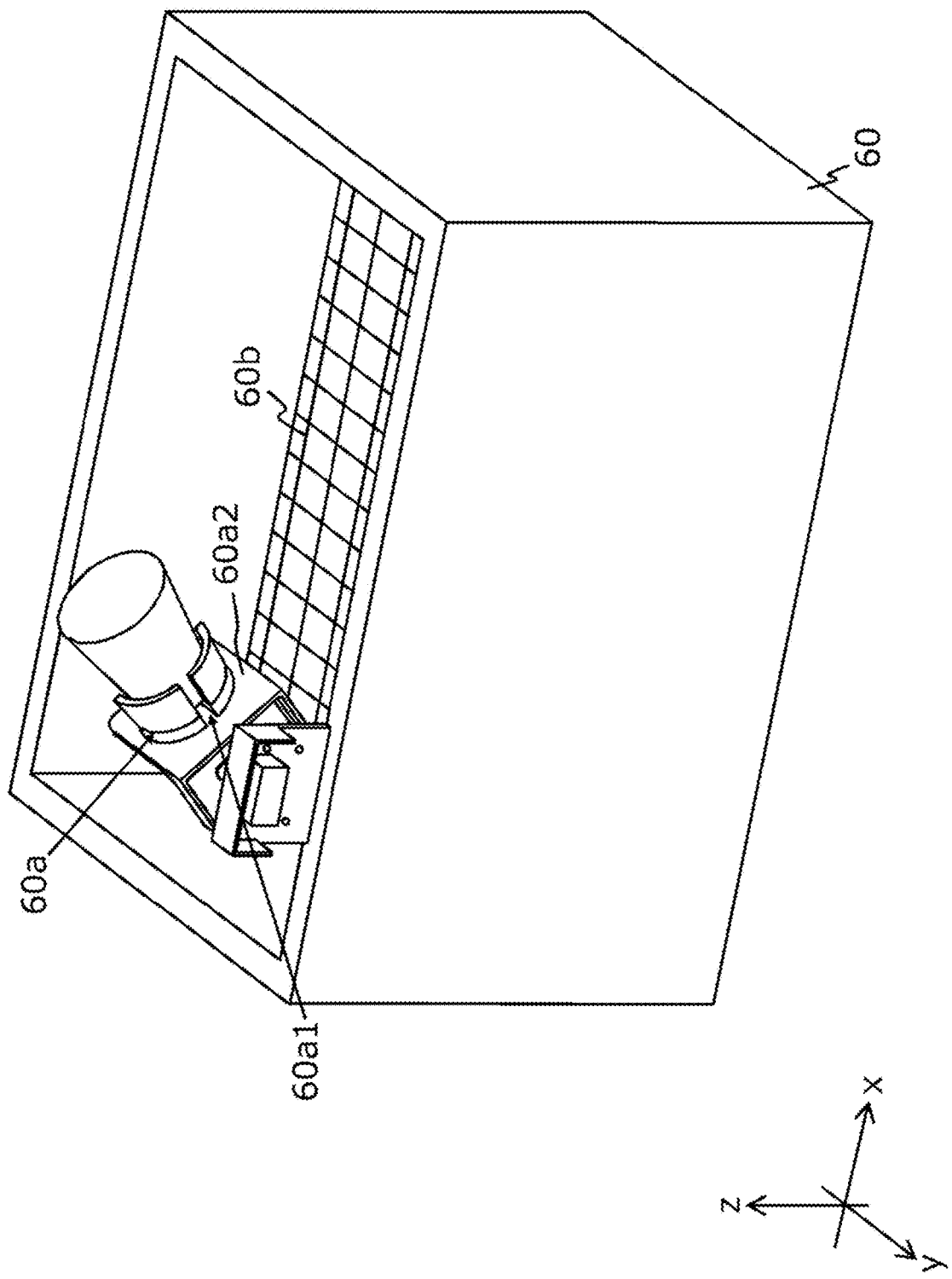
FIG. 30 is a perspective view of the disposal section with a slanted container as viewed from the front.

The disposal section 60 is a trash can for disposal of each container that contains coffee and is held in the storage section 50 and for which the elapsed time after supplied from the beverage supply unit 21 or the elapsed time after held in the storage section 50 has passed the first time t1 (e.g., t1=20 min) (see FIGS. 28 to 30).

The disposal section 60 is provided below the storage section 50.

The transfer of the container from the storage section 50 to the disposal section 60 is performed by the second transfer unit 32.

A third container mounting part 60*a* is provided at an upper portion of the disposal section 60.

The third container mounting part 60*a* has the third recess 60*a*1 into which the claw 32*a* of the second transfer unit 32 is inserted.

The container to be discarded is moved from the storage section 50 to the third container mounting part 60*a* by the second transfer unit 32.

The third container mounting part 60*a* has a disposal mechanism 60*a*2 capable of switching between a horizontal state and an obliquely inclined state.

When detecting that a container has been mounted on the third container mounting part 60*a*, the disposal mechanism 60*a*2 operates so as to change from the horizontal state to the inclined state. As a result, the container mounted on the third container mounting part 60*a* is fallen into the trash can in the disposal section 60.

The disposal mechanism 60*a*2 may be electrically operated, or may operate such that the urging force of its elastic member is used to keep the container in a horizontal state when the container is not mounted and cause the container to be tilted due to the weight of the container when mounted.

It is desirable that a trash can portion of the disposal section 60 is provided with a strainer 60*b* for separating a solid, such as a container, from liquid such as coffee (see FIG. 30).

Of the beverages supplied from the beverage supply unit 21, those that have reached a certain period of time are discarded together with their container.

This can avoid providing a purchaser with a deteriorated beverage.

Since the disposal section 60 is arranged near the storage section 50, it is possible to efficiently dispose of any container held in the storage section 50 by using the second transfer unit 32 with a short transfer distance.

(Provision Section 70)

Figure 24:
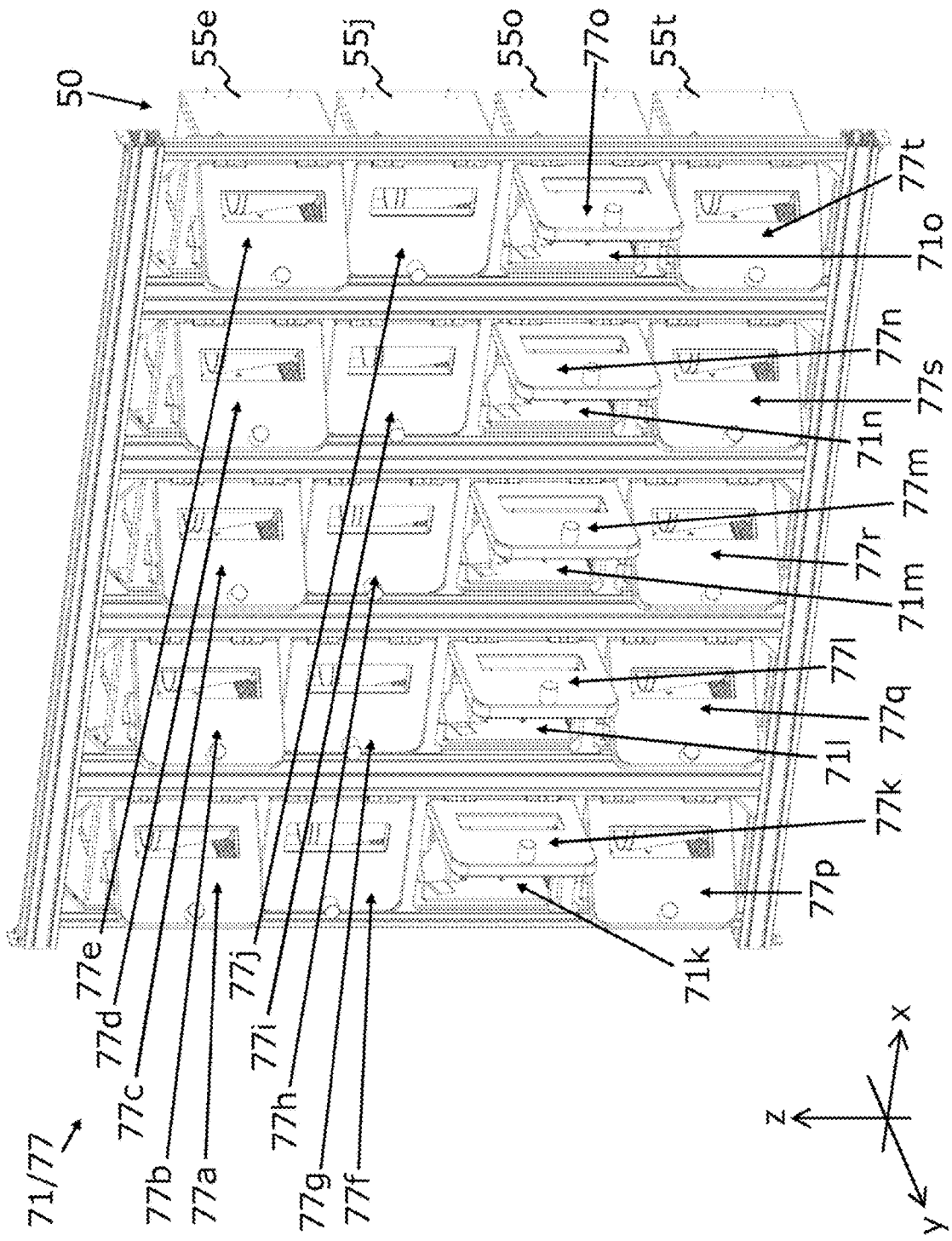
FIG. 24 is a perspective view of an area with front opening/closing doors as viewed from the front side.
Figure 49:
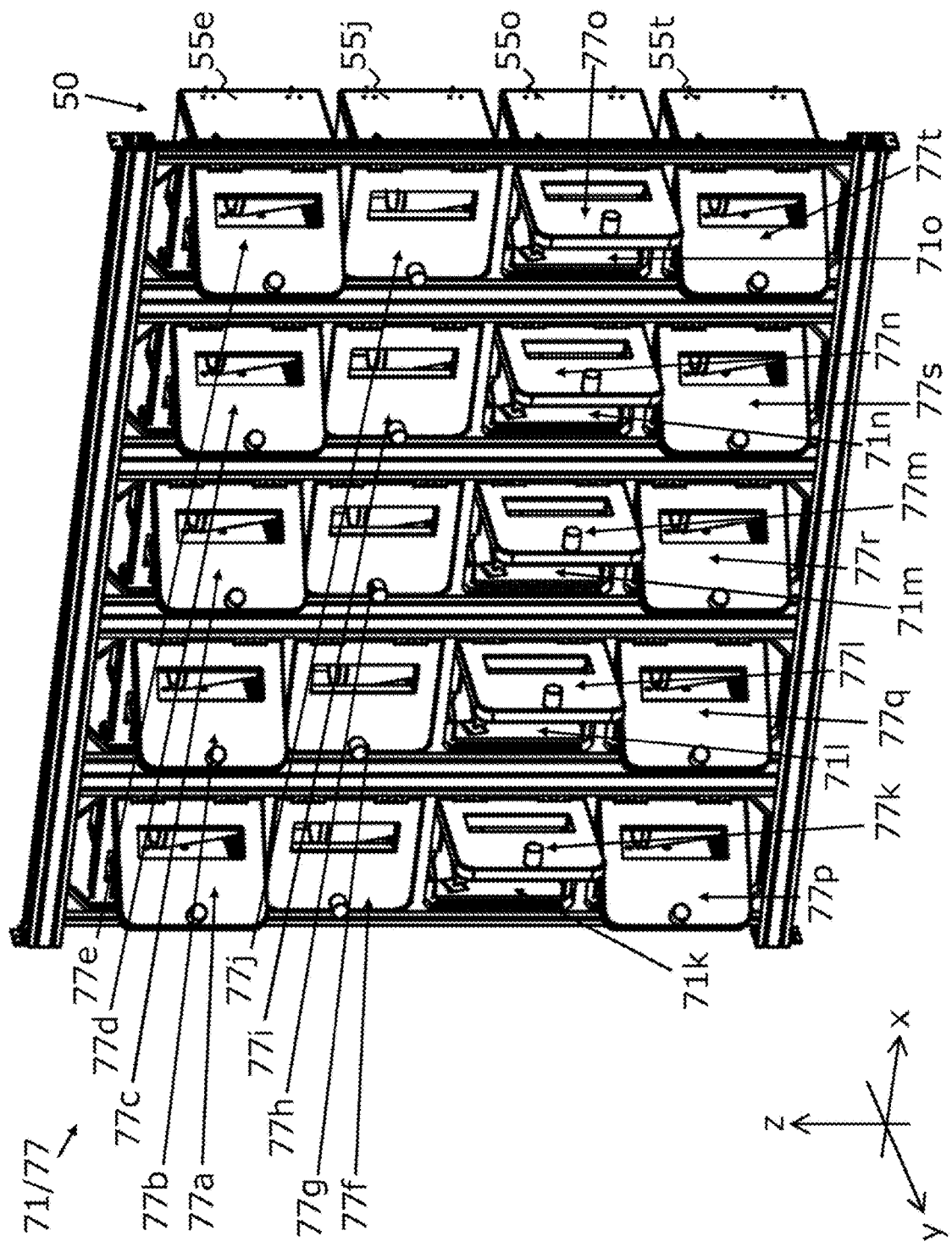
FIG. 49 is a diagram in which the outline of FIG. 24 is emphasized.

The provision section 70 is an area where each purchaser picks up a container containing coffee being purchased, and has outlets 71 (the first outlet opening 71*a* to the 20th outlet opening 71*t*) and front opening/closing doors 77 (the first front opening/closing door 77*a* to the 20th front opening/closing door 77*t*) (see FIGS. 24 and 49).

In the second embodiment, the provision section 70 and the storage section 50 are adjacent in the y direction and are integrated.

The storage section 50 and the provision section 70 are aligned in the y direction.

That is, the storage section 50 is provided near the provision section 70.

Each outlet 71 is an opening provided at the first front face 3/1*a* of the housing 3.

Each container containing the beverage supplied from the beverage supply unit 21 is made ready to be picked up through the outlet 71 from the side (the outer side of the housing 3) that is at the first front face 3/1*a* of the housing 3 and is opposite to the side of the beverage generator 10, the transfer section 30, and the storage section 50.

Figure 27:
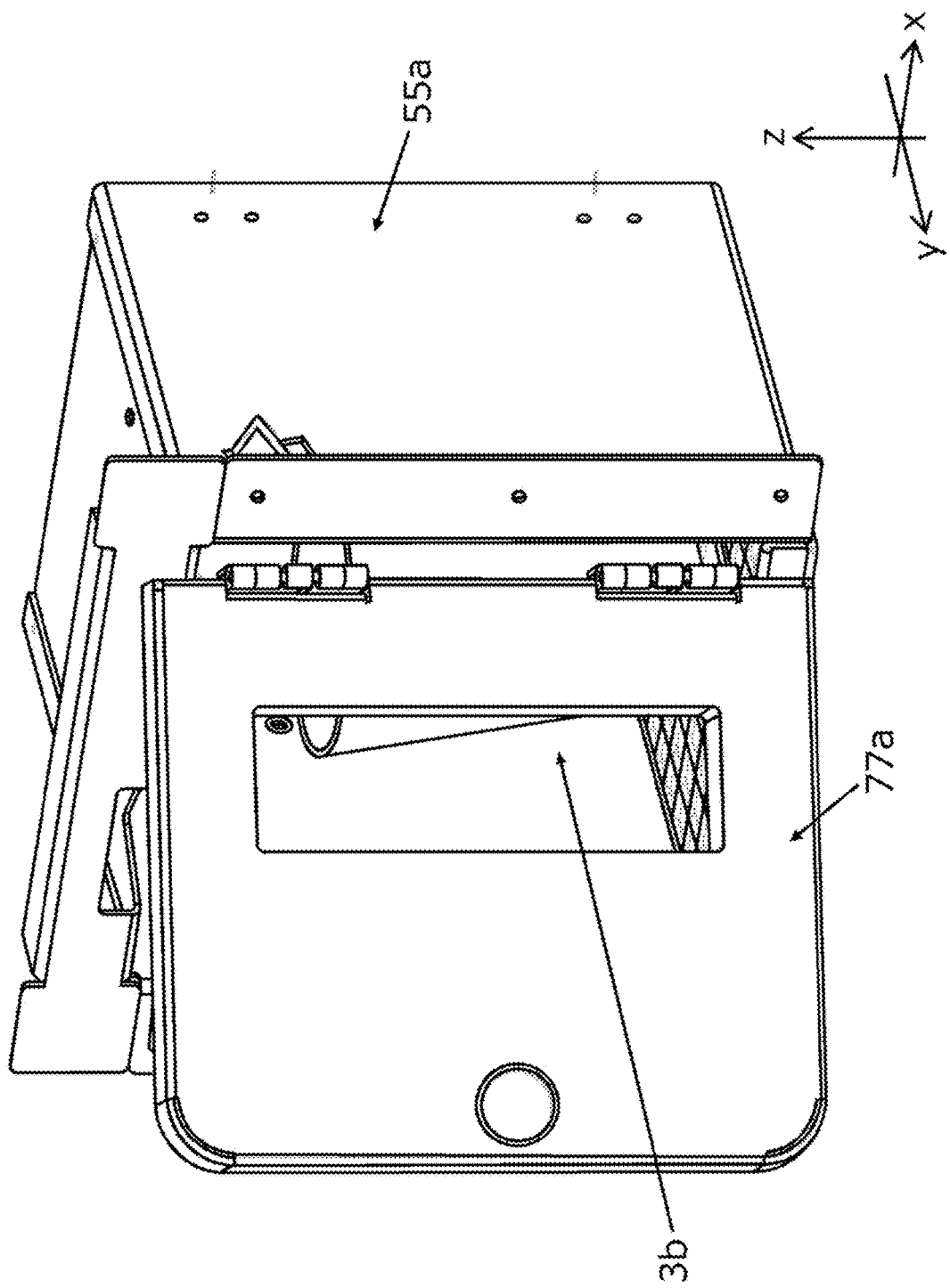
FIG. 27 is a perspective view of the first storage cylinder and the first front opening/closing door as viewed from the front right.

The first front opening/closing door 77*a* to the 20th front opening/closing door 77*t* are each provided with a display window 3*b* so that the inside of each storage cylinder 55 can be seen from the outside (see FIGS. 26 and 27).

The opening/closing control of each of the first front opening/closing door 77*a* to the 20th front opening/closing door 77*t* is executed by the controller 90.

Details of the opening/closing control of the first front opening/closing door 77*a* to the 20th front opening/closing door 77*t* will be described later.

In the second embodiment, display and operation regarding the payment are performed at the purchaser's terminal (purchaser terminal 400), and the operation section 80 is mitted.

However, like the first embodiment, the operation section 80 may be provided.

(Controller 90)

The controller 90 controls each section/unit of the beverage providing device 1, such as the movement control of the first transfer unit 31 as described later.

(Control of Coffee Extraction by Beverage Supply Unit 21 Etc.)

The controller 90 sends, to the selection button manipulator 21*b* and the first transfer unit 31, information about an instruction (the first work instruction) for transferring a container to the predetermined position s0.

Specifically, the controller 90 sends, to the selection button manipulator 21*b*, the first transfer unit 31, and the second transfer unit 32, the type of beverage to be next supplied by the beverage supply unit 21 as information about the first work instruction.

For instance, if the coffee to be supplied by the beverage supply unit 21 is "cold coffee with milk", the controller 90 sends, to the first transfer unit 31, a signal of instruction for dropping "container corresponding to the cold coffee with milk" onto one of the first container mounting parts 31b1 by the container supply unit 33 of the transfer section 30, and then makes the container supply unit 33 operate.

In addition, after the "container corresponding to the cold coffee with milk" has been dropped onto the first container mounting part 31b1, the controller 90 sends, to the first transfer unit 31, a signal of instruction for moving the first container mounting part 31b1, which holds said container, to the transfer start position s1, and makes the transfer section-side turntable 31a rotate (the first rotational movement).

Further, after said first container mounting part 31b1 has been moved to the transfer start position s1, the controller 90 sends, to the first transfer unit 31, a signal of instruction for moving said first container mounting part 31b1 to the predetermined position s0, and makes the container holder 31b stretch (the first stretching movement).

Furthermore, after said first container mounting part 31b1 has been moved to the predetermined position s0, the controller 90 sends, to the selection button manipulator 21b, a signal of instruction for pushing a selection button 21a corresponding to "cold coffee with milk", and makes the selection button manipulator 21b operate.

Moreover, after the "cold coffee with milk" has been extracted into said container by the beverage supply unit 21 on the basis of the pushing operation by the selection button manipulator 21b, the controller 90 sends, to the first transfer unit 31, a signal of instruction for moving said first container mounting part 31b1 to the transfer start position s1, and makes the container holder 31b contract (the first contracting movement).

Once the container containing the extracted coffee has been moved from the predetermined position s0 to the transfer start position s1, a sensor (not shown) for monitoring the first transfer unit 31 or an area including the first transfer unit 31 sends, to the controller 90, the first completion report information indicating the fact that these works have been completed. The controller 90 then calculates the timing when the next first work instruction is given.

In addition, the movement control of the first transfer unit 31, which will be described later, is started.

(Control of Selecting Type of Coffee)

The type of beverage supplied from the beverage supply unit 21, namely, the type of coffee is determined on the basis of the number of coffee containers held in the storage section 50, the past sales performance, and the date and time when a purchaser who has made a payment picks up the coffee, or the like.

The past sales performance may be the sales performance of the past several hours or the sales performance of each time zone of the past several days.

For instance, in the case where the number of milk-containing hot coffee containers held in the storage section 50 is less than a container count threshold, the controller 90 sends, to the selection button manipulator 21b or the like, an instruction for supplying milk-containing hot coffee by the beverage supply unit 21, as information about the first work instruction.

Also, for instance, the controller 90 sends, to the selection button manipulator 21b or the like, an instruction for supplying, by the beverage supply unit 21, the coffee whose type is the same as that purchased by the purchaser at the time before the third time t3 (e.g., t3=15 min) of the pick-up time of said purchaser who has made a payment, as information about the first work instruction.

In addition, the type of coffee to be supplied by the beverage supply unit 21 may be determined in consideration of the temperature, events to be held around the beverage providing device 1, the number of people around the beverage providing device 1, or the like.

For instance, when air temperature is lower than a temperature threshold, the controller 90 sends, to the selection button manipulator 21b or the like, information about the first work instruction so that a larger number of hot coffee containers are stored in the storage section 50.

These determinations may be made by the controller 90 or by an external server 100 which communicates with the controller 90 in some embodiments.

Further, the controller 90 sends, to the selection button manipulator 21b or the like, information about the first work instruction on the basis of the number of coffee containers stored in the storage section 50, the past sales results, or the like. Then, the controller 90 controls an interval until information about the next first work instruction is sent to the selection button manipulator 21b or the like, namely, a time interval for coffee extraction.

Before the time zone during which the sales volume is large, for instance, before lunch break, said interval is shortened so that a large amount of coffee can be supplied. In the time zone where the sales volume is small, for instance, in midnight, said interval is made longer so as to reduce the supply amount of coffee.

(Control or the Like of Instruction for Coffee Bean Replenishment to Server 100, Etc.)

Based on the quantity of coffee supplied from the beverage supply unit 21, the work time, or the like, the controller 90 sends to the server 100, an instruction for coffee bean replenishment, an instruction for disposal of coffee powder after the extraction step, and an instruction for cleaning of the beverage supply unit 21, as information about the second work instruction.

The server 100 transmits information about the second work instruction to a worker's terminal (worker terminal 200) or the like. Note that the information about the second work instruction may be directly transmitted to the worker terminal 200 or the like without going through the server 100 in some embodiments.

The quantity of coffee supplied from the beverage supply unit 21 may be calculated based on the number of receptions, by the controller 90, of the first completing report information. The first completion report information indicates the fact that the operation of the relevant selection button manipulator 21b or the like has been completed, and is from the sensor (not shown) for monitoring the first transfer unit 31 or an area including the first transfer unit 31. Alternatively, said quantity may be calculated by the number of containers transferred by the below-described first transfer unit 31, or may be calculated by the number of times of coffee extraction counted by the beverage supply unit 21.

When the replenishment of coffee beans, the disposal of coffee powder, the cleaning of the beverage supply unit 21, or the like is completed, the worker inputs, into the worker terminal 200 or the server 100, the second completion report information indicating the fact that these operations have been completed. The second completion report information is input, for instance, by operating a completion button 301b through a maintenance management screen 301 displayed on the worker terminal 200. The second completion report information is transmitted to the controller 90, and the controller 90 then calculates the timing of instructing the next coffee bean replenishment, etc.

(Control or the Like of Instruction for Milk Replenishment to Server 100, Etc.)

The controller 90 calculates the amount of milk consumed on the basis of the volume of milk-containing coffee supplied from the beverage supply unit 21, the amount of milk supplied from the milk tank 23 to the beverage supply unit 21, or the like. Then, the controller 90 sends a milk replenishment instruction or a milk replacement instruction to the server 100, as information about the third work instruction.

The server 100 transmits the information about the third work instruction to the worker terminal 200 or the like. Note that the information about the third work instruction may be directly transmitted to the worker terminal 200 or the like without going through the server 100 in some embodiments.

The amount of milk consumed may be calculated based on the number of receptions, by the controller 90, of the first completing report information. The first completion report information indicates the fact that the operation of the relevant selection button manipulator 21*b* or the like has been completed, and is from the sensor (not shown) for monitoring the first transfer unit 31 or an area including the first transfer unit 31. Alternatively, said quantity may be calculated by the number of containers transferred by the below-described first transfer unit 31, or may be calculated by the number of times of coffee extraction counted by the beverage supply unit 21.

When the replenishment or replacement of milk is completed, the worker inputs, into the worker terminal 200 or the server 100, the third completion report information indicating the fact that the work has been completed. The third completion report information is input, for instance, by operating the completion button 301*b* through the maintenance management screen 301 displayed on the worker terminal 200 (see FIG. 31). The third completion report information is transmitted to the controller 90, and the controller 90 then calculates the timing when the next milk replenishment instruction or the like is given.

(Control of Instruction for Cleaning of Ice Maker to Server 100, Etc.)

Based on the volume or the like of cold coffee supplied from the beverage supply unit 21, the controller 90 sends, to the server 100, an instruction for cleaning of the ice maker 25, as information about the fourth work instruction.

The server 100 transmits information about the fourth work instruction to the worker terminal 200 or the like. Note that the information about the fourth work instruction may be directly transmitted to the worker terminal 200 or the like without going through the server 100 in some embodiments.

When the cleaning of the ice maker 25 is completed, the worker inputs, into the worker terminal 200 or the server 100, the fourth completion report information indicating the fact that the work has been completed. The fourth completion report information is input, for instance, by operating the completion button 301*b* through the maintenance management screen 301 displayed on the worker terminal 200. The fourth completion report information is transmitted to the controller 90, and the controller 90 then calculates the timing when an instruction for the next cleaning of the ice maker 25 is given.

(Control of Instruction for Disposal to Server 100 Etc.)

Based on the number or the like of containers discarded from the storage section 50 toward the disposal section 60, the controller 90 sends, to the server 100, an instruction for cleaning of the disposal section 60 (instruction for disposal of waste accumulated in the disposal section 60), as information about the fifth work.

The server 100 transmits information about the fifth work instruction to the worker terminal 200 or the like. Note that the information about the fifth work instruction may be directly transmitted to the worker terminal 200 or the like without going through the server 100 in some embodiments.

When the cleaning of the disposal section 60 is completed, the worker inputs, into the worker terminal 200 or the server 100, the fifth completion report information indicating the fact that the work has been completed. The fifth completion report information is input, for example, by operating the completion button 301*b* through the maintenance management screen 301 displayed on the worker terminal 200. The fifth completion report information is transmitted to the controller 90, and the controller 90 then calculates the timing when an instruction for the next cleaning of the disposal section 60 is given.

(Movement Control of First Transfer Unit 31)

The controller 90 controls the movement of the first transfer unit 31 after the operation based on the first work instruction is completed.

Specifically, when a container containing coffee supplied from the beverage supply unit 21 is positioned at the predetermined transfer start position s1, the controller 90 lets the first transfer unit 31 transfer the container to the relay point P1.

That is, after the operation based on the first work instruction is completed, the controller 90 sends, to the first transfer unit 31, a signal of instruction for moving the first container mounting part 31*b*1 holding the coffee-containing container to the second position s2, and makes the transfer section-side turntable 31*a* rotate (the second rotational movement).

In addition, after the first container mounting part 31*b*1 has been moved to the second position s2, the controller 90 sends, to the first transfer unit 31, a signal of instruction for moving said first container mounting part 31*b*1 to the relay point P1, and makes the container holder 31*b* stretch (second stretching movement).

After the container delivered to the relay point P1 is gripped by the second transfer unit 32, the controller 90 sends, to the first transfer unit 31, a signal of instruction for moving the first container mounting part 31*b*1 not holding said container to the second position s2, and makes the container holder 31*b* contract (the second contracting movement).

(Movement Control of Second Transfer Unit 32 (Placement onto Storage Cylinder 55 and Disposal from Storage Cylinder 55))

The controller 90 controls the movement of the second transfer unit 32.

Specifically, when the coffee-containing container is positioned at the relay point P1, the controller 90 lets the second transfer unit 32 grip said container and transfer it to the storage section 50.

The controller 90 records information on the type of coffee (with/without milk, cold/hot) contained in the container delivered to the storage section 50, information on where to locate in the storage section 50 (into which storage cylinder 55 the container is stored), and information on the elapsed time.

The elapsed time herein refers to an elapsed time after a beverage is supplied from the beverage supply unit 21 to the container, or an elapsed time after mounted in the storage section 50.

Further, the controller 90 lets the second transfer unit 32 deliver, to the third container mounting part 60a of the disposal section 60, any container that has been mounted in the storage section 50 and for which the elapsed time after the beverage is supplied from the beverage supply unit 21 to the container or the elapsed time after mounted in the storage section 50 is the first time t1 or more.

The container mounted on the third container mounting part 60a is dropped downward by the disposal mechanism 60a2.

(Control of Opening/Closing of Rear Opening/Closing Door 57)

The controller 90 puts each rear opening/closing door (first rear opening/closing door 57a to 20th rear opening/closing door 57t) of the storage section 50 into a locked state in which cannot be opened/closed.

However, through the corresponding opening/closing regulatory mechanism 58, the controller 90 unlocks, among the first rear opening/closing door 57a to the 20th rear opening/closing door 57t, those from/into which a container is transferred by the second transfer unit 32 only when said container is transferred.

Note that the controller 90 may lock, among the first rear opening/closing door 57a to the 20th rear opening/closing door 57t, those corresponding to the storage cylinders 55 in the state where the front opening/closing door 77 is opened, and may unlock those corresponding to the storage cylinders 55 in the state where the front opening/closing door 77 is closed, in some embodiments.

Further, this makes it possible to prevent a purchaser or the like from opening the rear opening/closing door 57 and a hand or an object from entering behind the rear opening/closing door 57 in the y direction.

(Control of Opening/Closing of Front Opening/Closing Door 77)

The controller 90 puts each front opening/closing door (first front opening/closing door 77a to 20th front opening/closing door 77t) of the provision section 70 into a locked state in which it cannot be opened/closed.

However, the controller 90 unlocks, among the first front opening/closing door 77a to the 20th front opening/closing door 77t, those corresponding to the storage cylinder 55 in which a container containing coffee being purchased is stored in a case where the purchaser terminal 400 is located within a predetermined distance d (e.g., d=3 m) from the beverage providing device 1 and information about the pick-up is transmitted via the purchaser terminal 400.

That is, when a pick-up decision button 503b is operated through a pick-up confirmation screen 503 displayed on the purchaser terminal 400, the locked state of the front opening/closing door 77 is released which corresponds to the storage cylinder 55 storing a container containing coffee purchased using a purchaser ID through said pick-up confirmation screen 503.

Once the unlocked front opening/closing door 77 is closed, the front opening/closing door 77 is put into the locked state again.

In order to make it easier for the purchaser to recognize that said locked state has been released, it is desirable to provide the front opening/closing door 77 or the storage cylinder 55 with a display unit that lights up when said locked state is released.

(Determining Whether or not Purchase Terminal 400 is Near Beverage Providing Device 1)

Whether or not the purchaser's mobile terminal (purchaser terminal 400) is within the range of the predetermined distance d from the beverage providing device 1 may be determined by a method based on the distance between the mobile terminal and the beverage providing device 1 as calculated from information on the position of the mobile terminal and information on the position of the beverage providing device 1; a method based on whether or not communication such as short-range wireless communication is possible between the mobile terminal and the beverage providing device 1; or the like.

The controller 90 in the second embodiment is provided between the beverage generator 10 and the storage section 50 and at a position lower than the storage section 50.

It is desirable that the controller 90 has an earth leakage breaker.

In case of occurrence of electric leakage, for instance, when coffee spills from a container and the controller 90 gets wet, the beverage providing device 1 including the controller 90 can be stopped.

(Control of Monitoring Whether or not Coffee has been Successfully Supplied in Accordance with Work Instructions)

The controller 90 determines whether or not the coffee supplied by the beverage supply unit 21 corresponds to the first work instruction, that is, whether or not the correct type of coffee has been supplied in response to the first work instruction.

Specifically, a sensor 90a which determines, without contact, the type of coffee contained in a container such as a container before held by the first transfer unit 31, a container held by the first transfer unit 31, or a container gripped by the second transfer unit 32, is provided. Based on the information from the sensor 90a, the controller 90 determines whether or not the correct type of coffee has been generated in response to the first work instruction.

The sensor 90a may be, for instance, a temperature sensor for measuring the temperature of a container containing coffee, an infrared sensor for measuring components of coffee (moisture, fat content, lipid content) contained in the container, or the like.

In addition, if the quantity of coffee to be put into the container is made constant regardless of the type and the weight of the container is varied between the one for hot coffee and the one for cold coffee, a sensor for the weight including coffee can be used as the sensor 90a.

That is, based on the weight difference between the hot coffee container and the cold coffee container and the weight difference due to the presence or absence of milk, it is possible to identify the type of coffee contained in the container held by the first transfer unit 31 or the container gripped by the second transfer unit 32.

The sensor 90a may be provided at a location away from the first transfer unit 31, but may be built in the first transfer unit 31.

Further, the sensor 90a may be used not only for determining the type of coffee contained in the container, but also for determining whether or not the container has been successfully held or gripped.

Furthermore, the sensor 90a used for determining the type of coffee and/or whether or not the container has been successfully held or gripped may be built in the second transfer unit 32.

(Server 100)

The server 100 is a control device provided outside the beverage providing device 1, and is in communication with the controller 90 via a communication unit (not shown).

The controller 90 sends, to the server 100 and a recording unit (not illustrated) provided at the beverage providing device 1, information on the sales performance and disposal records of coffee in the beverage providing device 1, inventory status related to materials such as coffee beans and containers, information about the second to fifth work instructions, or the like.

The server 100 transmits the information about the second to fifth work instructions to the worker terminal 200 or the like.

The server 100 transmits, to the controller 90, information about the sales performance and disposal records of other beverage providing devices 1, weather information, the temperature, events to be held around the beverage providing device 1, the number of people around the beverage providing device 1, or the like.

Based on the information (e.g., sales performance, disposal records) collected in the server 100, the server 100 or the controller 90 of each beverage providing device 1 calculates the details of the first work instruction, the type of beverage contained in a container delivered in advance to the storage section 50, or the like.

The server 100 communicates with the purchaser terminal 400, performs a payment procedure based on purchase conditions set in the purchaser terminal 400, and transmits information on the purchase conditions to the corresponding beverage providing device 1.

(Worker Terminal 200)

Maintenance software is installed on the worker terminal 200.

The worker terminal 200 displays the maintenance management screen 301 based on the information about the second to fifth work instructions transmitted from the server 100 via the maintenance software.

The management screen 301 is displayed when the worker terminal 200 receives at least one of the information about the second to fifth work instructions from the server 100.

(Management Screen 301)

Figure 31:
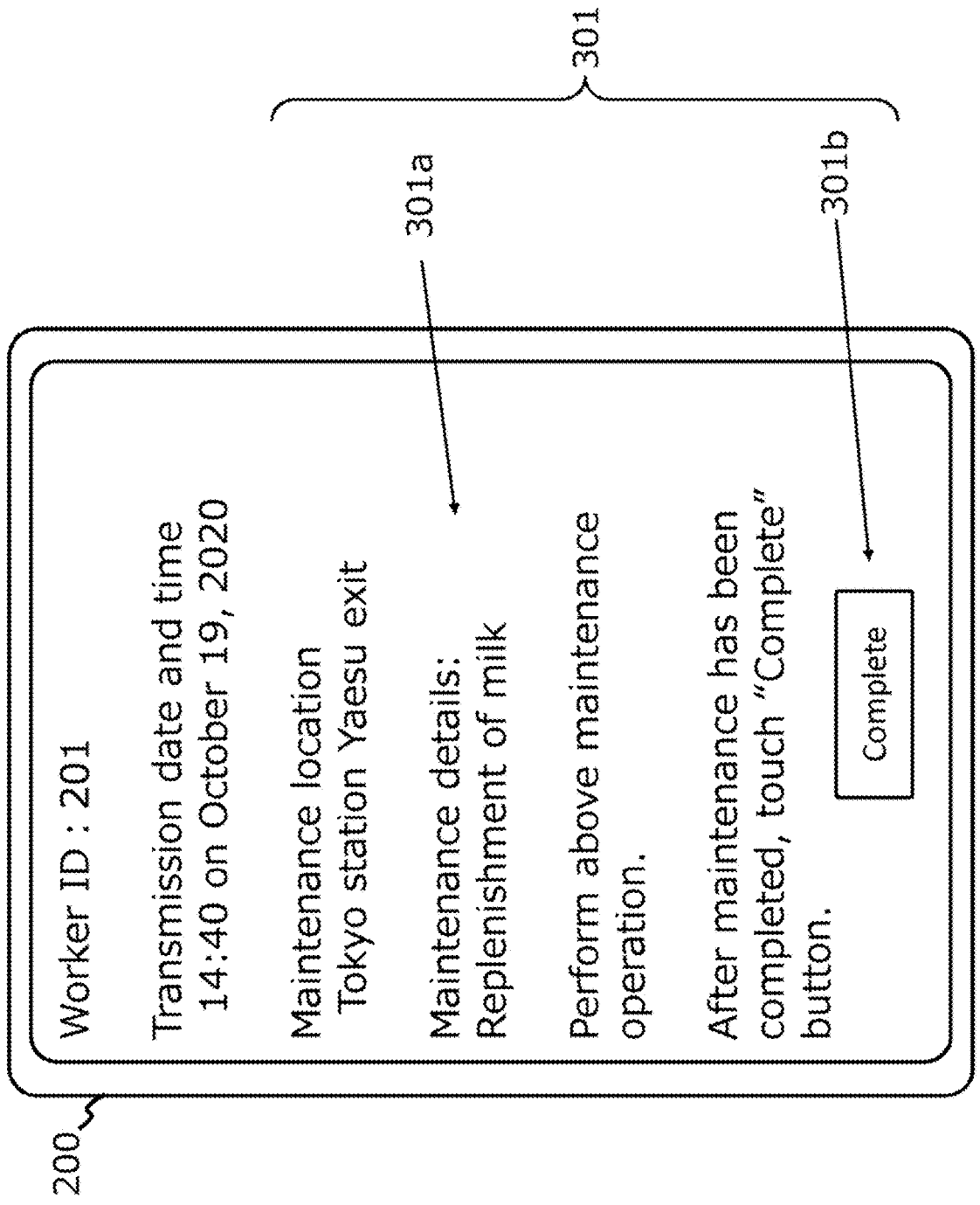
FIG. 31 is a front view of a worker terminal displaying a maintenance management screen.

The management screen 301 has a maintenance instruction area 301*a* and the completion button 301*b* (see FIG. 31).

The maintenance instruction area 301*a* contains information about a maintenance instruction.

When the completion button 301*b* is operated, the worker terminal 200 transmits, to the server 100, information indicating the fact that said maintenance has been completed.

FIG. 31 shows an example in which while a worker with ID: 201 is logged in to the maintenance software, the worker terminal 200 displays the management screen 301 that instructs milk replenishment based on the third work instruction for the beverage providing device 1 installed at the "Tokyo Station Yaesu Exit".

Note that the management screen 301 may be displayed with a message such as an e-mail without using the maintenance software.

(Purchaser Terminal 400)

Purchase-use software is installed in the purchaser terminal 400.

Figure 32:
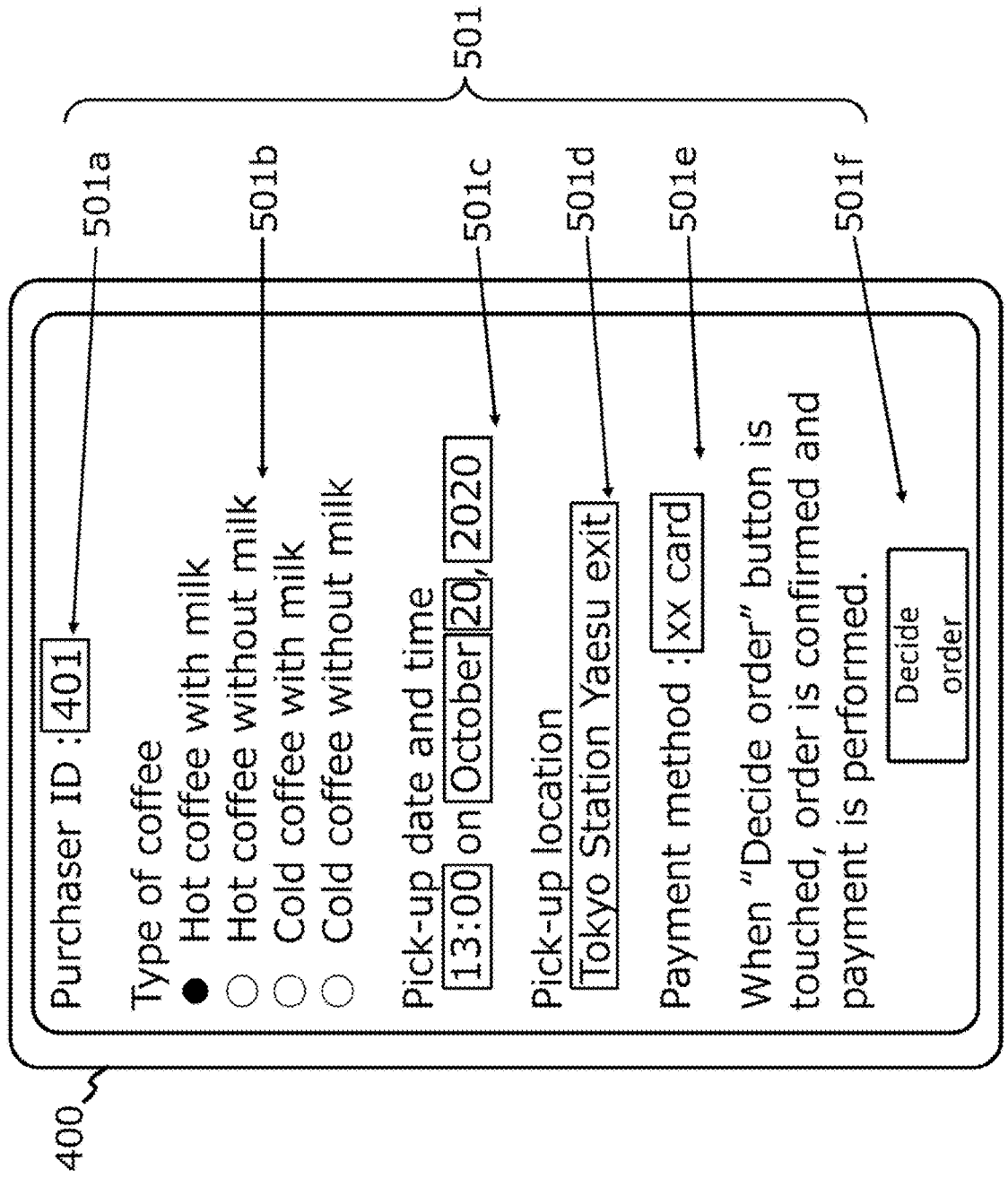
FIG. 32 is a front view of a purchaser terminal displaying a purchase condition setting screen.
Figure 33:
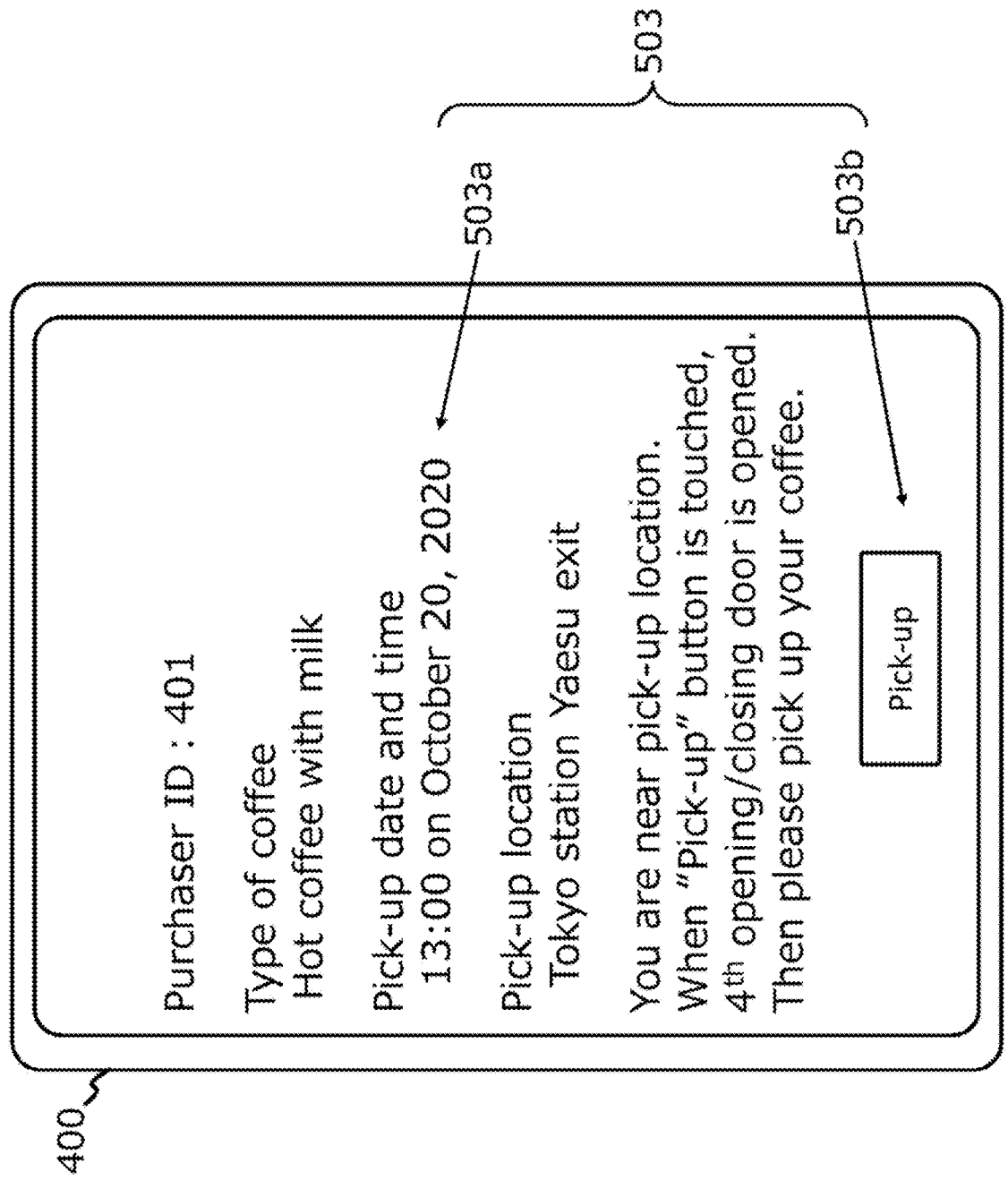
FIG. 33 is a front view of the purchaser terminal displaying a pick-up confirmation screen.
Figure 34:
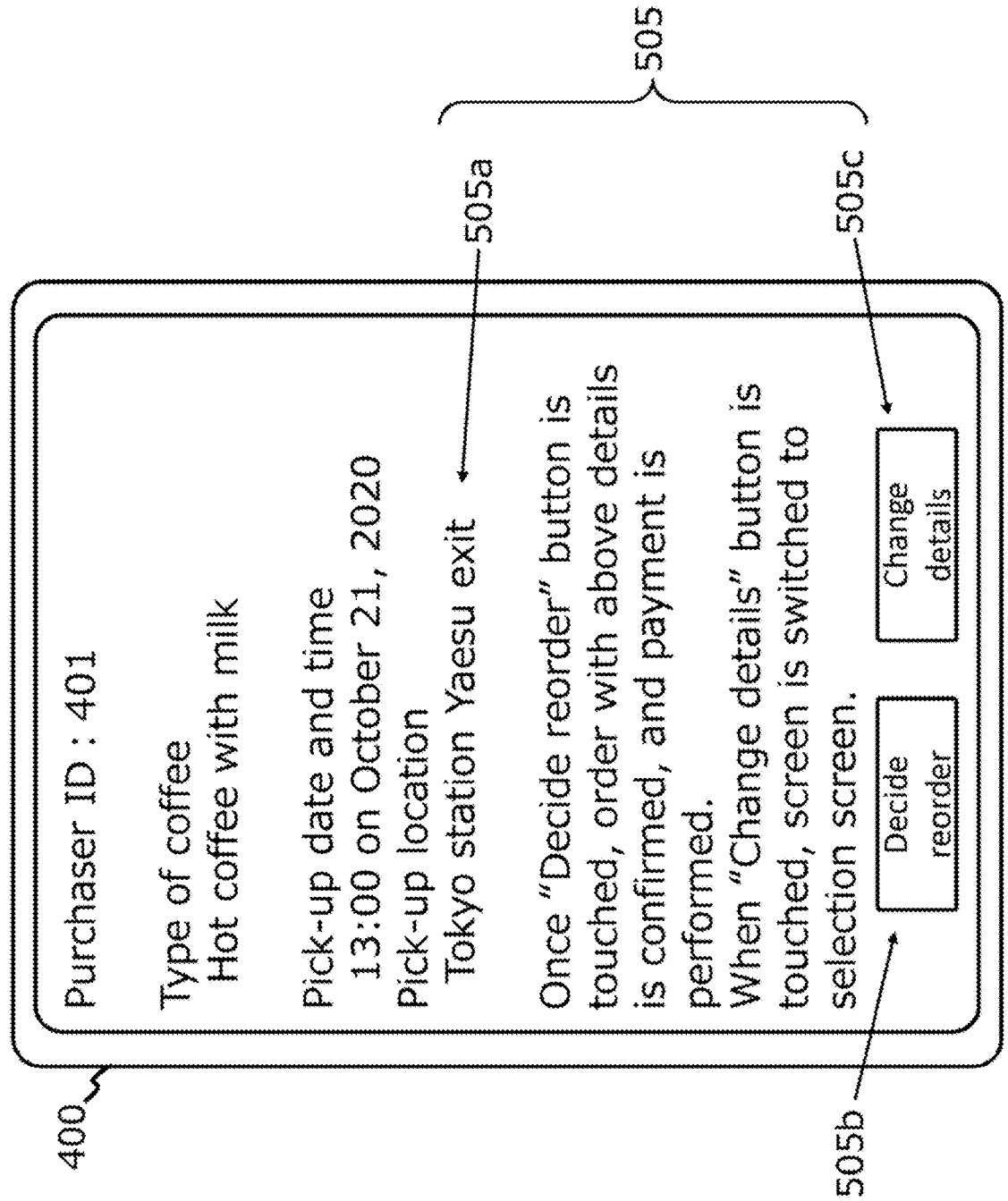
FIG. 34 is a front view of the purchaser terminal displaying a repurchase confirmation screen.
Figure 35:
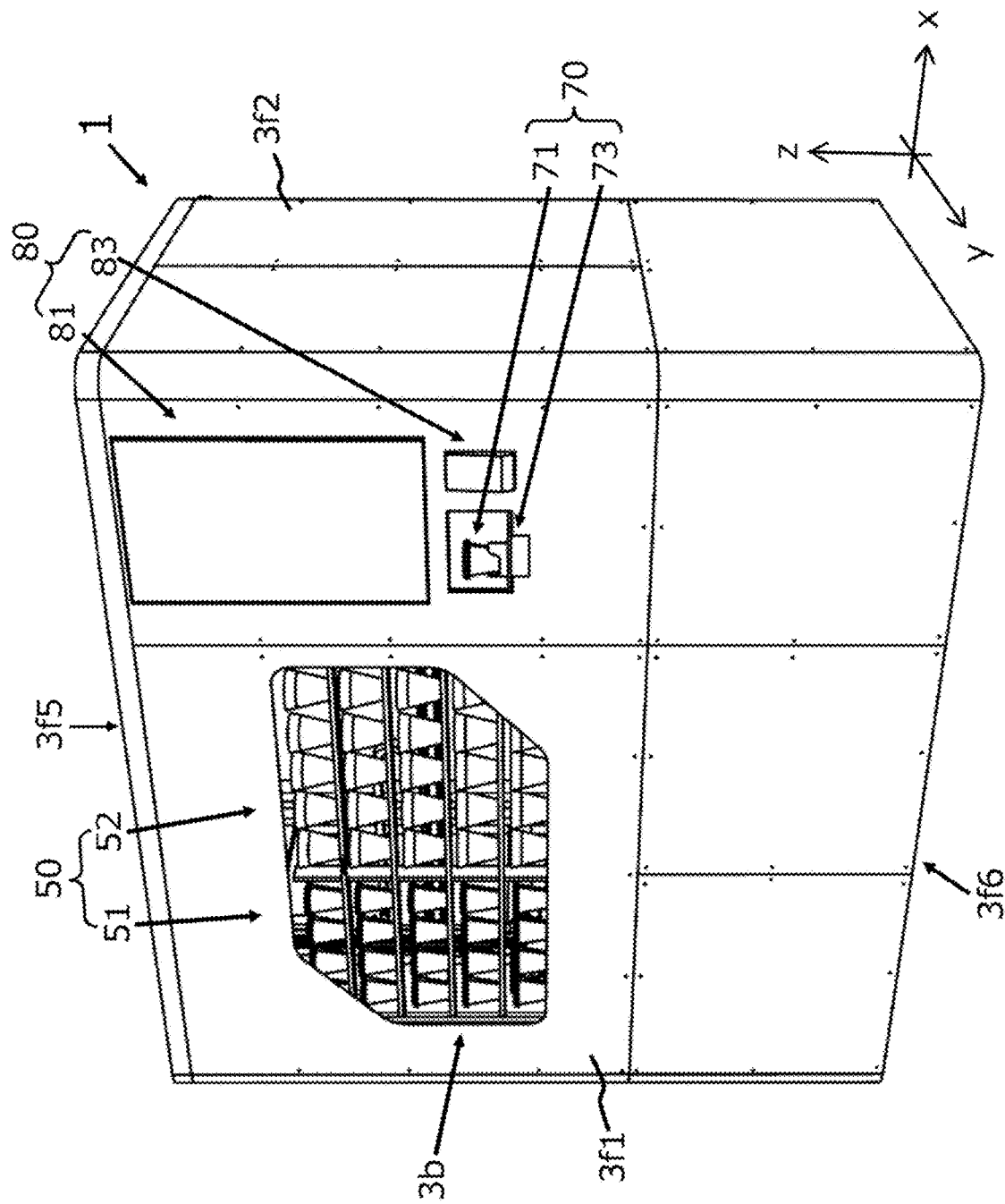
FIG. 35 is a diagram in which the outline of FIG. 2 is emphasized.
Figure 36:
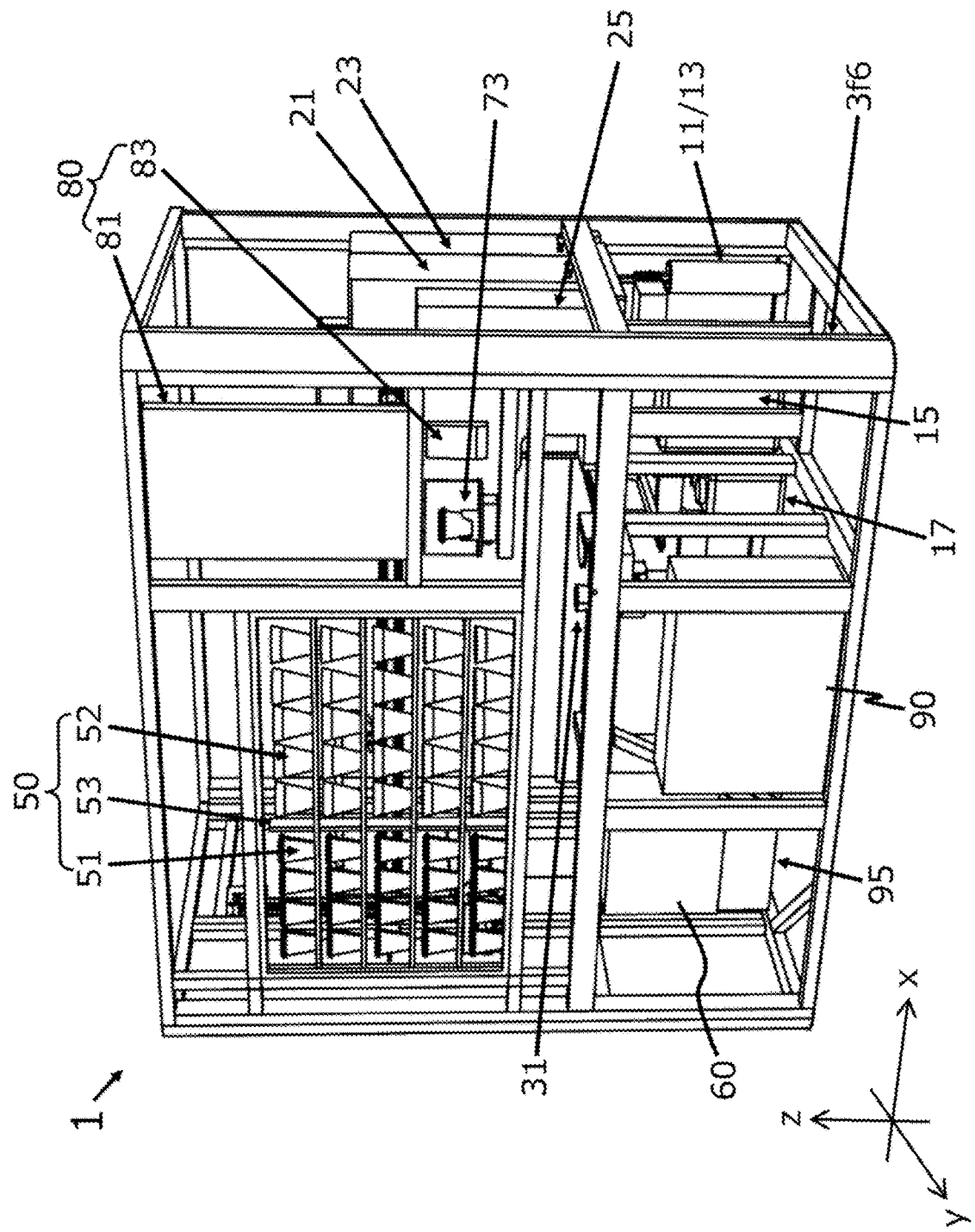
FIG. 36 is a diagram in which the outline of FIG. 3 is emphasized.
Figure 37:
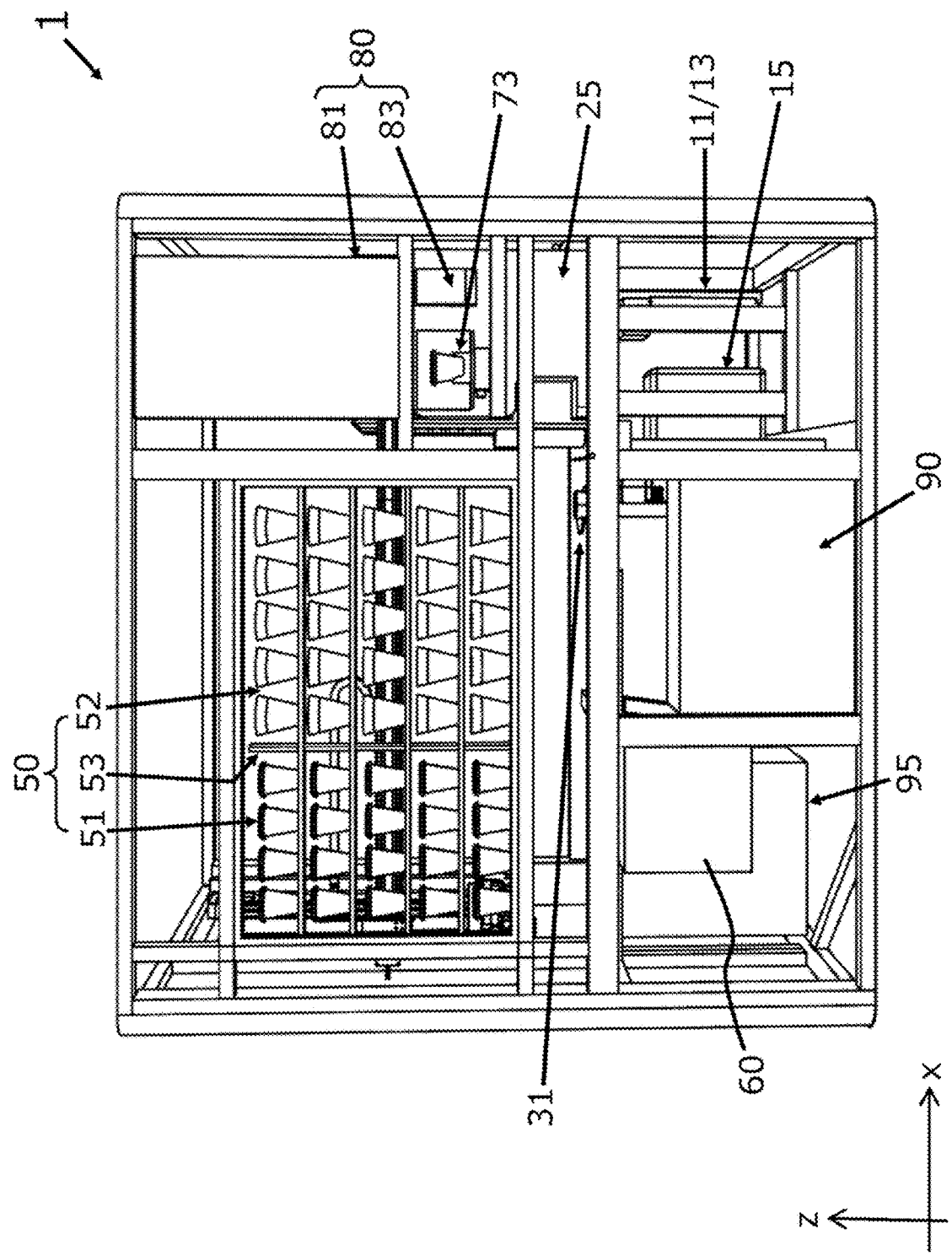
FIG. 37 is a diagram in which the outline of FIG. 4 is emphasized.
Figure 38:
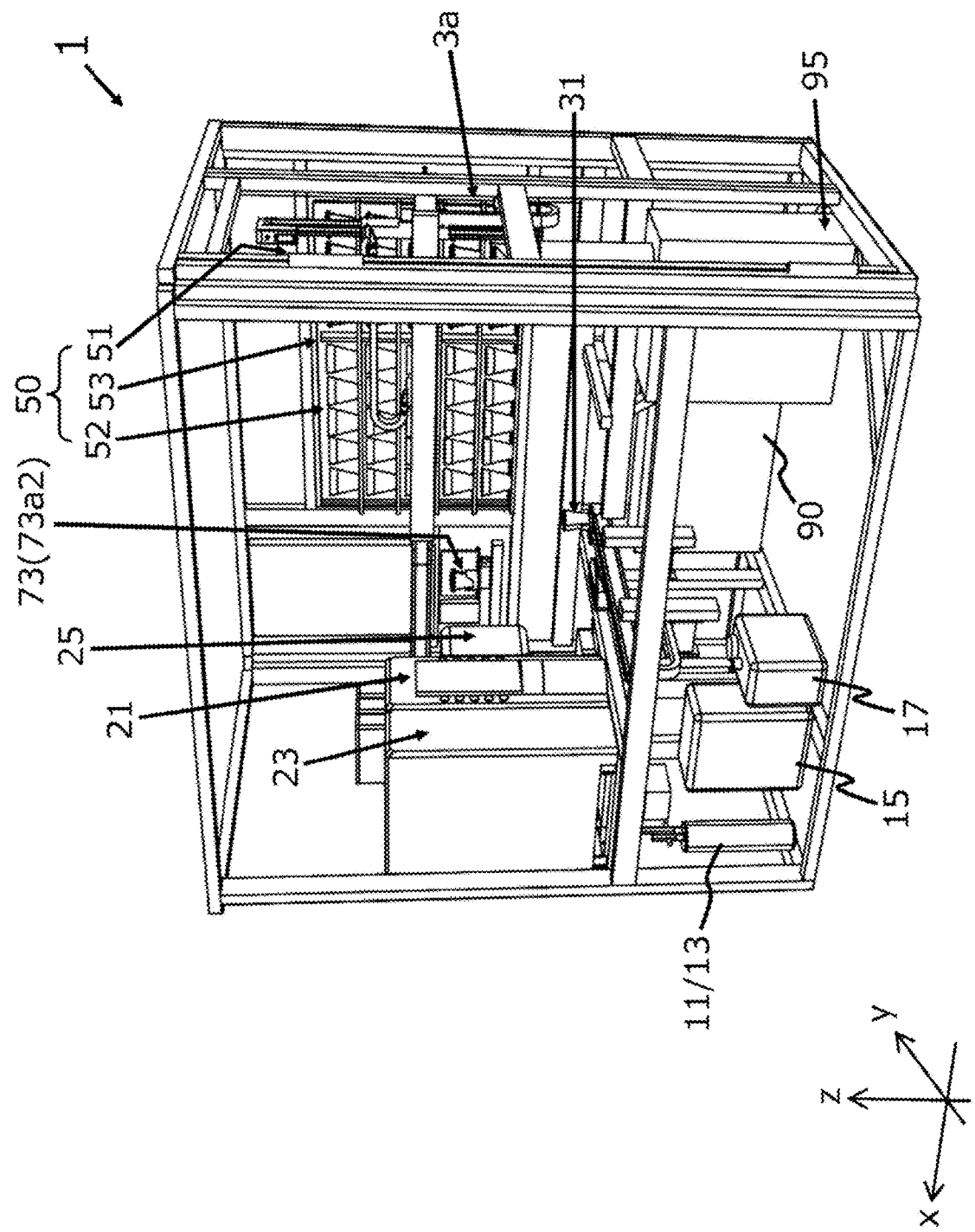
FIG. 38 is a diagram in which the outline of FIG. 5 is emphasized.
Figure 39:
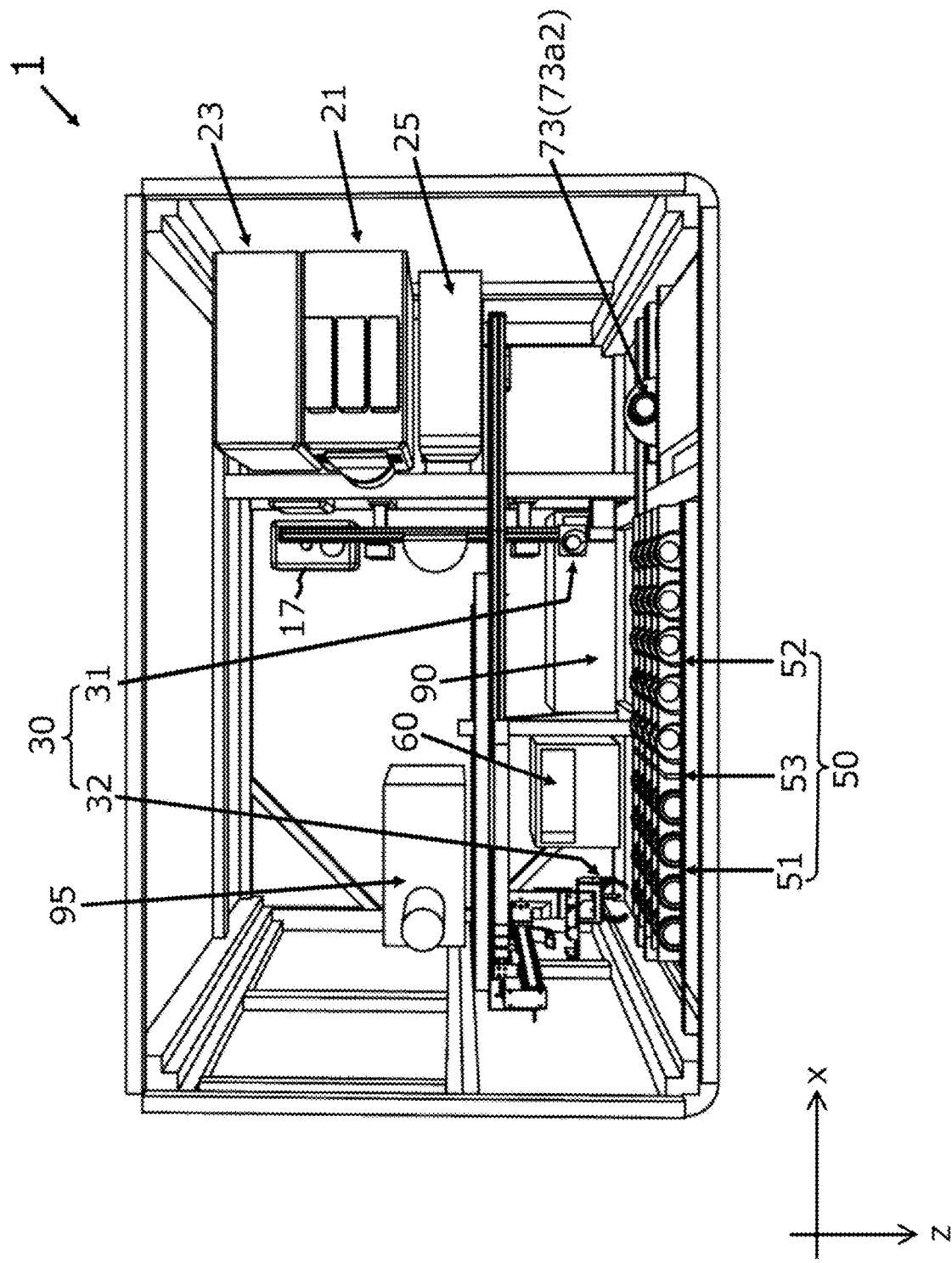
FIG. 39 is a diagram in which the outline of FIG. 6 is emphasized.
Figure 40:
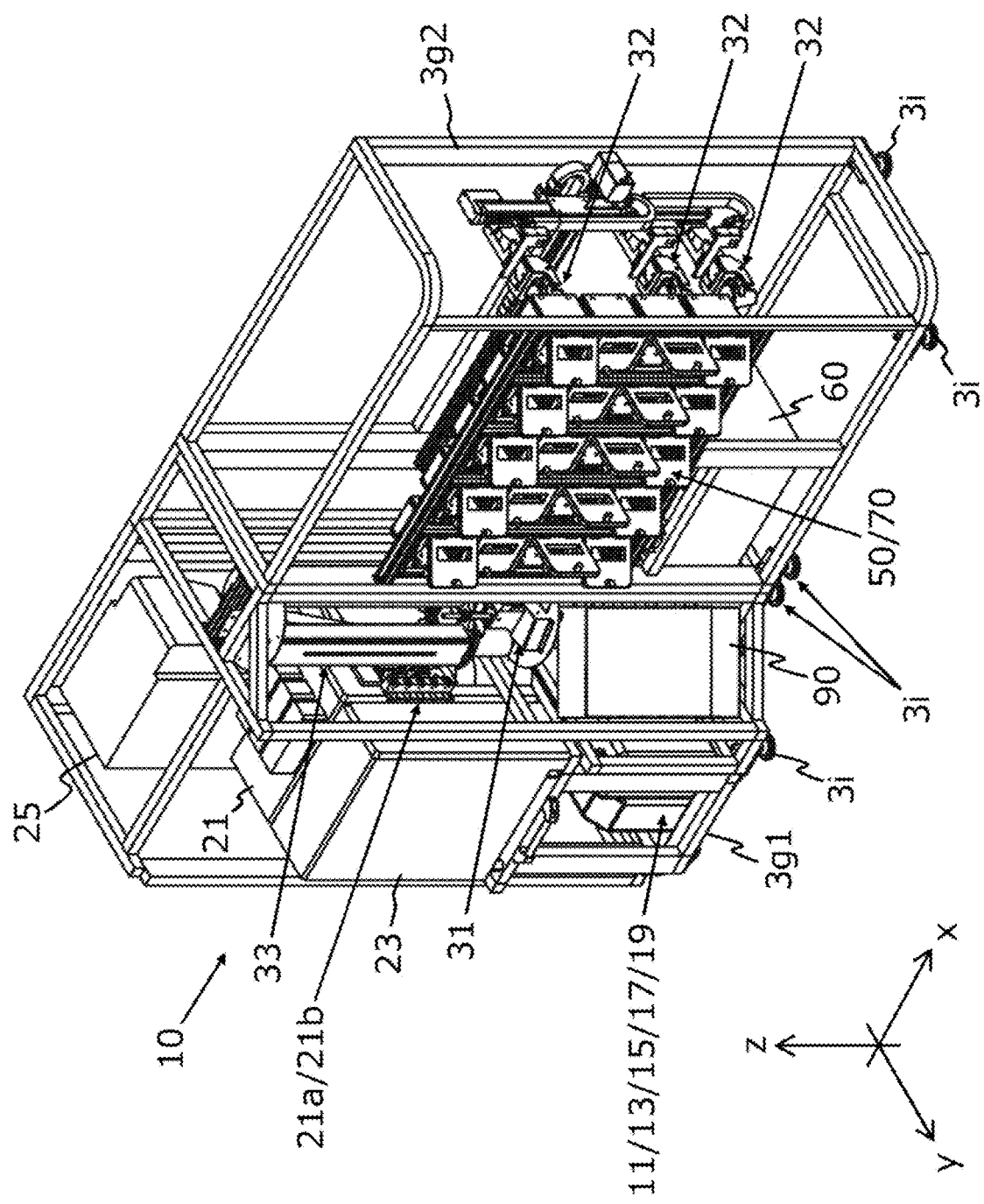
FIG. 40 is a diagram in which the outline of FIG. 12 is emphasized.
Figure 41:
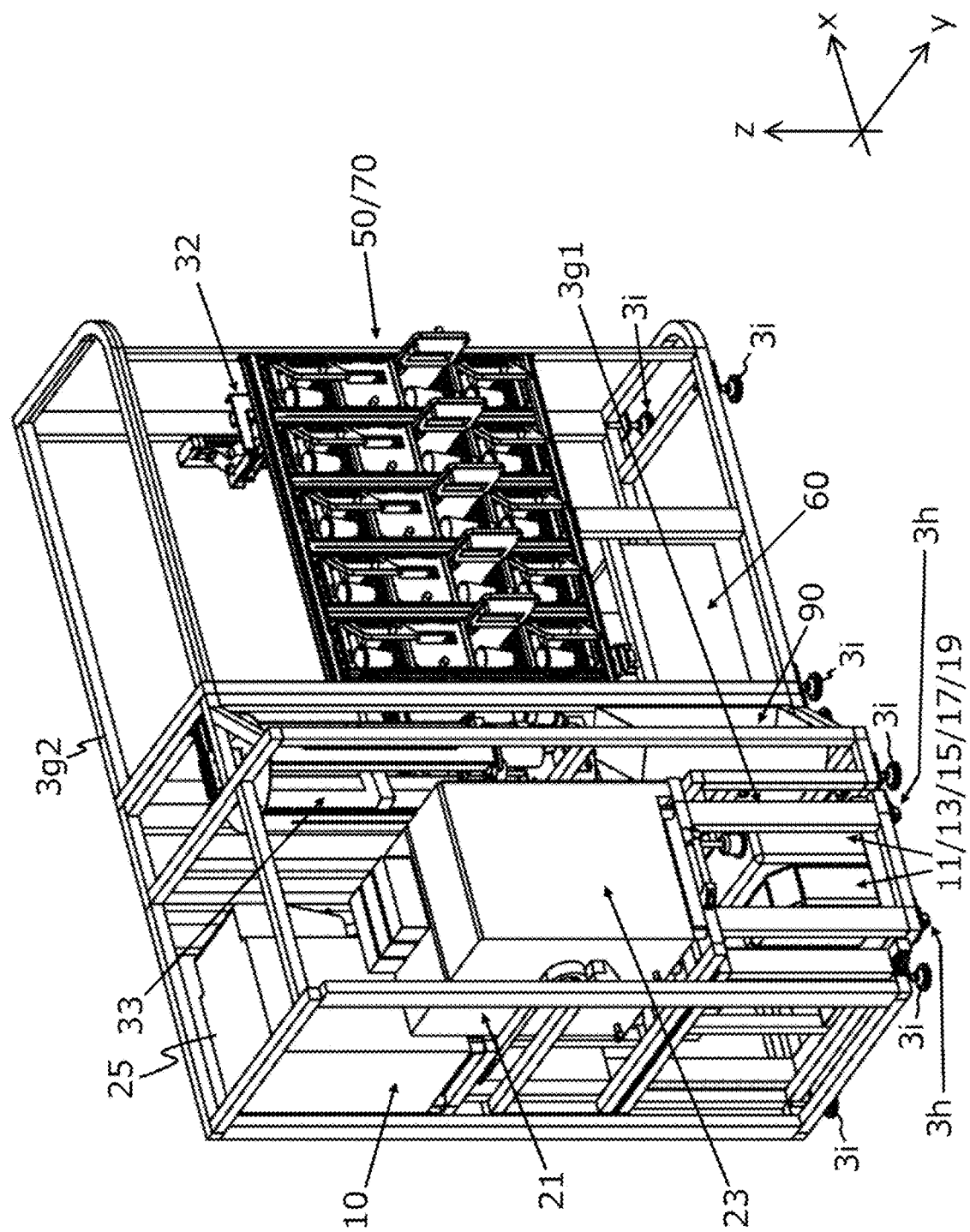
FIG. 41 is a diagram in which the outline of FIG. 13 is emphasized.
Figure 42:
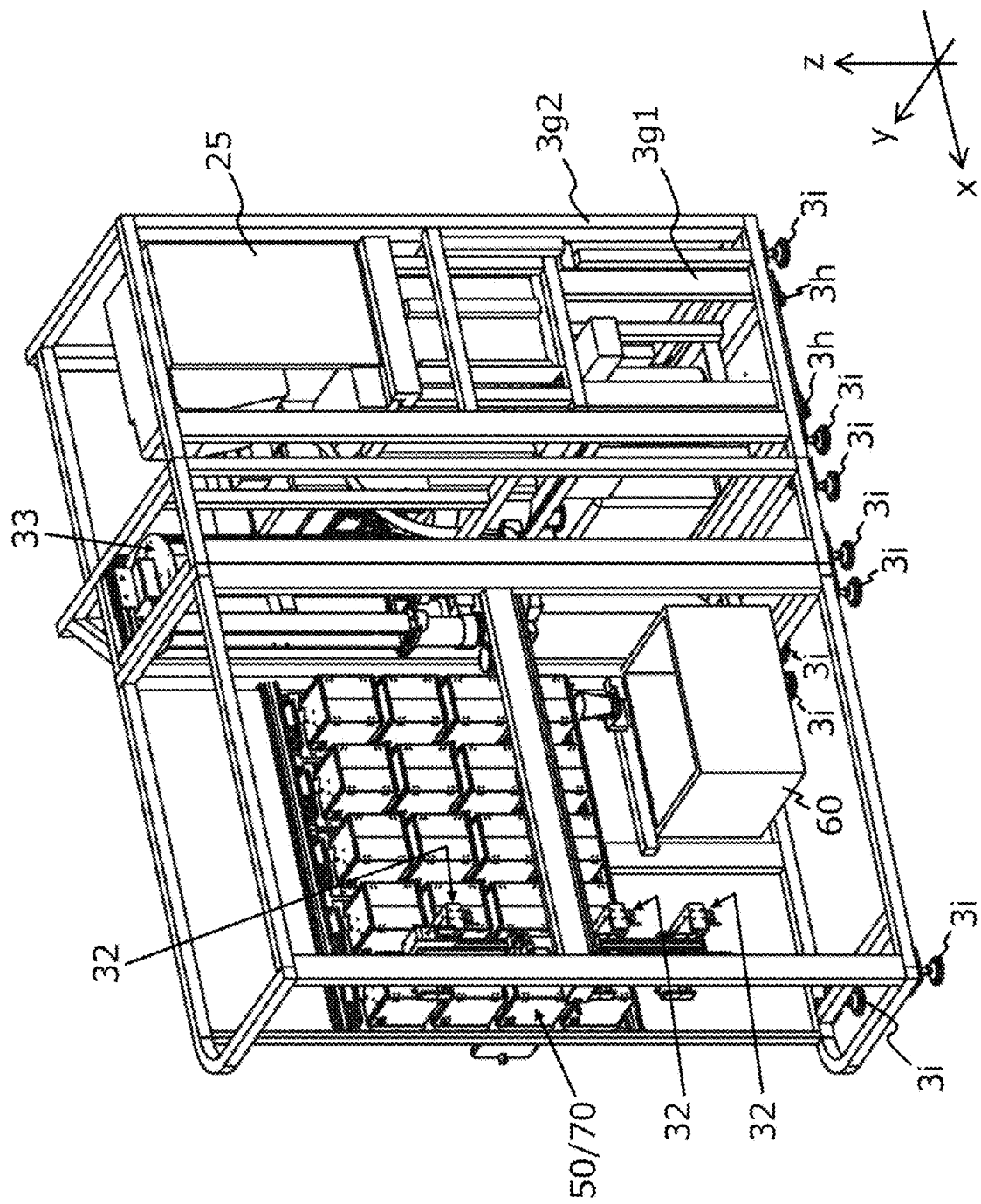
FIG. 42 is a diagram in which the outline of FIG. 14 is emphasized.
Figure 43:
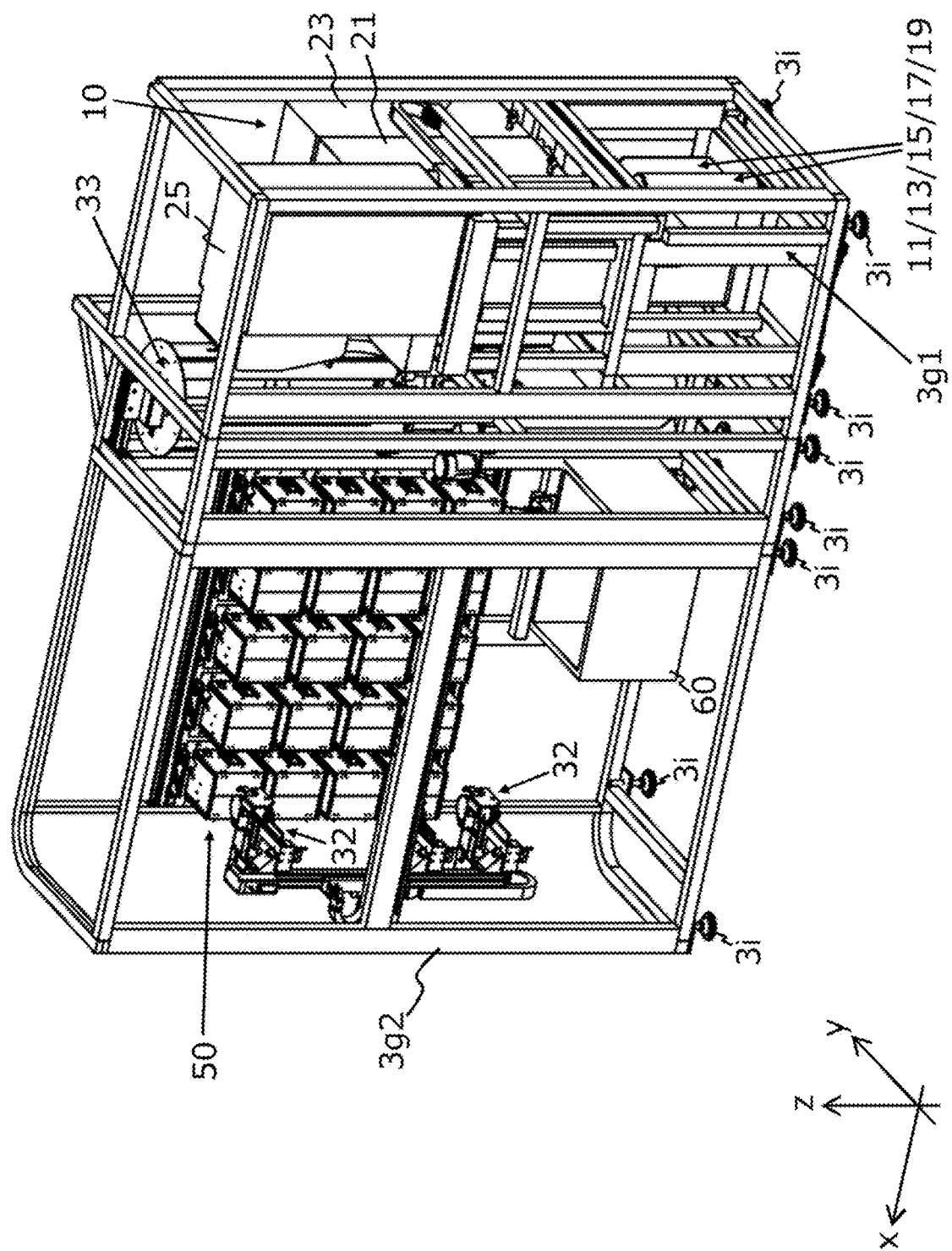
FIG. 43 is a diagram in which the outline of FIG. 15 is emphasized.
Figure 44:
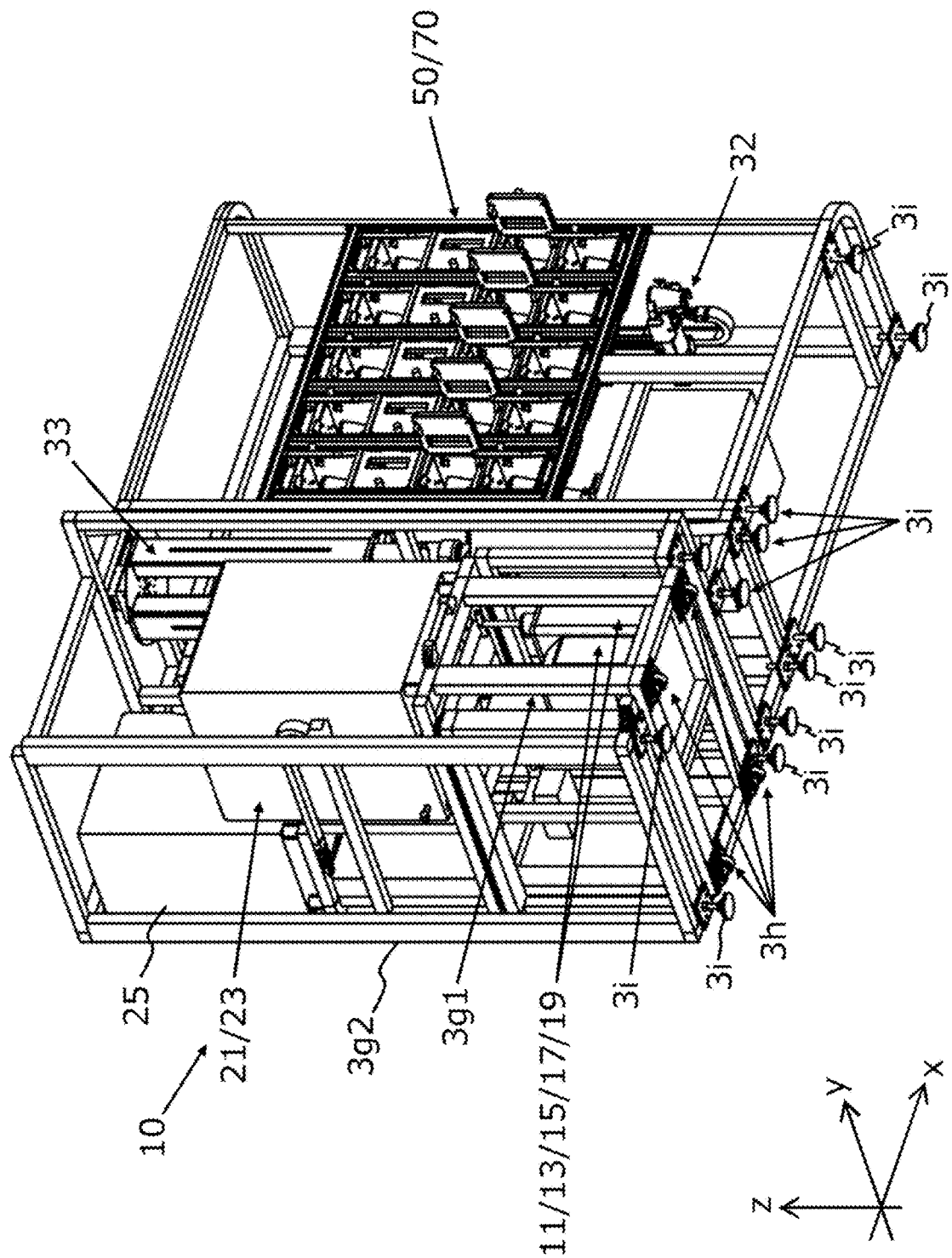
FIG. 44 is a diagram in which the outline of FIG. 16 is emphasized.
Figure 45:
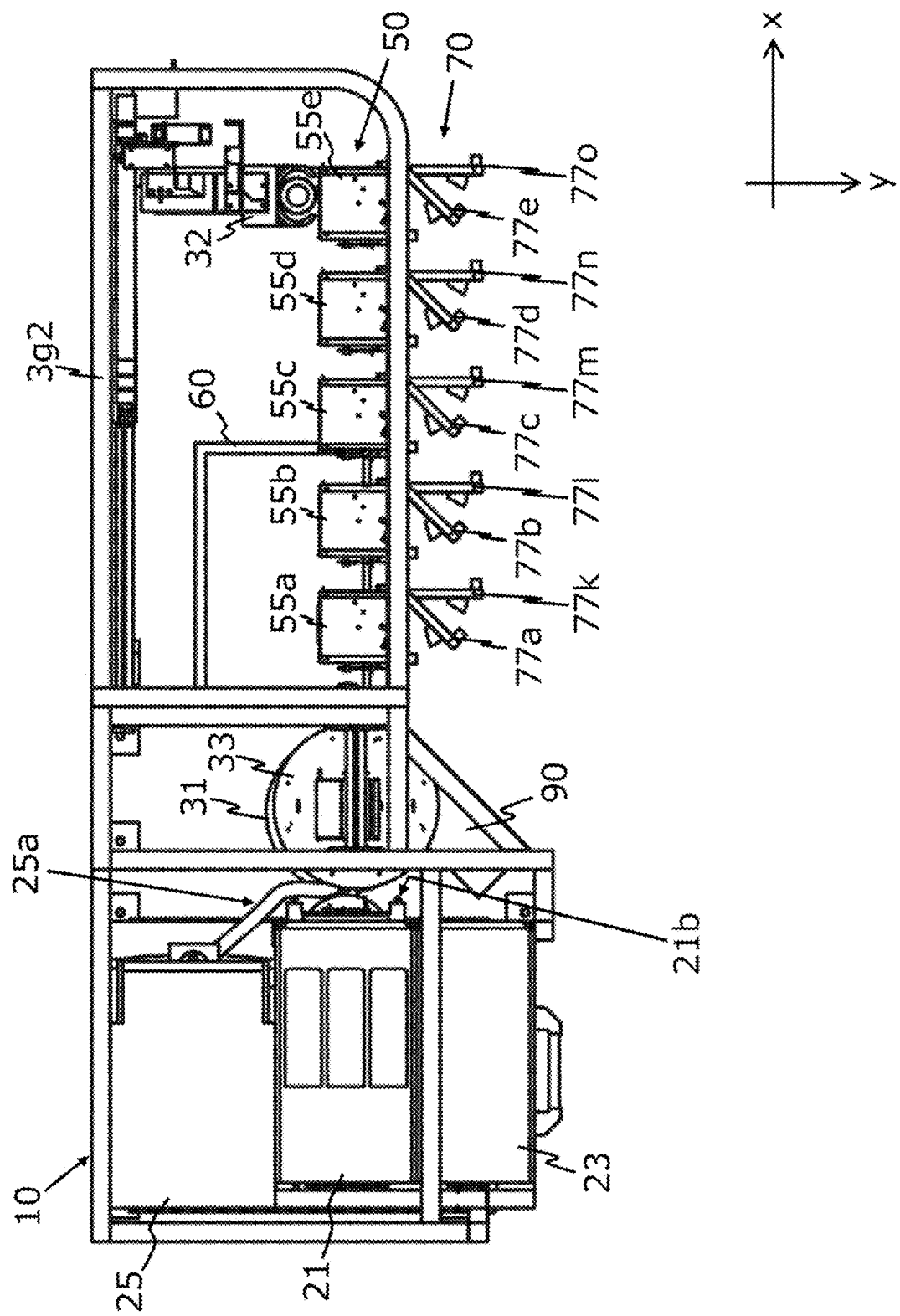
FIG. 45 is a diagram in which the outline of FIG. 17 is emphasized.
Figure 46:
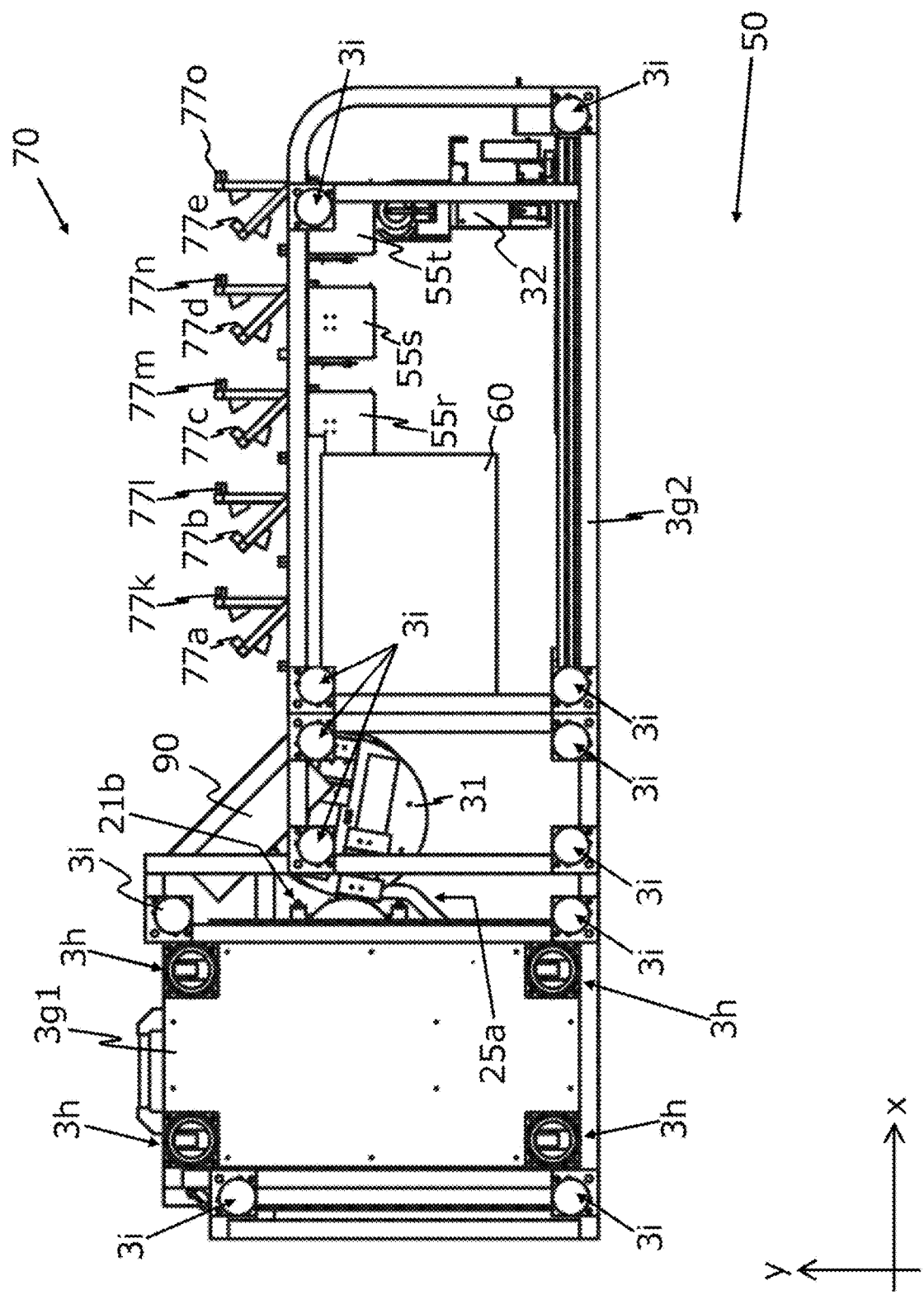
FIG. 46 is a diagram in which the outline of FIG. 18 is emphasized.

The purchaser terminal 400 displays the purchase condition setting screen 501, the pick-up confirmation screen 503, and a repurchase confirmation screen 505, via said purchaser software (see FIGS. 32 to 34).

The purchase condition setting screen 501 is displayed, for instance, when a user of the purchaser terminal 400 starts the purchaser software.

The pick-up confirmation screen 503 may be displayed when the purchaser terminal 400 is within the predetermined distance d from the place where the beverage purchased through the purchaser terminal 400 is picked up. Said place is the beverage providing device 1 set in a pick-up location setting area 501*d*. Alternatively, said screen 503 may be displayed at the third time t3 before the pick-up date and time set through the purchaser terminal 400. Alternatively, said screen 503 may be displayed when a user of the purchaser terminal 400 performs a given operation on the purchaser software.

The repurchase confirmation screen 505 is displayed at the fourth time t4 (e.g., t4=1 day) after the pick-up date and time set through the purchaser terminal 400.

(Purchase Condition Setting Screen 501)

The purchase condition setting screen 501 has a purchaser ID setting area 501*a*, a beverage type setting area 501*b*, a pick-up date and time setting area 501*c*, a pick-up location setting area 501*d*, a payment method setting area 501*e*, and an order decision button 501*f* (see FIG. 32).

The purchaser ID setting area 501*a* is used to set the identification information, the name, and the like of a purchaser who purchases a beverage.

The beverage type setting area 501*b* is used to set the type of beverage to be purchased.

The pick-up date and time setting area 501*c* is used to set the pick-up date and time to pick up the purchased beverage.

The pick-up location setting area 501*d* is used to set where to pick up the purchased beverage (location of the beverage providing device 1 where the beverage is picked up).

The payment method setting area 501*e* is used to set a payment method when a beverage is purchased.

Once the order decision button 501*f* is operated, information about the conditions set in the above setting areas is transmitted from the purchaser terminal 400 to the server 100, and the beverage purchase procedure and payment under said conditions are performed. In addition, information about the type of beverage and the pick-up date and time included in said conditions is transmitted to the controller 90 of the beverage providing device 1 included in said conditions.

FIG. 32 shows a display example of the purchase condition setting screen 501 on which the beverage purchase conditions are set to the purchaser ID: 401, the type of beverage: hot coffee with milk, the pick-up date and time: 13:00 on Oct. 20, 2020, the pick-up location: beverage providing device 1 installed at "Tokyo Station Yaesu Exit", and the payment method: an XX card.

(Pick-Up Confirmation Screen 503)

The pick-up confirmation screen 503 has a purchase condition display area 503*a* and a pick-up decision button 503*b* (see FIG. 33).

The purchase condition display area 503*a* includes information about the details of the decided order, the front opening/closing door 77 corresponding to the storage cylinder 55 in which a container containing the beverage to be picked up (the beverage provided to the purchaser of the purchaser terminal 400) is stored, and so on.

Once the pick-up decision button 503*b* is operated (when a predetermined operation is performed on the purchaser terminal 400), information about the pick-up decision button 503*b* having been operated is transmitted indirectly via the server 100 (or directly without going through the server 100) to the beverage providing device 1 corresponding to the pick-up location.

In the beverage providing device 1, the locked state of the front opening/closing door 77 is released which corresponds to the storage cylinder 55 in which a container containing the beverage to be picked up is stored.

FIG. 33 shows a display example of the pick-up confirmation screen 503 including information indicating that the purchaser terminal 400 of the purchaser ID: 401 is within the range of the predetermined distance d from the pick-up location (the beverage providing device 1 at the Tokyo Station Yaesu Exit) and once the pick-up decision button 503b is operated, the locked state of the fourth front opening/closing door 77d is released that corresponds to the fourth storage cylinder 55d in which a container containing the beverage to be picked up is stored.

The second embodiment illustrates that both the corresponding purchaser terminal 400 being near the beverage providing device 1 and the pick-up decision button 503b being operated on the purchaser terminal 400 are conditions for releasing the locked state of the front opening/closing door 77.

However, the locked state of the front opening/closing door 77 may be released when the corresponding purchaser terminal 400 is near the beverage providing device 1 or the pick-up decision button 503b is operated on the purchaser terminal 400.

(Repurchase Confirmation Screen 505)

The repurchase confirmation screen 505 has a repurchase condition display area 505a, a reorder decision button 505b, and an order details change button 505c (see FIG. 34).

The repurchase condition display area 505a includes information about the details of the previous order decision at the pick-up date and time delayed by the fourth time t4 from the previous one, and the reorder guidance.

Once the reorder decision button 505b is operated, information about the repurchase conditions indicated in the repurchase condition display area 505a is transmitted from the purchaser terminal 400 to the server 100, and the beverage purchase procedure and payment under said repurchase condition are performed. In addition, information about the type of beverage included in said repurchase conditions and the pick-up date and time is transmitted to the controller 90 of the beverage providing device 1 included in said repurchase conditions.

Once the order details change button 505c is operated, the display is switched to the purchase condition setting screen 501.

FIG. 34 shows a display example of the repurchase confirmation screen 505 that presents the beverage repurchase conditions including the purchaser ID: 401, the type of beverage: hot coffee with milk, the pick-up date and time: 13:00 on Oct. 21, 2020, the pick-up location: beverage providing device 1 installed at "Tokyo Station Yaesu Exit", and the payment method: an XX card.

The case of displaying the output of the content of the management screen 301 on the worker terminal 200, the output of the content of the purchase condition setting screen 501 on the purchaser terminal 400, the output of the content of the pick-up confirmation screen 503, and the output of the content of the repurchase confirmation screen 505 has been described. In addition to the display output or instead of the display output, an audio output may be used.

Effects

The beverage generator 10, the transfer section 30, and the storage section 50 are housed in one housing 3. This makes it possible to hold a plurality of containers each containing a beverage supplied from the beverage generator 10 and provide the beverage to a purchaser within a short waiting time when needed, that is, when the purchaser conducts a purchase procedure (payment), a pick-up operation, etc.

(Effect of Having Storage Section 50 and Provision Section 70 Adjacent to Each Other in Front-Rear Direction)

In the second embodiment, the storage section 50 and the provision section 70 are adjacent to each other in the y direction and are integrated. Since it is unnecessary to transfer each container between the storage section 50 and the provision section 70 by the second transfer unit 32, the beverage can be provided to the purchaser with a beverage within a short waiting time.

(Effect of Having Multiple Storage Areas, Etc.)

In addition, in the second embodiment, the storage section 50 has three or more storage areas (storage cylinders 55; the first storage cylinder 55a to the 20th storage cylinder 55t). Accordingly, the provision section 70 has three or more outlet areas (front opening/closing doors 77; the first front opening/closing door 77a to the 20th front opening/closing door 77t).

Opening multiple front opening/closing doors 77 makes it possible to simultaneously provide multiple beverages to the purchaser, and to store, at the same time, a container containing another beverage in another storage cylinder 55.

(Effect of Having Rear Opening/Closing Door 57)

Providing the rear opening/closing door 57 makes it possible to hide an area behind the rear opening/closing door 57 from the front side where the front opening/closing door 77 is located.

(Effect of Opening/Closing Control)

By controlling the opening/closing of the rear opening/closing door 57 and the front opening/closing door 77, it is possible to open one of them while the other can be kept closed. This can prevent the occurrence of physical interference (collision) with a hand of purchaser and the second transfer unit 32 that may enter the storage cylinder between the doors.

(Effect of Designating Pick-Up Date and Time)

Meanwhile, the beverage purchase operation is performed via software of the mobile terminal, and the date and time of picking up the purchased beverage is also designated.

In addition, it is determined whether the purchase has approached the beverage providing device 1 through the mobile terminal.

This makes it possible to prepare the purchased beverage immediately before the pick-up date and time designated in advance and provide the purchaser with freshly made coffee or the like within a short waiting time.

(Effect of Having Container Supply Unit 33, Etc.)

The container supply unit 33 is provided above the first transfer unit 31; the first transfer unit 31 transfers a container to the predetermined position s0 in the beverage supply unit 21 and transfers the beverage-containing container to the relay point P1; and the second transfer unit 32 transfers the beverage-containing container from the relay point P1 to the storage section 50.

This makes it possible to automate, without human intervention, the process from the step of arranging the container in the beverage supply unit 21 to the step of providing the container containing the beverage to the purchaser.

By using two transfer units (the first transfer unit 31 and the second transfer unit 32) and the container supply unit 33, transportation of the container to the beverage supply unit 21, transportation of the container containing the beverage supplied from the beverage supply unit 21, and transportation of the container held in the storage section 50 can be simultaneously processed to improve operational efficiency.

(Effect of Having First Recess 31b2, Etc.)

Further, recesses (the first recess 31b2, the second recess 56a1, and the third recess 60a1), into which the claw 32a of the second transfer unit 32 can be inserted, are provided at areas (the first container mounting part 31b1, the second container mounting part 56a, and the third container mounting part 60a) where the second transfer unit 32 grips the container or releases the gripped state.

This makes it possible to reliably grip the container by the second transfer unit 32 because the second transfer unit 32 is provided with the claw 32a that holds the container from the bottom.

(Effect of Having Legs 3i)

A lower portion of the second housing 3g2 is provided with legs 3i extending downward in the z direction.

Because of this, the beverage providing device 1 can be easily carried by inserting a fork of a forklift or the like into a portion below the bottom of a frame constituting the second housing 3g2.

The separated structure allows the three areas of the housing to be carried separately at the time of transportation, etc. Said three areas of the housing includes the left-side area where the beverage supply unit 21 and the like are provided, and the intermediate area where the first transfer unit 31 and the container supply unit 33 are provided, and the right-side area where the second transfer unit 32 and the storage section 50 are provided.

(Effect of Having Casters 3h)

A portion that retains the beverage generator 10 in the housing 3 (the first housing 3g1) is structured separately from the other portion (the second housing 3g2), and the bottom of said portion is provided with casters 3h. This can make it easy to dislocate a portion having the beverage supply unit 21 or the like away from the beverage providing device 1 during maintenance such as replenishment of milk, that is, move the first housing 3g1 away from the second housing 3g2.

(Effect of Having Strainer 60b)

A strainer 60b is provided in the disposal section 60. This makes it possible to separate a solid and a liquid above and below the strainer 60b and store the waste in the disposal section 60.

Although some embodiments of the present invention have been described, these embodiments are presented as examples and are not intended to limit the scope of the invention. These embodiments can be implemented in various other forms, and various omissions, replacements, and modifications can be made without departing from the spirit of the invention. These embodiments and modifications thereof are included in the scope and gist of the invention as well as in the claimed invention and the equivalent scope thereof.

REFERENCE SIGNS LIST

1 Beverage providing device
3 Housing
3a Carry-in/carry-out port
3b Display window
3c Inner wall
3f1 Front face
3f1a First front face
3f1b Second front face
3f2 Right side face
3f3 Left side face
3f4 Rear face
3f5 Upper face
3f6 Lower face
3g1 First housing
3g2 Second housing
3h Caster
3i Leg
10 Beverage generator
11 Water purifier
13 Water softener
15 Water supply tank
17 Drainage tank
19 Pump
21 Beverage supply unit (Coffee maker)
21a Selection button
21b Selection button manipulator
23 Milk tank
25 Ice maker (Shuttle ice maker)
25a Conduit
30 Transfer section
31 First transfer unit
31a Transfer section-side turntable
31b Container holder
31b1 First container mounting part
31b2 First recess
32 Second transfer unit
32a Claw
32b Arm
33 Container supply unit
40 Operation instruction output section
50 Storage section
51 First storage section (First stocker)
51a Heater
52 Second storage section (Second stocker)
52a Cooler
53 Partition wall
55 Storage cylinder (Storage area)
55a to 55t First storage cylinder to 20th storage cylinder
56a Second container mounting part
56a1 Second recess
57 Rear opening/closing door
57a to 57t First rear opening/closing door to 20th rear opening/closing door
60 Disposal section
60a Third container mounting part
60a1 Third recess
60a2 Disposal mechanism
60b Strainer
70 Provision section
71 Outlet
71a to 71t First outlet opening to 20th outlet opening
73 Provision section-side turntable
73a1 First mounting area
73a2 Second mounting area
73b Wall
77 Front opening/closing door
77a to 77t First front opening/closing door to 20th front opening/closing door
80 Operation section
81 Display unit
83 Payment unit
90 Controller
90a Sensor
100 Server
200 Worker terminal
301 Maintenance management screen
301a Maintenance instruction area
301b Completion button
400 Purchaser terminal
501 Purchase condition setting screen
501a Purchaser ID setting area
501b Beverage type setting area
501c Pick-up date and time setting area
501d Pick-up location setting area 501e Payment method setting area
501f Order decision button
503 Pick-up confirmation screen
503a Purchase condition display area
503b Pick-up decision button
505 Repurchase confirmation screen
505a Repurchase condition display area
505b Reorder decision button
505c Order details change button
d Predetermined distance from the beverage providing device
P1 Relay point
s0 Predetermined position in the beverage supply unit
s1 Transfer start position for the first transfer unit
s2 Second position near the relay point
t1 First time (Time threshold compared to an elapsed time)
t2 Second time (Interval for recording positional information about the first transfer unit, etc.)
t3 Third time (Interval between a purchaser's pick-up time and coffee extraction time)
t4 Fourth time (Interval between the purchaser's pick-up date and time and the next repurchase date and time)
Te1 First temperature
Te2 Second temperature

The invention claimed is:

1. A beverage providing device comprising:
a beverage supply unit;
a storage section having an area for holding two or more containers each containing a beverage supplied from the beverage supply unit;
a provision section including an outlet;
a transfer section which transfers, to at least the storage section, each container containing the beverage supplied from the beverage supply unit; and
an outer wall having a front face provided with at least the outlet and having a side face of the front face,
wherein:
at least part of the beverage supply unit, the storage section, and the transfer section are arranged in an area surrounded by the front face, the side face, a plane parallel to the front face, and a plane parallel to the side face; and
the container containing the beverage supplied from the beverage supply unit is made ready to be picked-up through the outlet from a side that is at the front face and is opposite to a side where the beverage supply unit, the transfer section, and the storage section are located,
wherein:
the storage section and the provision section are adjacent to each other in a front-rear direction,
wherein:
the storage section has three or more storage areas;
the provision section has the three or more front opening/closing doors;
the front opening/closing door is attached to each of the three or more storage areas; and
the storage area and the front opening/closing door are in a positional relationship of sandwiching the outlet in the front-rear direction, and
wherein:
the storage section has three or more rear opening/closing doors;
the rear opening/closing door is attached to each of the three or more storage areas;
the front opening/closing door and the rear opening/closing door are in a positional relationship of sandwiching the storage area in the front-rear direction; and
the transfer section transfers the container containing the beverage supplied from the beverage supply unit via the rear opening/closing door to the storage area.

2. The beverage providing device according to claim 1, further comprising a disposal section,
wherein the disposal section is provided in an area surrounded by the front face, the side face, the plane parallel to the front face, and the plane parallel to the side face, and
the transfer section transfers, to the disposal section, a container for which an elapsed time after supplied from the beverage supply unit or an elapsed time after held in the storage section has passed a first time, among containers containing a beverage supplied from the beverage supply unit and being held in the storage section.

3. The beverage providing device according to claim 2, wherein the disposal section is provided below the storage section and has a strainer.

4. The beverage providing device according to claim 2, further comprising an operation instruction output section,
wherein the operation instruction output section is an area surrounded by the front face, the side face, the plane parallel to the front face, and the plane parallel to the side face and is provided proximate to the beverage supply unit, and
the operation instruction output section outputs information about at least one instruction of a type of beverage to be next supplied by the beverage supply unit, replenishment of a material used in the beverage supply unit, cleaning of the beverage supply unit, and cleaning of the disposal section.

5. The beverage providing device according to claim 1, wherein the transfer section transfers, to the storage section and the provision section, a container containing a beverage supplied from the beverage supply unit,
two or more of the provision sections are provided at the front face and the side face, and
the transfer section transfers, to the two or more provision sections, containers each containing a beverage supplied from the beverage supply unit.

6. The beverage providing device according to claim 1, wherein:
when a purchaser terminal is located near the beverage providing device and a predetermined operation is performed on the purchaser terminal; a locked state of the front opening/closing door corresponding to a storage area among the storage areas, where a container containing a beverage to be picked up by a purchaser of the purchaser terminal is stored, is released.

7. The beverage providing device according to claim 6, wherein information about the front opening/closing door whose locked state is released is output to the purchaser terminal.

8. The beverage providing device according to claim 1, wherein a caster is provided on a member that holds the beverage supply unit.

9. The beverage providing device according to claim 1, wherein the storage section holds a container containing a beverage supplied from the beverage supply unit in a covered state.

10. The beverage providing device according to claim 1, further comprising an operation section, wherein the operation section is provided on at least one of the front face or the side face, selection of a beverage supplied from the beverage supply unit and payment corresponding to the selection are executed by using the operation section, and the transfer section transfers, to the provision section or a vicinity of the provision section, a container containing a beverage supplied from the beverage supply unit and corresponding to the selection after the selection is completed and before the payment is completed.

11. The beverage providing device according to claim 1, wherein two or more of the beverage supply units are provided in an area surrounded by the front face, the side face, the plane parallel to the front face, and the plane parallel to the side face, and the transfer section transfers containers containing beverages supplied from the two or more beverage supply units.

12. The beverage providing device according to claim 1, wherein the beverage supply unit extracts coffee.

13. A beverage providing device comprising:

a beverage supply unit;

a storage section having an area for holding two or more containers each containing a beverage supplied from the beverage supply unit;

a provision section including an outlet;

a transfer section which transfers, to at least the storage section, each container containing the beverage supplied from the beverage supply unit; and an outer wall having a front face provided with at least the outlet and having a side face of the front face, wherein:

at least part of the beverage supply unit, the storage section, and the transfer section are arranged in an area surrounded by the front face, the side face, a plane parallel to the front face, and a plane parallel to the side face; and the container containing the beverage supplied from the beverage supply unit is made ready to be picked-up through the outlet from a side that is at the front face and is opposite to a side where the beverage supply unit, the transfer section, and the storage section are located, wherein:

the storage section and the provision section are adjacent to each other in a front-rear direction, wherein:

the storage section has three or more storage areas;

the provision section has the three or more front opening/closing doors;

the front opening/closing door is attached to each of the three or more storage areas; and the storage area and the front opening/closing door are in a positional relationship of sandwiching the outlet in the front-rear direction, and wherein:

the storage section has three or more rear opening/closing doors;

the rear opening/closing door is attached to each of the three or more storage areas;

the front opening/closing door and the rear opening/closing door are in a positional relationship of sandwiching the storage area in the front-rear direction; and the transfer section transfers the container containing the beverage supplied from the beverage supply unit via the rear opening/closing door to the storage area, and wherein:

while the front opening/closing door is open, the rear opening/closing door which faces the open state front opening/closing door in the front-rear direction is kept closed; and/or while the rear opening/closing door is open, the front opening/closing door which faces the open state rear opening/closing door in the front-rear direction is kept closed.

14. A beverage providing device comprising:

a beverage supply unit;

a storage section having an area for holding two or more containers each containing a beverage supplied from the beverage supply unit;

a provision section including an outlet;

a transfer section which transfers, to at least the storage section, each container containing the beverage supplied from the beverage supply unit; and an outer wall having a front face provided with at least the outlet and having a side face of the front face, wherein:

at least part of the beverage supply unit, the storage section, and the transfer section are arranged in an area surrounded by the front face, the side face, a plane parallel to the front face, and a plane parallel to the side face; and the container containing the beverage supplied from the beverage supply unit is made ready to be picked-up through the outlet from a side that is at the front face and is opposite to a side where the beverage supply unit, the transfer section, and the storage section are located, wherein:

the transfer section has a first transfer unit, a second transfer unit, and a container supply unit;

the container supply unit supplies a container to the first transfer unit located below;

the first transfer unit transfers the container supplied from the container supply unit to the beverage supply unit, and transfers the container containing a beverage supplied from the beverage supply unit to a relay point; and the second transfer unit grips the container positioned at the relay point and transfers the container to the storage section, and wherein:

the second transfer unit has an arm that holds a side portion of the container and a claw that holds a bottom portion of the container; and an area where the container is mounted at the first transfer unit and an area where the container is mounted at the storage section are each provided with a recess into which the claw is inserted.

15. The beverage providing device according to claim 14, wherein a leg is provided at a lower portion of a housing surrounding the beverage supply unit, the transfer section, and the storage section, and an area where the beverage supply unit of the housing is provided, an area where the first transfer unit and the container supply unit of the housing are provided, and an area where the second transfer unit and the storage section of the housing are provided are separately structured.

16. A beverage providing device comprising:

a beverage supply unit;

a storage section having an area for holding two or more containers each containing a beverage supplied from the beverage supply unit;

a provision section including an outlet;
a transfer section which transfers, to at least the storage section, each container containing the beverage supplied from the beverage supply unit;
an outer wall having a front face provided with at least the outlet and having a side face of the front face; and
an operation section,
wherein:
at least part of the beverage supply unit, the storage section, and the transfer section are arranged in an area surrounded by the front face, the side face, a plane parallel to the front face, and a plane parallel to the side face; and
the container containing the beverage supplied from the beverage supply unit is made ready to be picked-up through the outlet from a side that is at the front face and is opposite to a side where the beverage supply unit, the transfer section, and the storage section are located,
wherein:
the operation section is provided on at least one of the front face or the side face;
selection of a beverage supplied from the beverage supply unit and payment corresponding to the selection are executed by using the operation section;
the storage section and the provision section are arranged apart;
the transfer section transfers, to the provision section, a container containing a beverage supplied from the beverage supply unit before the selection is completed; and
in a case where the beverage included in the container transferred to the provision section does not correspond to the selection, the beverage providing device transfers, to the storage section, the container transferred to the provision section, and transfers, to the provision section, a container containing a beverage supplied from the beverage supply unit and corresponding to the selection, after the selection is completed, and
wherein:
before the selection is completed, a type of the beverage contained in the container to be transferred to the provision section is determined on a basis of past sales performance of the beverage providing device.

17. The beverage providing device according to claim 16, wherein the storage section and the provision section are arranged apart in a left-right direction,
the provision section further has a provision section-side turntable,
the provision section-side turntable has a pedestal and a wall standing on the pedestal,
the provision section-side turntable is provided at the outlet,
the pedestal rotates about an axis extending in a vertical direction,
the wall is used to close the outlet,
the pedestal is provided with at least two mounting areas positioned to sandwich the wall,
the transfer section transfers, to one of the two mounting areas, a container containing a beverage supplied from the beverage supply unit.

18. The beverage providing device according to claim 16, wherein the storage section and the provision section are arranged apart in a left-right direction,
the beverage supply unit is arranged apart from the front face in a front-rear direction, compared to the storage section,
the transfer section has a first transfer unit and a second transfer unit,
the first transfer unit transfers, to a relay point, a container containing a beverage supplied from the beverage supply unit, and
the second transfer unit transfers, to the storage section and/or the provision section, the container containing the beverage supplied from the beverage supply unit and transferred to the relay point.

19. The beverage providing device according to claim 18, wherein a transfer range of the first transfer unit and a transfer range of the second transfer unit overlap in an area including the relay point.

20. The beverage providing device according to claim 18, further comprising an inner wall,
wherein the inner wall is provided in an area surrounded by the front face, the side face, the plane parallel to the front face, and the plane parallel to the side face,
a display window is provided on the front face in an area where the storage section is located,
at least part of the storage section and at least part of the second transfer unit are in a positional relationship of being sandwiched in the front-rear direction by the inner wall and the display window.

21. The beverage providing device according to claim 16, wherein the transfer section transfers, to the storage section and the provision section, a container containing a beverage supplied from the beverage supply unit,
the storage section has a first storage section, a second storage section, and a partition wall,
the first storage section is equipped with a heater for heating a container containing a beverage supplied from the beverage supply unit and held in the first storage section,
the second storage section is equipped with a cooler for cooling a container containing a beverage supplied from the beverage supply unit and held in the second storage section,
the partition wall is provided between an area where the container in the first storage section is held and an area where the container in the second storage section is held, and
the first storage section, the second storage section, and the provision section are aligned in a left-right direction.

* * * * *